Figure 1:
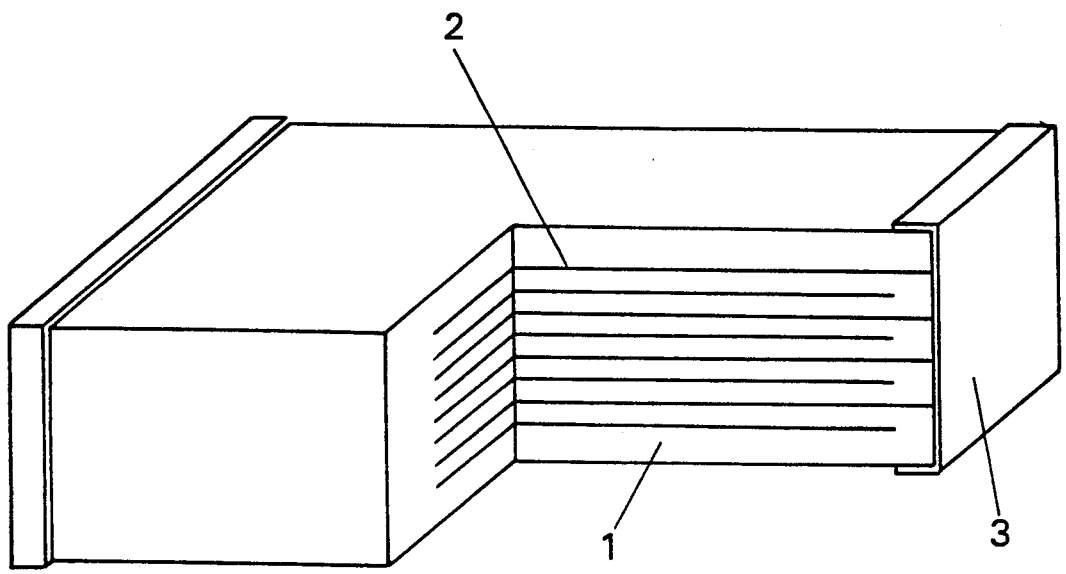

United States Patent [19]

Iga

[11] Patent Number: 5,266,079
[45] Date of Patent: Nov. 30, 1993

[54] METHOD FOR MANUFACTURING A CERAMIC CAPACITOR HAVING VARISTOR CHARACTERISTICS

[75] Inventor: Atsushi Iga, Takatsuki, Japan
[73] Assignee: Matsushita Electric Industrial Co., Ltd., Osaka, Japan
[21] Appl. No.: 582,223
[22] PCT Filed: Mar. 20, 1990
[86] PCT No.: PCT/JP90/00377
   § 371 Date: Aug. 5, 1991
   § 102(e) Date: Aug. 5, 1991
[87] PCT Pub. No.: WO90/12410
   PCT Pub. Date: Oct. 18, 1990

[30] Foreign Application Priority Data

Apr. 4, 1989 [JP] Japan .................. 1-85445
May 18, 1989 [JP] Japan .................. 1-124867

[51] Int. Cl.5 .................. H01G 7/00; H01G 4/06
[52] U.S. Cl. .................. 29/25.03; 29/25.42; 252/520; 252/521; 361/311; 361/321.5
[58] Field of Search .................. 29/25.03, 25.42; 361/311, 321; 252/520

[56] References Cited

U.S. PATENT DOCUMENTS

| | | | |
|---|---|---|---|
| 3,872,360 | 3/1975 | Sheard | 361/311 |
| 4,403,236 | 9/1983 | Mandai et al. | 252/520 |
| 4,607,314 | 8/1986 | Wada et al. | 252/520 |
| 5,014,158 | 5/1991 | Nishimura et al. | 361/321 |
| 5,166,859 | 11/1992 | Ueno et al. | 29/25.42 |

FOREIGN PATENT DOCUMENTS 157276 10/1985 European Pat. Off. .
0255072 2/1988 European Pat. Off. .

Primary Examiner—Olik Chaudhuri
Assistant Examiner—Ramamohan Rao Paladugu
Attorney, Agent, or Firm—Panitch Schwarze Jacobs & Nadel

[57] ABSTRACT

The elements of the present invention are used for circuits in electronic devices and the objective is to absorb the noises and surges occurring in the circuits. In order to achieve the above objective, the present invention discloses a method for manufacturing a ceramic capacitor having varistor characteristics comprising the steps of; adding a sintering accelerant mainly forming a liquid phase at a high temperature, a semiconducting accelerant that can form a solid solution with perovskite type oxides, a control agent to control the grain growth for porous sintering and a forming agent to form a grain boundary depletion layer which also functions as a control agent to control the grain growth, to perovskite type oxides powder made of the materials of $SrTiO_3$ as a main component, mixing and forming followed by sintering to a porous body; being made semiconductive by reduction and diffusing oxygen and oxidizing the forming agent to form a grain boundary depletion layer in the oxidizing atmosphere so as to form a barrier in the grain boundary and electrodes, thereby having excellent ability to absorb the above noises and surges.

16 Claims, 1 Drawing Sheet

METHOD FOR MANUFACTURING A CERAMIC CAPACITOR HAVING VARISTOR CHARACTERISTICS

TECHNICAL FIELD

This invention relates to a method for manufacturing a ceramic capacitor having varistor characteristics used in electronic devices or the like.

BACKGROUND ART

It is known that a capacitor element body with a very large apparent dielectric constant compared with a conventional ceramic dielectric can be obtained by insulating the crystal grain boundaries in a ceramic oxide semiconductor such as $SrTiO_3$. It is also known that in a varistor where the current rises suddenly at threshold voltage can be obtained by forming electrodes on the element body. These elements are widely used for the circuits in electronic devices or the like to absorb noises. That is, low noise level of the element is advantageous in the application of it as a circuit element mounted with a capacitor while it can be used as a varistor to absorb large surge current.

For example, materials with large apparent dielectric constant of 2,000 to 100,000 are used as materials for a ceramic capacitor of grain boundary barrier type obtained by the following steps; diffusing cupric oxide (CuO) and bismuth trioxide ($Bi_2O_3$) from the surface of the sintered body into a grain boundary of polycristalline ceramic semiconductor composed of $SrTiO_3$ as a main component formed by adding $Nb_2O_5$ and $TiO_2$-$Al_2O_3$-$SiO_2$ compound and sintered in a reducing atmosphere, and forming a resistance layer in a grain boundary by forming a depletion layer in the crystal grain boundaries. The functions of CuO and $Bi_2O_3$ as are often used as diffusion materials in a conventional manufacturing method are as follows: CuO containing sufficient oxygen forms a electron trap center in an crystal grain boundaries of the sintered body and traps electrons existing near the crystal grain boundaries of n-type semiconductor $SrTiO_3$, thereby forming a depletion layer near the grain boundary where electrons do not exist. A capacitor is composed of the materials for a ceramic capacitor of grain boundary barrier type, charging electric loads on both sides of the insulated depletion layer thus formed.

On the other hand, it is known that varistor characteristics which raise the current suddenly at the threshold voltage or more appear when Na oxide or the like is added to a diffused material, $Bi_2O_3$. This threshold voltage is also called the varistor voltage and is defined as the voltage that the current of 1 mA flows through varistor elements when a voltage is applied.

In the materials for the aforementioned ceramic capacitor of grain boundary barrier type, the apparent dielectric constant of the sintered body is approximately the value that the dielectric constant of $SrTiO_3$ (approximately 200) is multiplied by the ratio of the grain diameter of $SrTiO_3$ in the sintered body to the thickness of said grain boundary depletion layer (grain diameter / the thickness of grain boundary depletion layer). A typical thickness of the grain boundary depletion layer of the $SrTiO_3$ sintered body is about 0.2 $\mu m$. The standards of apparent dielectric constant are 2,000, 20,000, 200,000 corresponding to the grain diameters of the $SrTiO_3$ sintered body of 2 $\mu m$, 20 $\mu m$, and 200 $\mu m$, respectively.

$Bi_2O_3$ which is added to form a barrier in a grain boundary is known as a good conductor of oxygen when $Bi_2O_3$ is a $\beta$-$Bi_2O_3$ and $\delta$-$Bi_2O_3$ phase. When the surface of the sintered body is coated with $Bi_2O_3$ and heat-treated, $Bi_2O_3$ is first diffused along the grain boundary of the sintered body and then oxygen is transported by diffusion from outside to the inner portion of the sintered body along $Bi_2O_3$ existing in the grain boundary. $Bi_2O_3$ works to supply necessary oxygen to form the grain boundary depletion layer. This grain boundary barrier type of ceramic varistor having a high electrostatic capacitance displays excellent electrostatic capacitance and temperature characteristics and provides wide application fields in the industrial fields.

The aforementioned ceramic varistor having a high electrostatic capacitance of grain boundary barrier type is manufactured by the following steps; generally sintering is carried out at a high temperature so as to make the crystal grains in the sintered body as large as possible, by coating the sintered body with pasted cupric oxide and bismuth trioxide, etc. containing sodium oxide, followed by the heat treatment so as to diffuse such oxides as $Bi_2O_3$, CuO, NaO into the inner portion of the sintered body and oxidize it.

When a ceramic capacitor with varistor characteristics having a high capacitance is manufactured by the method mentioned above it is required to uniformly diffuse $Bi_2O_3$, $Na_2O$ and CuO or the like from the surface of the sintered body into the inner portion thereof during the process. Nonuniform coating of diffused materials or the like is prone to cause variation in characteristics and, further, it is difficult to diffuse enough $Bi_2O_3$, $Na_2O$ and CuO or the like into the inner portion of the sintered body when it is thick, which causes problems such as limitation of the element size.

In addition, in a grain boundary barrier type ceramic varistor with large electrostatic capacitance, it is electrically required to have uniform characteristics and stability of characteristics against high voltage pulses, therefore a uniform material composition is required.

The present invention has an objective to provide a ceramic capacitor having varistor characteristics which solves these problems.

DISCLOSURE OF THE INVENTION

A ceramic capacitor having varistor characteristics of the present invention, which solved the aforementioned problems, is manufactured by the steps comprising; adding a sintering accelerant, a semiconducting accelerant, a control agent, and a forming agent to perovskite type oxides powder made of $SrTiO_3$ as a main component, mixing and forming followed by sintering to a porous body; being made semiconductive by reduction and diffusing oxygen and oxidizing the forming agent to form a grain boundary depletion layer in the oxidizing atmosphere so as to form a barrier in the grain boundary and electrodes, wherein said sintering accelerant mainly forms a liquid phase at a high temperature, said semiconducting accelerant can form a solid solution with perovskite type oxides, said control agent controls the grain growth for porous sintering, and said forming agent forms a grain boundary depletion layer which also functions as a control agent to control the grain growth.

As mentioned above, in a conventional method, a capacitor was manufactured by coating the outer surface of the sintered body which was made semiconductive with $Bi_2O_3$ or the like, and heat-treating the sintered body in the oxidizing atmosphere so as to diffuse $Bi_2O_3$ and oxygen in the whole body, oxidize the crystal grain boundaries to form the depletion layer in the grain boundary. However, the feature of the present invention is to manufacture a capacitor by a special sintering method to form fine porosities along a triple point of crystallite in the sintered body and diffuse oxygen along the porosities in the heat treatment in the oxidizing atmosphere so as to oxidize the grain boundary and form the depletion layer.

One of the important points of the present invention is to form fine porosities along the triple point of crystallite, which is made possible by a sensitive interaction between the sintering accelerant and the a control agent to control the grain growth.

As mentioned above, according to the manufacturing method of the present invention, a uniform porous body can be obtained without complicated processes of coating and diffusing $Bi_2O_3$ or the like, and, moreover, the size of the porous body is not subject to any particular restriction.

BRIEF DESCRIPTIONS OF THE DRAWINGS

Figure 2:
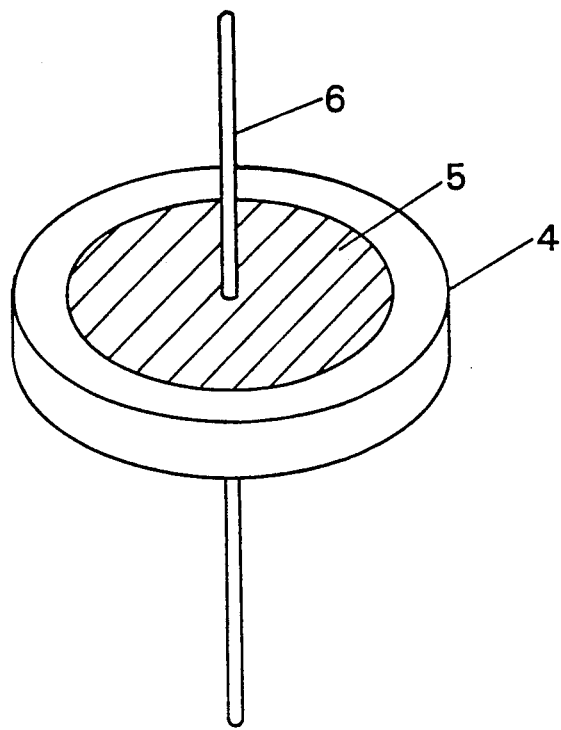

FIG. 1 is a schematic diagram showing a laminated ceramic capacitor having varistor characteristics according to an example of the present invention and FIG. 2 is a schematic diagram of a ceramic capacitor having varistor characteristics according to another example of the present invention.

BEST MODE FOR CARRYING OUT THE INVENTION

The outline of the present invention will now be described.

A sintering accelerant mainly forming a liquid phase at a high temperature, a semiconducting accelerant which can form a solid solution with perovskite type oxides, a control agent to control the grain growth for porous sintering, and a forming agent to form a grain boundary depletion layer which also functions as a control agent to control the grain growth are added to and mixed with perovskite type oxides powder made of the materials of $SrTiO_3$ as a main component followed by the pressure molding. When they are calcinated to reduce in the air, or sintered in the reducing atmosphere at a high temperature, the sintering accelerant mainly forming a liquid phase at a high temperature accelerates the reaction between the forming agent to form a grain boundary depletion layer which also functions as a control agent to control the grain growth, the semiconducting accelerant and perovskite type oxides powder made of $SrTiO_3$ as a main component so as to form the solid solution therebetween. The control agent to control the grain growth controls the growth of crystals and make the sintered body porous. The $SrTiO_3$ main component phase loses some oxygen by the reduction and becomes a n-type semiconducting substance, reacting with a semiconducting accelerant.

When the sintered body thus obtained is heat-treated in the oxidizing atmosphere, oxygen freely diffuses in the fine porosities formed at the tripple grain junctions in the grain boundary. Oxides including copper, manganese, cobalt or the like deposited in the crystal grain boundaries are further oxidized by oxygen reached thereto. Consequently, electron trap centers composed of cupric oxide, manganese oxide, cobalt oxide or the like as a main component are formed in the grain boundary. These electron trap centers trap electrons from the grains in the low resistant n-type $SrTiO_3$ semiconductors formed by the reduction, therefore forming the depletion layer of carriers along the grain boundary. The depletion layer thus obtained has an excellent insulating characteristic and a capacitor with varistor characteristics having high capacitance is obtained when the voltage is applied to the sintered body and electric loads are charged on both sides of the insulated depletion. This manufacturing method does not require the processes to coat and diffuse $CuO$, $Bi_2O_3$ or the like after the sintered body is made semiconductive and a ceramic capacitor having varistor characteristic is readily provided.

FIG. 1 is a schematic diagram showing a laminated ceramic capacitor having varistor characteristics according to an example of the present invention comprising a ceramic capacitor having varistor characteristics 1, inner electrodes 2, an outer electrode 3. FIG. 2 is a schematic diagram of a ceramic capacitor having varistor characteristics according to another example of the present invention comprising a ceramic 4 with varistor characteristics having high capacitance, an electrode 5, and a lead line 6.

The specific examples of the present invention will be described hereinafter.

EXAMPLE 1

A sintering accelerant $TiO_2$-$Al_2O_3$-$SiO_2$ (ratio of 20:30:45 wt %) of 0.05 to 6.0 wt % mainly forming a liquid phase at a high temperature, a semiconducting accelerant $Nb_2O_5$ of 0.02 to 3.0 wt % which can form a solid solution with perovskite type oxides, a good oxygen conductive solid electrolyte $ZrO_2$ of 0.05 to 12.0 wt % which functions as a control agent to control the grain growth, and a forming agent $Sr(Cu_1Nb_{2/3})O_3$ (0.1 to 6.0 wt %) to form a grain boundary depletion layer which also functions as a control agent to control the grain growth were added to strontium titanat ($SrTiO_3$) obtained by pyrolyzing titanyl strontium oxalate ($SrTiO(C_2O_4)_2 \cdot 4H_2O$) and mixed well followed by calcination at 900° C. Then it was ground in a wet state followed by drying, making the grain, and molding, sintering at 1300° C. in the air. It was re-ground in a wet state, made into paste using resin and organic solutions so as to form a sheet, printed platinum paste for inner electrodes were laminated thereon, sintered at 1400° C. in the air followed by the hydrogen reduction at 1300° C., and heat-treated at 950° C. in the air. Finally, electrodes were adjusted so as to connect inner electrodes with outer electrodes, thereby completing the manufacture of a laminated ceramic capacitor having grain boundary varistor characteristics of FIG. 1. Electric characteristics of the laminated ceramic capacitor were measured and the results are shown in Table 1. The sintering accelerant $TiO_2$—$Al_2O_3$—$SiO_2$ (ratio of 20:30:45 wt %) was obtained by weighing commercial $TiO_2$—$Al_2O_3$—$SiO_2$ powder according to the predetermined weight ratio, mixing, calcinating at 1200° C., and grinding. The forming agent $Sr(Cu_1Nb_{2/3})O_3$ to form a grain boundary depletion layer which also functions as a control agent to control the grain growth was obtained by mixing commercial $SrCO_3$, $Nb_2O_5$, $CuO$ or the like, calcinating at 1000° C., and grinding.

The size of the varistor after sintering was approximately 4 mm square and about 0.6 mm in thickness and composed of 8 layers of the dielectrics each of which was about 70 μm in thickness. The apparent dielectric constant ε was calculated from the value of the capacitance (measurement 1 kHz) of the laminated varistor. The grain diameter in the sintered body was obtained by examining a cross section after polishing under an optical microscope, to the surface of which $Bi_2O_3$ series metallic soap was applied and heat-treated at 1000° C. to make the grain boundary clear.

EXAMPLE 2)

A sintering accelerant of 1.0 wt % selected from $TiO_2$—MgO—$SiO_2$ series (for example, ratio of 30:30:40 wt %), $TiO_2$—MnO—$SiO_2$ series (for example, ratio of 10:50:40 wt %), $TiO_2$—$Al_2O_3$—$SiO_2$ series (for example, ratio of 20:35:45 wt %) mainly forming a liquid phase at a high temperature, a semiconducting acceler-

TABLE 1

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/3}Nb_{2/3})O_3$ (wt %) | solid electrolyte which functions as a control agent to control the grain growth $ZrO_2$ (wt %) | mean grain diameter (μm) | ε | tan δ (%) | rising voltage $V_1$mA (V/mm) | α |
|---|---|---|---|---|---|---|---|---|
| 0.05 | 0.2 | 0.5 | 0.8 | 2.5 | 3200 | 9.5 | 440 | 4.5 |
| 0.1 | 0.2 | 0.5 | 0.8 | 6.5 | 7300 | 1.7 | 450 | 12 |
| 0.5 | 0.2 | 0.5 | 0.8 | 7.0 | 7500 | 0.9 | 400 | 12 |
| 1.0 | 0.2 | 0.5 | 0.8 | 7.5 | 8300 | 0.9 | 3800 | 11 |
| 3.0 | 0.2 | 0.5 | 0.8 | 6.5 | 7400 | 1.0 | 430 | 11 |
| 5.0 | 0.2 | 0.5 | 0.8 | 7.5 | 8200 | 0.9 | 360 | 11 |
| 6.0 | 0.2 | 0.5 | 0.8 | 7.5 | 8100 | 0.8 | 350 | 12 |
| 1.0 | 0.02 | 0.5 | 0.8 | 6.0 | 7200 | 35.0 | 230 | 4.5 |
| 1.0 | 0.05 | 0.5 | 0.8 | 7.0 | 7600 | 1.6 | 430 | 11 |
| 1.0 | 0.5 | 0.5 | 0.8 | 7.0 | 7500 | 0.7 | 390 | 12 |
| 1.0 | 2.0 | 0.5 | 0.8 | 6.5 | 7200 | 1.8 | 450 | 11 |
| 1.0 | 3.0 | 0.5 | 0.8 | 4.0 | 6200 | 15.0 | 380 | 4.0 |
| 1.0 | 0.2 | 0.1 | 0.8 | 5.0 | 6900 | 9.9 | 250 | 3.0 |
| 1.0 | 0.2 | 0.2 | 0.8 | 7.5 | 8100 | 1.3 | 380 | 12 |
| 1.0 | 0.2 | 0.5 | 0.8 | 7.5 | 8400 | 0.6 | 350 | 11 |
| 1.0 | 0.2 | 2.0 | 0.8 | 8.0 | 8800 | 0.8 | 350 | 11 |
| 1.0 | 0.2 | 4.0 | 0.8 | 7.5 | 8300 | 1.9 | 370 | 12 |
| 1.0 | 0.2 | 6.0 | 0.8 | 7.0 | 7500 | 14.1 | 210 | 4.0 |
| 1.0 | 0.2 | 0.5 | 0.05 | 7.0 | 4100 | 26.5 | 270 | 4.5 |
| 1.0 | 0.2 | 0.5 | 0.1 | 7.5 | 8300 | 1.8 | 380 | 12 |
| 1.0 | 0.2 | 0.5 | 1.0 | 8.0 | 8600 | 0.9 | 340 | 12 |
| 1.0 | 0.2 | 0.5 | 5.0 | 8.0 | 8700 | 1.1 | 370 | 11 |
| 1.0 | 0.2 | 0.5 | 10.0 | 6.5 | 7300 | 1.6 | 430 | 11 |
| 1.0 | 0.2 | 0.5 | 12.0 | 5.5 | 6400 | 7.7 | 270 | 4.0 |

As is apparent from the results in Table 1, the present material obtained by adding to $SrTiO_3$ a sintering accelerant $TiO_2$—$Al_2O_3$—$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt %, and a forming agent $Sr(Cu_{1/3}Nb_{2/3})O_3$ of 0.2 to 4.0 wt % to form a grain boundary depletion layer which also functions as a control agent to control the grain growth and sintering has excellent varistor and dielectric characteristics with uniform grain diameter and can be used as a varistor with high electrostatic capacitance. According to a microscopic examination, the grain diameters of corpuscles in the sintered body was uniform and approximately 7 μm in thickness and the dielectric loss was 2.0% or less and the apparent dielectric constant was 7,000 or more. The rising voltage $V_1$ mA of the materials as a varistor was 300 to 500 V/mm and the resistance nonlinear exponent α is 10 or more in most cases between $V_1$ mA to $V_{0.1}$ mA. Other values such as withstanding-surge-current as a varistor, the ratio of limited voltage representing the resistance nonlinear exponent in high current area, the temperature coefficient of the riser voltage $V_1$ mA and capacitance were measured and sufficient values were obtained. When the amount of the sintering accelerant added exceeds 5%, the sintered body is prone to deform or adhere, therefore it is not practical.

ant $Y_2O_3$ of 0.04 wt % which can form a solid solution with perovskite type oxides, a good oxygen conductive solid electrolyte $ZrO_2$ of 0.2 to 8.0 wt % which functions as a control agent to control the grain growth, and a forming agent $Sr(Cu_{\frac{1}{3}}Nb_{2/3})O_3$ of 0.4 to 3.0 wt % to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molded into like a disk shape, sintered at 1380° C. in the reducing atmosphere composed of 95% of nitrogen and 5% of hydrogen. It was heat-treated at 950° C. in the air and silver electrodes were formed on both sides of the disk, thereby completing the manufacture of a ceramic capacitor having grain boundary varistor characteristics of FIG. 2. Electric characteristics of the laminated ceramic capacitor were measured and the results are shown in Table 2.

The sintering accelerant $TiO_2$-MgO-$SiO_2$ series (for example, ratio of 30:30:40 wt %) was obtained by weighing commercial $TiO_2$, MgO, $SiO_2$ powder according to the predetermined weight ratio, mixing, calcinating at 1200° C., and grinding. The forming agent $Sr(Cu_{\frac{1}{3}}Nb_{2/3})O_3$ to form a grain boundary depletion layer which also functions as a control agent to control the grain growth was obtained by mixing commercial $SrCO_3$, $Nb_2O_5$ and CuO, calcinating at 900° C., and grinding.

TABLE 2

| sintering accelerant (wt %) | semiconducting accelerant $Y_2O_3$ (wt %) | forming agent to form a grain boundary depletion layer which also functions as a control agent to control the grain growth $Sr(Cu_{1/3}Nb_{2/3})O_3$ (wt %) | solid electrolyte which functions as a control agent to control the grain growth $ZrO_2$ (wt %) | mean grain diameter (μm) | ε | tan δ (%) | $V_1mA$ (V/mm) | α |
|---|---|---|---|---|---|---|---|---|
| $TiO_2$—MgO—$SiO_2$ compound | | | | | | | | |
| 1.0 | 0.4 | 0.4 | 2.0 | 7.5 | 8400 | 1.6 | 380 | 13 |
| 1.0 | 0.4 | 3.0 | 2.0 | 6.5 | 7300 | 1.2 | 450 | 12 |
| 1.0 | 0.4 | 1.0 | 0.2 | 7.5 | 8100 | 1.5 | 400 | 11 |
| 1.0 | 0.4 | 1.0 | 8.0 | 7.5 | 8300 | 0.9 | 370 | 12 |
| $TiO_2$—MnO—$SiO_2$ compound | | | | | | | | |
| 1.0 | 0.4 | 0.4 | 2.0 | 7.0 | 7500 | 1.4 | 380 | 13 |
| 1.0 | 0.4 | 3.0 | 2.0 | 6.5 | 7200 | 1.1 | 470 | 13 |
| 1.0 | 0.4 | 1.0 | 0.2 | 7.0 | 7600 | 1.5 | 420 | 11 |
| 1.0 | 0.4 | 1.0 | 8.0 | 6.5 | 7400 | 0.9 | 440 | 12 |
| $TiO_2$—$Al_2O_3$—$SiO_2$ compound | | | | | | | | |
| 1.0 | 0.4 | 0.4 | 2.0 | 8.0 | 8600 | 1.7 | 360 | 11 |
| 1.0 | 0.4 | 3.0 | 2.0 | 8.5 | 9200 | 1.3 | 320 | 13 |
| 1.0 | 0.4 | 1.0 | 0.2 | 8.5 | 9300 | 1.2 | 340 | 11 |
| 1.0 | 0.4 | 1.0 | 8.0 | 8.0 | 8700 | 0.9 | 350 | 11 |

As is apparent from the results in Table 2, the present material obtained by adding $SrTiO_3$ to a sintering accelerant such as $TiO_2$—MgO—$SiO_2$ of 1.0 wt % mainly forming a liquid phase at a high temperature, a semiconducting accelerant $Y_2O_3$ of 0.4 wt %, a good oxygen conductive electrolyte $ZrO_2$ of 0.2 to 8.0 wt % which also functions as a control agent to control the grain growth, and a forming agent of 0.4 to 3.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 1.

EXAMPLE 3

A sintering accelerant of 3.0 wt % of $TiO_2$—MgO—$SiO_2$ series (for example, ratio of 0:30:40 wt %) mainly forming a liquid phase at a high temperature, semiconducting accelerants $WO_3$, $Nb_2O_5$, $La_2O_3$ and $Y_2O_3$ of 0.05 to 2.0 wt %, a good oxygen conductive solid electrolyte $ZrO_2$ of 1.5 wt % which functions as a control agent to control the grain growth, and a forming agent $Sr_{0.8}Ba_{0.1}Ca_{0.1}(Cu_{\frac{1}{3}}Nb_{2/3})O_3$ or $Sr_{0.6}Ba_{0.-}$ $_2Ca_{0.2}(Cu_{\frac{1}{3}}Nb_{2/3})O_3$ of 2.0 wt % to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molding, sintered at 380° C. in the reducing atmosphere composed of 95% of nitrogen and 5% of hydrogen. It was heat-treated at 1050° C. in the air and electrodes were formed, thereby completing the manufacture of a ceramic capacitor having grain boundary varistor characteristics of FIG. 2. Electric characteristics of the laminated ceramic capacitor were measured and the results are shown in Table 3.

The sintering accelerant $TiO_2$—MgO—$SiO_2$ series (ratio of 30:30:40 wt %) was obtained by weighing commercial $TiO_2$, MgO, $SiO_2$ powder according to the predetermined weight ratio, mixing, calcinating at 1200° C., and grinding. The forming agent to form a grain boundary depletion layer which also functions as a control agent to control the grain growth was obtained by mixing commercial $SrCO_3$, $BaCO_3$, $CaCO_3$, $Nb_2O_5$ and CuO, calcinating at 900° C., and grinding.

TABLE 3

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | ε | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Cu_{1/3}Nb_{2/3})O_3$ 2.0 | 1.5 | 7.5 | 8300 | 1.2 | 380 | 12 |
| 3.0 | $Nb_2O_5$ 0.05 | $Sr_{0.8}Ba_{0.1}Ca_{0.1}(Cu_{1/3}Nb_{2/3})O_3$ 2.0 | 1.5 | 7.0 | 7300 | 1.5 | 410 | 13 |
| 3.0 | $La_2O_3$ 0.05 | $Sr_{0.8}Ba_{0.1}Ca_{0.1}(Cu_{1/3}Nb_{2/3})O_3$ 2.0 | 1.5 | 6.5 | 7200 | 1.1 | 430 | 12 |
| 3.0 | $Y_2O_3$ 0.05 | $Sr_{0.8}Ba_{0.1}Ca_{0.1}(Cu_{1/3}Nb_{2/3})O_3$ 2.0 | 1.5 | 7.0 | 7400 | 1.2 | 420 | 13 |
| 3.0 | $WO_3$ 0.50 | $Sr_{0.6}Ba_{0.2}Ca_{0.2}(Cu_{1/3}Nb_{2/3})O_3$ 2.0 | 1.5 | 7.5 | 8400 | 1.4 | 370 | 13 |
| 3.0 | $Nb_2O_5$ 0.50 | $Sr_{0.6}Ba_{0.2}Ca_{0.2}(Cu_{1/3}Nb_{2/3})O_3$ 2.0 | 1.5 | 7.5 | 8300 | 1.0 | 390 | 13 |
| 3.0 | $La_2O_3$ 0.50 | $Sr_{0.6}Ba_{0.2}Ca_{0.2}(Cu_{1/3}Nb_{2/3})O_3$ 2.0 | 1.5 | 7.5 | 8200 | 1.4 | 380 | 13 |

TABLE 3-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | ε | tan δ (%) | $V_1$mA (V/mm) | α |
| --- | --- | --- | --- | --- | --- | --- | --- | --- |
| 3.0 | $Y_2O_3$ 0.50 | $Sr_{0.6}Ba_{0.2}Ca_{0.2}(Cu_{1/3}Nb_{2/3})O_3$ 2.0 | 1.5 | 7.5 | 8400 | 1.1 | 390 | 12 |
| 3.0 | $WO_3$ 2.0 | $Sr_{0.3}Ba_{0.1}Ca_{0.1}(Cu_{1/3}Nb_{2/3})O_3$ 2.0 | 1.5 | 7.0 | 7500 | 1.7 | 400 | 11 |
| 3.0 | $Nb_2O_5$ 2.0 | $Sr_{0.8}Ba_{0.1}Ca_{0.1}(Cu_{1/3}Nb_{2/3})O_3$ 2.0 | 1.5 | 6.5 | 7100 | 1.8 | 450 | 12 |
| 3.0 | $La_2O_3$ 2.0 | $Sr_{0.8}Ba_{0.1}Ca_{0.1}(Cu_{1/3}Nb_{2/3})O_3$ 2.0 | 1.5 | 6.5 | 7300 | 1.6 | 420 | 11 |
| 3.0 | $Y_2O_3$ 2.0 | $Sr_{0.8}Ba_{0.1}Ca_{0.1}(Cu_{1/3}Nb_{2/3})O_3$ 2.0 | 1.5 | 7.0 | 7300 | 1.7 | 410 | 11 |

As is apparent from the results in Table 3, the present material obtained by adding $SrTiO_3$ to a sintering accelerant such as $TiO_2$—MgO—$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 1.

EXAMPLE 4

A capacitor was manufactured according to the method in Example 1 including the manufacturing method for other materials, sintering accelerant or the like, except that the forming agent $Sr(Cu_{\frac{1}{3}}Ta_{2/3})O_3$ (0.1 to 0.6 wt %) was used instead of the forming agent $Sr(Cu_{\frac{1}{3}}Nb_{2/3})O_3$ (0.1 to 0.6 wt %) to form a grain boundary depletion and electric characteristics thereof were measured in the same method as Example 1 and the results are shown in Table 4.

The forming agent $Sr(Cu_{\frac{1}{3}}Ta_{2/3})O_3$ to form a grain boundary depletion which also functions as a control agent to control the grain growth was obtained by mixing commercial $SrCO_3$, $Ta_2O_5$, and CuO, sintering at 1000° C. and grinding.

TABLE 4

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/3}Ta_{2/3})O_3$ (wt %) | solid electrolyte which functions as a control agent to control the grain growth $ZrO_2$ (wt %) | mean grain diameter (μm) | ε | tan δ (%) | rising voltage $V_1$mA (V/mm) | α |
| --- | --- | --- | --- | --- | --- | --- | --- | --- |
| 0.05 | 0.2 | 0.5 | 0.8 | 2.5 | 3100 | 7.4 | 370 | 7.5 |
| 0.1 | 0.2 | 0.5 | 0.8 | 6.0 | 7100 | 1.7 | 490 | 12 |
| 0.5 | 0.2 | 0.5 | 0.8 | 6.5 | 7300 | 1.8 | 460 | 11 |
| 1.0 | 0.2 | 0.5 | 0.8 | 6.5 | 7400 | 1.1 | 440 | 12 |
| 3.0 | 0.2 | 0.5 | 0.8 | 6.5 | 7300 | 0.8 | 450 | 11 |
| 5.0 | 0.2 | 0.5 | 0.8 | 7.0 | 7500 | 1.6 | 420 | 12 |
| 6.0 | 0.2 | 0.5 | 0.8 | 7.5 | 8200 | 1.4 | 380 | 12 |
| 1.0 | 0.02 | 0.5 | 0.8 | 7.5 | 5500 | 28.0 | 250 | 6.5 |
| 1.0 | 0.05 | 0.5 | 0.8 | 6.5 | 7300 | 1.8 | 470 | 11 |
| 1.0 | 0.5 | 0.5 | 0.8 | 7.5 | 8100 | 0.9 | 370 | 12 |
| 1.0 | 2.0 | 0.5 | 0.8 | 7.0 | 7600 | 1.7 | 430 | 11 |
| 1.0 | 3.0 | 0.5 | 0.8 | 4.5 | 5800 | 25.9 | 320 | 7.0 |
| 1.0 | 0.2 | 0.1 | 0.8 | 5.0 | 6000 | 8.4 | 310 | 6.0 |
| 1.0 | 0.2 | 0.2 | 0.8 | 6.5 | 7200 | 1.5 | 470 | 12 |
| 1.0 | 0.2 | 1.0 | 0.8 | 7.5 | 8300 | 0.7 | 380 | 12 |
| 1.0 | 0.2 | 2.0 | 0.8 | 7.0 | 7400 | 0.6 | 390 | 12 |
| 1.0 | 0.2 | 5.0 | 0.8 | 6.5 | 7400 | 1.6 | 430 | 11 |
| 1.0 | 0.2 | 6.0 | 0.8 | 6.0 | 6100 | 18.1 | 290 | 6.0 |
| 1.0 | 0.2 | 0.5 | 0.05 | 4.5 | 3500 | 31.4 | 200 | 4.5 |
| 1.0 | 0.2 | 0.5 | 0.1 | 6.5 | 7200 | 1.5 | 450 | 11 |
| 1.0 | 0.2 | 0.5 | 1.0 | 7.0 | 7700 | 0.7 | 420 | 11 |
| 1.0 | 0.2 | 0.5 | 3.0 | 7.0 | 7500 | 1.0 | 390 | 12 |
| 1.0 | 0.2 | 0.5 | 10.0 | 6.5 | 7800 | 1.8 | 440 | 11.0 |
| 1.0 | 0.2 | 0.5 | 12.0 | 5.5 | 6200 | 14.5 | 270 | 7.5 |

As is apparent from the results in Table 4, the present material obtained by adding $SrTiO_3$ to a sintering accelerant $TiO_2$—$Al_2O_3$—$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt %, and a forming agent $Sr(Cu_{\frac{1}{3}}Ta_{2/3})O_3$ of 0.2 to 5.0 wt % to form a grain boundary depletion layer which also functions as a control agent to control the grain growth and sintering has excellent varistor and dielectric characteristics with uniform grain diameter and can be used as a varistor with high electrostatic capacitance. According to a microscopic examination, the grain diameters of corpuscles in the sintered body were uniform and the mean grain diameter was approximately 6.0 to 7.0 μm and the dielectric loss was 20% or less and the apparent dielectric constant was 7000 or more.

The riser voltage $V_1$ mA of the materials as a varistor was 350 to 500 V/mm and the resistance non-linearity coeffecient $\alpha$ is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 5

A capacitor was manufactured according to the method in Example 2 including the manufacturing method for other materials, sintering accelerant or the like, except that the forming agent $Sr(Cu_{\frac{1}{3}}Ta_{\frac{2}{3}})O_3$ (0.4 to 4.0 wt %) was used instead of the forming agent $Sr(Cu_{\frac{1}{3}}Nb_{\frac{2}{3}})O_3$ (0.4 to 3.0 wt %) to form a grain boundary depletion and electric characteristics thereof were measured by the same method as Example 2 and the results are shown in Table 5. The forming agent $Sr(Cu_{\frac{1}{3}}Ta_{2/3})O_3$ to form a grain boundary depletion which also functions as a control agent to control the grain growth was obtained by mixing commercial $SrCO_3$, $Ta_2O_5$, and $CuO$, sintering at 900° C. and grinding.

As is apparent from the results in Table 5, the present material obtained by adding $SrTiO_3$ to a sintering accelerant such as $TiO_2$—$MgO$—$SiO_2$ of 1.0 wt % mainly forming a liquid phase at a high temperature, a semiconducting accelerant $Y_2O_3$ of 0.4 wt %, a good oxygen conductive solid electrolyte $ZrO_2$ of 0.2 to 8.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 4.

EXAMPLE 6

The forming agent $Sr_{0.8}Ba_{0.1}Ca_{0.1}(Cu_{\frac{1}{3}}Ta_{\frac{2}{3}})O_3$ or $Sr_{0.6}Ba_{0.2}Ca_{0.2}(Cu_{\frac{1}{3}}Ta_{\frac{2}{3}})O_3$ of 2.0 wt % was added instead of the forming agent $Sr_{0.8}Ba_{0.1}Ca_{0.1}(Cu_{\frac{1}{3}}Nb_{2/3})O_3$ or $Sr_{0.6}Ba_{0.2}Ca_{0.2}(Cu_{\frac{1}{3}}Nb_{2/3})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $Ta_2O_5$, and $CuO$, sintering at 900° C. and grinding.

The manufacturing method for other materials, sintering accelerant or the like, was the same as Example 3 and electric characteristics thereof were measured in the same method as Example 3 and the results are shown in Table 6.

TABLE 5

| sintering accelerant (wt %) | semiconducting accelerant $Y_2O_3$ (wt %) | forming agent to form a grain boundary depletion layer which also functions as a control agent to control the grain growth $Sr(Cu_{1/3}Ta_{2/3})O_3$ (wt %) | solid electrolyte which functions as a control agent to control the grain growth $ZrO_2$ (wt %) | mean grain diameter (μm) | $\epsilon$ | tan δ (%) | $V_1$mA (V/mm) | $\alpha$ |
|---|---|---|---|---|---|---|---|---|
| $TiO_2$—$MgO$—$SiO_2$ compound | | | | | | | | |
| 1.0 | 0.4 | 0.4 | 2.0 | 6.0 | 7100 | 1.8 | 480 | 13 |
| 1.0 | 0.4 | 4.0 | 2.0 | 6.0 | 7200 | 1.1 | 490 | 12 |
| 1.0 | 0.4 | 1.0 | 0.2 | 6.0 | 7200 | 1.7 | 490 | 12 |
| 1.0 | 0.4 | 1.0 | 8.0 | 6.5 | 7300 | 1.0 | 470 | 11 |
| $TiO_2$—$MnO$—$SiO_2$ compound | | | | | | | | |
| 1.0 | 0.4 | 0.4 | 2.0 | 6.0 | 7100 | 1.7 | 490 | 13 |
| 1.0 | 0.4 | 4.0 | 2.0 | 6.5 | 7100 | 1.2 | 450 | 12 |
| 1.0 | 0.4 | 1.0 | 0.2 | 6.5 | 7300 | 1.9 | 440 | 13 |
| 1.0 | 0.4 | 1.0 | 8.0 | 7.0 | 7500 | 1.2 | 420 | 12 |
| $TiO_2$—$Al_2O_3$—$SiO_2$ compound | | | | | | | | |
| 1.0 | 0.4 | 0.4 | 2.0 | 6.5 | 7200 | 1.8 | 460 | 13 |
| 1.0 | 0.4 | 4.0 | 2.0 | 7.0 | 7400 | 1.2 | 400 | 12 |
| 1.0 | 0.4 | 1.0 | 0.2 | 7.0 | 7600 | 1.8 | 410 | 11 |
| 1.0 | 0.4 | 1.0 | 8.0 | 6.5 | 7400 | 0.9 | 450 | 12 |

TABLE 6

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | $\epsilon$ | tan δ (%) | $V_1$mA (V/mm) | $\alpha$ |
|---|---|---|---|---|---|---|---|---|
| 3.0 | $WO_3$ 0.05 | $Sr_{0.8}Ba_{0.1}Ca_{0.1}(Cu_{1/3}Ta_{2/3})O_3$ 2.0 | 1.5 | 7.5 | 8300 | 0.8 | 380 | 11 |
| 3.0 | $Nb_2O_5$ 0.05 | $Sr_{0.8}Ba_{0.1}Ca_{0.1}(Cu_{1/3}Ta_{2/3})O_3$ 2.0 | 1.5 | 6.5 | 7300 | 0.9 | 470 | 12 |
| 3.0 | $La_2O_3$ | $Sr_{0.8}Ba_{0.1}Ca_{0.1}$ | 1.5 | 6.0 | 7100 | 1.0 | 490 | 12 |

TABLE 6-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | $\epsilon$ | tan δ (%) | $V_1$mA (V/mm) | α |
|---|---|---|---|---|---|---|---|---|
| 3.0 | $Y_2O_3$ 0.05 | $Sr_{0.8}Ba_{0.1}Ca_{0.1}(Cu_{1/3}Ta_{2/3})O_3$ 2.0 | 1.5 | 6.5 | 7300 | 1.1 | 460 | 11 |
| 3.0 | $WO_3$ 0.50 | $Sr_{0.6}Ba_{0.2}Ca_{0.2}(Cu_{1/3}Ta_{2/3})O_3$ 2.0 | 1.5 | 7.0 | 7500 | 1.8 | 420 | 13 |
| 3.0 | $Nb_2O_5$ 0.50 | $Sr_{0.6}Ba_{0.2}Ca_{0.2}(Cu_{1/3}Ta_{2/3})O_3$ 2.0 | 1.5 | 6.5 | 7200 | 1.0 | 440 | 12 |
| 3.0 | $La_2O_3$ 0.50 | $Sr_{0.6}Ba_{0.2}Ca_{0.2}(Cu_{1/3}Ta_{2/3})O_3$ 2.0 | 1.5 | 6.5 | 7400 | 1.3 | 460 | 13 |
| 3.0 | $Y_2O_3$ 0.50 | $Sr_{0.6}Ba_{0.2}Ca_{0.2}(Cu_{1/3}Ta_{2/3})O_3$ 2.0 | 1.5 | 6.5 | 7200 | 1.1 | 470 | 13 |
| 3.0 | $WO_3$ 2.0 | $Sr_{0.8}Ba_{0.1}Ca_{0.1}(Cu_{1/3}Ta_{2/3})O_3$ 2.0 | 1.5 | 7.0 | 7600 | 1.6 | 410 | 11 |
| 3.0 | $Nb_2O_5$ 2.0 | $Sr_{0.8}Ba_{0.1}Ca_{0.1}(Cu_{1/3}Ta_{2/3})O_3$ 2.0 | 1.5 | 6.5 | 7300 | 1.7 | 460 | 11 |
| 3.0 | $La_2O_3$ 2.0 | $Sr_{0.8}Ba_{0.1}Ca_{0.1}(Cu_{1/3}Ta_{2/3})O_3$ 2.0 | 1.5 | 6.0 | 7100 | 1.8 | 480 | 12 |
| 3.0 | $Y_2O_3$ 2.0 | $Sr_{0.8}Ba_{0.1}Ca_{0.1}(Cu_{1/3}Ta_{2/3})O_3$ 2.0 | 1.5 | 6.0 | 7200 | 1.8 | 490 | 11 |

As is apparent from the results in Table 6, the present material obtained by adding $SrTiO_3$ to a sintering accelerant such as $TiO_2$-MgO-$SiO_2$ series of 3.0 wt %, a semiconducting accelerant of 0.05 to 2.0 wt %, a solid electrolyte $ZrO_2$ of 2.0 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 4.

EXAMPLE 7

The forming agent $Sr(Co_{\frac{1}{3}}Nb_{2/3})O_3$ (0.1 to 8.0 wt %) was added instead of the forming agent $Sr(Cu_{\frac{1}{3}}Nb_{2/3})O_3$ (0.1 to 6.0 wt %) to form a grain boundary depletion of Example 1. The manufacturing method for other materials, sintering accelerant or the like, was same as Example 1 and electric characteristics thereof were measured in the same method as Example 1 and the results are shown in Table 7. The forming agent to form a grain boundary depletion which also functions as a control agent to control the grain growth was obtained by mixing commercial $SrCO_3$, $Nb_2O_5$, and CuO, sintering at 1000° C. and grinding.

TABLE 7

| sintering accelerant $TiO_2$-$Al_2O_3$-$SiO_2$ compound (wt %) | semiconducting accelerant $Nb_2O_5$ (wt %) | forming agent to form a grain boundary depletion layer which also functions as a control agent to control the grain growth $Sr(Co_{1/3}Nb_{2/3})O_3$ (wt %) | solid electrolyte which functions as a control agent to control the grain growth $ZrO_2$ (wt %) | mean grain diameter (μm) | $\epsilon$ | tan δ (%) | rising voltage $V_1$mA (V/mm) | α |
|---|---|---|---|---|---|---|---|---|
| 0.05 | 0.2 | 0.5 | 0.8 | 2.5 | 3500 | 23.0 | 230 | 4.5 |
| 0.1 | 0.2 | 0.5 | 0.8 | 8.0 | 8700 | 2.3 | 320 | 11 |
| 0.5 | 0.2 | 0.5 | 0.8 | 8.5 | 9200 | 2.4 | 310 | 12 |
| 1.0 | 0.2 | 0.5 | 0.8 | 8.5 | 9100 | 2.1 | 320 | 12 |
| 3.0 | 0.2 | 0.5 | 0.8 | 8.0 | 8600 | 2.3 | 340 | 12 |
| 5.0 | 0.2 | 0.5 | 0.8 | 8.0 | 8700 | 2.1 | 340 | 11 |
| 6.0 | 0.2 | 0.5 | 0.8 | 8.5 | 9200 | 2.8 | 310 | 12 |
| 1.0 | 0.02 | 0.5 | 0.8 | 5.0 | 6100 | 31.0 | 170 | 3.0 |
| 1.0 | 0.05 | 0.5 | 0.8 | 7.5 | 8300 | 2.2 | 360 | 12 |
| 1.0 | 0.5 | 0.5 | 0.8 | 8.0 | 8700 | 2.6 | 350 | 11 |
| 1.0 | 2.0 | 0.5 | 0.8 | 8.5 | 9300 | 2.4 | 330 | 11 |
| 1.0 | 3.0 | 0.5 | 0.8 | 6.5 | 6100 | 22.5 | 190 | 3.5 |
| 1.0 | 0.2 | 0.1 | 0.8 | 7.0 | 6300 | 18.5 | 180 | 4.0 |
| 1.0 | 0.2 | 0.2 | 0.8 | 7.5 | 8400 | 2.3 | 370 | 11 |
| 1.0 | 0.2 | 0.5 | 0.8 | 8.0 | 8800 | 2.5 | 330 | 12 |
| 1.0 | 0.2 | 2.0 | 0.8 | 8.5 | 9200 | 2.4 | 320 | 12 |
| 1.0 | 0.2 | 6.0 | 0.8 | 8.0 | 8600 | 2.2 | 340 | 12 |
| 1.0 | 0.2 | 8.0 | 0.8 | 6.0 | 6200 | 12.5 | 220 | 4.5 |
| 1.0 | 0.2 | 0.5 | 0.05 | 6.5 | 6700 | 17.5 | 210 | 5.0 |
| 1.0 | 0.2 | 0.5 | 0.1 | 7.5 | 8200 | 2.5 | 350 | 12 |
| 1.0 | 0.2 | 0.5 | 1.0 | 8.5 | 9400 | 2.4 | 310 | 12 |
| 1.0 | 0.2 | 0.5 | 5.0 | 8.5 | 9600 | 2.6 | 320 | 12 |
| 1.0 | 0.2 | 0.5 | 10.0 | 8.0 | 8700 | 2.3 | 340 | 11 |
| 1.0 | 0.2 | 0.5 | 12.0 | 6.0 | 6600 | 18.0 | 230 | 6.5 |

As is apparent from the results in Table 7, the present material obtained by adding $SrTiO_3$ to a sintering accelerant $TiO_2$—$Al_2O_3$—$SiO_2$ of 0.1 to 5.0 wt %, a semiconducting accelerant $Nb_2O_3$ of 0.05 to 2.0 wt %, a solid electrolyte $ZrO_2$ 0.1 to 10.0 wt %, and a forming agent $Sr(Co_{\frac{1}{3}}Nb_{2/3})O_3$ of 0.2 to 6.0 wt % to form a grain boundary depletion layer which also functions as a control agent to control the grain growth and sintering has excellent varistor and dielectric characteristics with uniform grain diameter and can be used as a varistor with high electrostatic capacitance. According to a microscopic examination, the grain diameters of corpuscles in the sintered body were uniform and the mean grain diameter was approximately 8 μm and the dielectric loss was 3.0% or less and the apparent dielectric constant was 800,000 or more. The riser voltage $V_1$ mA of the materials as a varistor was 300 to 400 V/mm and the resistance non-linearity coefficent α is 10 or more in most cases between $V_1$ mA to $V_{0.1}$ mA. Other values such as surge durability as a varistor, the ratio of limited voltage representing the non-linearity resistive characteristics in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 8

The forming agent $Sr(Co_{\frac{1}{3}}Nb_{2/3})O_3$ (0.4 to 4.0 wt %) was added instead of the forming agent $Sr(Cu_{\frac{1}{3}}Nb_{2/3})O_3$ (0.4 to 3.0 wt %) to form a grain boundary depletion of Example 2. The manufacturing method for other materials, sintering accelerant or the like, was the same as Example 2 and electric characteristics thereof were measured by the same method as Example 2. The results are shown in Table 8.

The forming agent $Sr(Co_{\frac{1}{3}}Nb_{2/3})O_3$ to form a grain boundary depletion which also functions as a control agent to control the grain growth was obtained by mixing commercial $SrCO_3$, $Nb_2O_5$, and $CoO$, sintering at 900° C. and grinding.

TABLE 8

| sintering accelerant (wt %) | semiconducting accelerant $Y_2O_3$ (wt %) | forming agent to form a grain boundary depletion layer which also functions as a control agent to control the grain growth $Sr(Co_{1/3}Nb_{2/3})O_3$ (wt %) | solid electrolyte which functions as a control agent to control the grain growth $ZrO_2$ (wt %) | mean grain diameter (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |
| 1.0 | 0.4 | 0.4 | 2.0 | 8.5 | 9000 | 2.5 | 320 | 11 |
| 1.0 | 0.4 | 4.0 | 2.0 | 8.0 | 8600 | 2.3 | 340 | 11 |
| 1.0 | 0.4 | 1.0 | 0.2 | 8.5 | 9400 | 2.4 | 330 | 12 |
| 1.0 | 0.4 | 1.0 | 8.0 | 8.0 | 8800 | 2.2 | 350 | 12 |
| $TiO_2$—$MnO$—$SiO_2$ compound | | | | | | | | |
| 1.0 | 0.4 | 0.4 | 2.0 | 8.5 | 9300 | 2.6 | 320 | 11 |
| 1.0 | 0.4 | 4.0 | 2.0 | 7.5 | 8400 | 2.5 | 360 | 12 |
| 1.0 | 0.4 | 1.0 | 0.2 | 8.5 | 9300 | 2.6 | 310 | 11 |
| 1.0 | 0.4 | 1.0 | 8.0 | 8.0 | 8700 | 2.5 | 340 | 11 |
| $TiO_2$—$MgO$—$SiO_2$ compound | | | | | | | | |
| 1.0 | 0.4 | 0.4 | 2.0 | 8.0 | 8600 | 2.4 | 330 | 12 |
| 1.0 | 0.4 | 4.0 | 2.0 | 7.5 | 8300 | 2.4 | 370 | 11 |
| 1.0 | 0.4 | 1.0 | 0.2 | 8.5 | 9400 | 2.3 | 320 | 11 |
| 1.0 | 0.4 | 1.0 | 8.0 | 8.0 | 8800 | 2.6 | 350 | 12 |

As is apparent from the results in Table 8, the present material obtained by adding $SrTiO_3$ to a sintering accelerant such as $TiO_2$—$MgO$—$SiO_2$ of 1.0 wt % mainly forming a liquid phase at a high temperature, a semiconducting accelerant $Y_2O_3$ of 0.4 wt %, a good oxygen conductive solid electrolyte $ZrO$ of 0.2 to 8.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high electrostatic capacitance. The electric characteristics of the materials used in these devices are similar to those used in Example 7.

EXAMPLE 9

The forming agent $Sr_{0.6}Ba_{0.2}Ca_{0.2}(Co_{\frac{1}{3}}Nb_{2/3})O_3$ or $Sr_{0.8}Ba_{0.1}Ca_{0.1}(Co_{\frac{1}{3}}Nb_{2/3})O_3$ of 2.0 wt % was added instead of the forming agent $Sr_{0.8}Ba_{0.1}Ca_{0.1}(Cu_{\frac{1}{3}}Nb_{2/3})O_3$ or $Sr_{0.6}Ba_{0.2}Ca_{0.2}(Cu_{\frac{1}{3}}Nb_{2/3})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $Nb_2O_5$, and $CoO$, sintering at 900° C. and grinding. The manufacturing method for other materials, sintering accelerant or the like, was the same as Example 3 and electric characteristics thereof were measured by the same method as Example 3. The results are shown in Table 9.

TABLE 9

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | ε | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Co_{1/3}Nb_{2/3})O_3$ 2.0 | 1.5 | 8.0 | 8600 | 2.3 | 330 | 12 |
| 3.0 | $Nb_2O_5$ 0.05 | $Sr_{0.8}Ba_{0.1}Ca_{0.1}(Co_{1/3}Nb_{2/3})O_3$ 2.0 | 1.5 | 8.0 | 8800 | 2.1 | 340 | 11 |
| 3.0 | $La_2O_3$ 0.05 | $Sr_{0.8}Ba_{0.1}Ca_{0.1}(Co_{1/3}Nb_{2/3})O_3$ 2.0 | 1.5 | 7.5 | 8400 | 2.5 | 360 | 12 |
| 3.0 | $Y_2O_3$ 0.05 | $Sr_{0.8}Ba_{0.1}Ca_{0.1}(Co_{1/3}Nb_{2/3})O_3$ 2.0 | 1.5 | 8.5 | 9000 | 2.8 | 310 | 11 |
| 3.0 | $WO_3$ 0.50 | $Sr_{0.6}Ba_{0.2}Ca_{0.2}(Co_{1/3}Nb_{2/3})O_3$ 2.0 | 1.5 | 8.0 | 8500 | 2.4 | 330 | 12 |
| 3.0 | $Nb_2O_5$ 0.50 | $Sr_{0.6}Ba_{0.2}Ca_{0.2}(Co_{1/3}Nb_{2/3})O_3$ 2.0 | 1.5 | 8.5 | 9200 | 2.4 | 310 | 12 |
| 3.0 | $La_2O_3$ 0.50 | $Sr_{0.6}Ba_{0.2}Ca_{0.2}(Co_{1/3}Nb_{2/3})O_3$ 2.0 | 1.5 | 8.5 | 9100 | 2.2 | 320 | 12 |
| 3.0 | $Y_2O_3$ 0.50 | $Sr_{0.6}Ba_{0.2}Ca_{0.2}(Co_{1/3}Nb_{2/3})O_3$ 2.0 | 1.5 | 8.0 | 8800 | 2.3 | 350 | 11 |
| 3.0 | $WO_3$ 2.0 | $Sr_{0.8}Ba_{0.1}Ca_{0.1}(Co_{1/3}Nb_{2/3})O_3$ 2.0 | 1.5 | 7.5 | 8300 | 2.5 | 350 | 12 |
| 3.0 | $Nb_2O_5$ 2.0 | $Sr_{0.8}Ba_{0.1}Ca_{0.1}(Co_{1/3}Nb_{2/3})O_3$ 2.0 | 1.5 | 8.0 | 8700 | 2.5 | 320 | 12 |
| 3.0 | $La_2O_3$ 2.0 | $Sr_{0.8}Ba_{0.1}Ca_{0.1}(Co_{1/3}Nb_{2/3})O_3$ 2.0 | 1.5 | 7.5 | 8200 | 2.7 | 340 | 11 |
| 3.0 | $Y_2O_3$ 2.0 | $Sr_{0.8}Ba_{0.1}Ca_{0.1}(Co_{1/3}Nb_{2/3})O_3$ 2.0 | 1.5 | 8.0 | 8800 | 2.6 | 330 | 11 |

As is apparent from the results in Table 9, the present material obtained by adding $SrTiO_3$ to a sintering accelerant such as $TiO_2$—$MgO$—$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high electrostatic capacitance. The electric characteristics of the materials used in these devices are similar to those used in Example 7.

EXAMPLE 10

The forming agent $Sr(Co_{1/3}Ta_{2/3})O_3$ (0.1 to 8.0 wt %) was added instead of the forming agent $Sr(Cu_{1/3}Nb_{2/3})O_3$ (0.1 to 6.0 wt %) to form a grain boundary depletion of Example 1. The manufacturing method for other materials, sintering accelerant or the like, was the same as Example 1 and electric characteristics thereof were measured by the same method as Example 1. The results are shown in Table 10.

The forming agent $Sr(CO_{1/3}Ta_{2/3})O$ to form a grain boundary depletion which also functions as a control agent to control the grain growth was obtained by mixing commercial $SrCO_3$, $Ta_2O_5$, and $CoO$, sintering at 1000° C. and grinding.

TABLE 10

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/3}Ta_{2/3})O_3$ (wt %) | solid electrolyte which functions as a control agent to control the grain growth $ZrO_2$ (wt %) | mean grain diameter (μm) | ε | tan δ (%) | rising voltage $V_1mA$ (V/mm) | α |
|---|---|---|---|---|---|---|---|---|
| 0.05 | 0.2 | 0.5 | 0.8 | 3.0 | 3400 | 15.0 | 160 | 4.5 |
| 0.1 | 0.2 | 0.5 | 0.8 | 7.0 | 7600 | 1.2 | 380 | 13 |
| 0.5 | 0.2 | 0.5 | 0.8 | 7.5 | 8300 | 1.3 | 340 | 12 |
| 1.0 | 0.2 | 0.5 | 0.8 | 8.0 | 8700 | 1.1 | 310 | 12 |
| 3.0 | 0.2 | 0.5 | 0.8 | 8.0 | 8600 | 1.4 | 320 | 12 |
| 5.0 | 0.2 | 0.5 | 0.8 | 8.5 | 9100 | 1.8 | 310 | 13 |
| 6.0 | 0.2 | 0.5 | 0.8 | 8.5 | 9300 | 1.6 | 320 | 13 |
| 1.0 | 0.02 | 0.5 | 0.8 | 4.0 | 4800 | 45.0 | 150 | 4.0 |
| 1.0 | 0.05 | 0.5 | 0.8 | 7.0 | 7300 | 1.5 | 360 | 13 |
| 1.0 | 0.5 | 0.5 | 0.8 | 7.5 | 8400 | 1.6 | 340 | 12 |
| 1.0 | 2.0 | 0.5 | 0.8 | 8.0 | 8800 | 1.5 | 310 | 12 |
| 1.0 | 3.0 | 0.5 | 0.8 | 3.5 | 4000 | 18.5 | 240 | 5.5 |
| 1.0 | 0.2 | 0.1 | 0.8 | 9.0 | 6200 | 32.0 | 250 | 5.0 |
| 1.0 | 0.2 | 0.2 | 0.8 | 7.5 | 8100 | 1.4 | 360 | 13 |
| 1.0 | 0.2 | 0.5 | 0.8 | 8.0 | 8700 | 1.2 | 330 | 12 |
| 1.0 | 0.2 | 2.0 | 0.8 | 8.0 | 8900 | 1.8 | 320 | 13 |
| 1.0 | 0.2 | 7.0 | 0.8 | 8.5 | 9200 | 1.2 | 310 | 13 |
| 1.0 | 0.2 | 8.0 | 0.8 | 4.5 | 5200 | 12.5 | 180 | 5.5 |
| 1.0 | 0.2 | 0.5 | 0.05 | 7.5 | 6500 | 18.0 | 220 | 7.0 |
| 1.0 | 0.2 | 0.5 | 0.1 | 7.5 | 8300 | 1.8 | 350 | 13 |

TABLE 10-continued

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/3}Ta_{2/3})O_3$ (wt %) | solid electrolyte which functions as a control agent to control the grain growth $ZrO_2$ (wt %) | mean grain diameter (μm) | ε | tan δ (%) | rising voltage $V_1$mA (V/mm) | α |
| --- | --- | --- | --- | --- | --- | --- | --- | --- |
| 1.0 | 0.2 | 0.5 | 1.0 | 8.0 | 8300 | 1.4 | 330 | 12 |
| 1.0 | 0.2 | 0.5 | 5.0 | 7.5 | 8200 | 1.0 | 340 | 12 |
| 1.0 | 0.2 | 0.5 | 10.0 | 7.0 | 7500 | 1.5 | 360 | 13 |
| 1.0 | 0.2 | 0.5 | 12.0 | 6.0 | 6100 | 22.0 | 210 | 6.0 |

As is apparent from the results in Table 10, the present material obtained by adding $SrTiO_3$ to a sintering accelerant $TiO_2$—$Al_2O_3$—$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt%, and a forming agent $Sr(Co_{1/3}Ta_{2/3})O_3$ of 0.2 to 7.0 wt % to form a grain boundary depletion layer which also functions as a control agent to control the grain growth and sintering has excellent varistor and dielectric characteristics with uniform grain diameter and can be used as a varistor with high electrostatic capacitance. According to a microscopic examination, the grain diameters of corpuscles in the sintered body were uniform and the mean grain diameter was approximately 7.0 to 8.0 μm and the dielectric loss was 2.0% or less and the apparent dielectric constant was 7,000 or more. The riser voltage $V_1$ mA of the materials as a varistor was 300 to 400 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 11

The forming agent $Sr(Co_{1/3}Ta_{2/3})O_3$ (0.4 to 6.0 wt %) was added instead of the forming agent $Sr(Cu_{1/3}Nb_{2/3})O_3$ (0.4 to 3.0 wt %) to form a grain boundary depletion of Example 2. The manufacturing method for other materials, sintering accelerant or the like, was the same as Example 2 and electric characteristics thereof were measured by the same method as Example 2. The results are shown in Table 11.

The forming agent $Sr(Co_{1/3}Ta_{2/3})O_3$ to form a grain boundary depletion was obtained by mixing commercial $SrCO_3$, $Ta_2O_5$ and CoO sintering at 900° C. and grinding.

TABLE 11

| sintering accelerant (wt %) | semiconducting accelerant $Y_2O_3$ (wt %) | forming agent to form a grain boundary depletion layer which also functions as a control agent to control the grain growth $Sr(Co_{1/3}Ta_{2/3})O_3$ (wt %) | solid electrolyte which functions as a control agent to control the grain growth $ZrO_2$ (wt %) | mean grain diameter (μm) | ε | tan δ (%) | $V_1$mA (V/mm) | α |
| --- | --- | --- | --- | --- | --- | --- | --- | --- |
| $TiO_2$—$Al_2O_3$—$SiO_2$ compound | | | | | | | | |
| 1.0 | 0.4 | 0.4 | 2.0 | 8.5 | 9500 | 1.4 | 320 | 13 |
| 1.0 | 0.4 | 6.0 | 2.0 | 7.5 | 8300 | 1.5 | 360 | 12 |
| 1.0 | 0.4 | 1.0 | 0.2 | 8.0 | 8500 | 1.4 | 340 | 12 |
| 1.0 | 0.4 | 1.0 | 8.0 | 8.0 | 8700 | 1.7 | 330 | 13 |
| $TiO_2$—MnO—$SiO_2$ compound | | | | | | | | |
| 1.0 | 0.4 | 0.4 | 2.0 | 8.5 | 9100 | 1.4 | 320 | 12 |
| 1.0 | 0.4 | 6.0 | 2.0 | 8.0 | 8600 | 1.6 | 360 | 12 |
| 1.0 | 0.4 | 1.0 | 0.2 | 8.0 | 8800 | 1.5 | 330 | 13 |
| 1.0 | 0.4 | 1.0 | 8.0 | 7.5 | 8400 | 1.3 | 350 | 12 |
| $TiO_2$—MgO—$SiO_2$ compound | | | | | | | | |
| 1.0 | 0.4 | 0.4 | 2.0 | 8.5 | 9400 | 1.8 | 310 | 12 |
| 1.0 | 0.4 | 6.0 | 2.0 | 8.0 | 8600 | 1.6 | 340 | 12 |
| 1.0 | 0.4 | 1.0 | 0.2 | 8.5 | 9300 | 1.3 | 310 | 13 |
| 1.0 | 0.4 | 1.0 | 8.0 | 7.5 | 8100 | 1.7 | 350 | 12 |

As is apparent from the results in Table 11, the present material obtained by adding $SrTiO_3$ to a sintering accelerant such as $TiO_2$—MgO—$SiO_2$ of 1.0 wt % mainly forming a liquid phase at a high temperature, a semiconducting accelerant $Y_2O_3$ of 0.4 wt %, a good oxygen conductive solid electrolyte $ZrO_2$ of 0.2 to 8.0 wt % which also functions as a control agent to control the grain growth, and a forming agent of 0.4 to 6.0 wt % to form a grain boundary depletion layer which also functions as a control agent to control the grain growth and sintering has excellent varistor and dielectric characteristics and can be used as a varistor with high electrostatic capacitance. The electric characteristics of the materials used in these devices are similar to those used in Example 10.

EXAMPLE 12

The forming agent $Sr_{0.8}Ba_{0.1}Ca_{0.1}(Co_{\frac{1}{3}}Ta_{\frac{2}{3}})O_3$ or $Sr_{0.6}Ba_{0.2}Ca_{0.2}(Co_{\frac{1}{3}}Ta_{\frac{2}{3}})O_3$ of 2.0 wt % was added instead of the forming agent $Sr_{0.8}Ba_{0.1}Ca_{0.1}(Cu_{\frac{1}{3}}Nb_{\frac{2}{3}})O_3$ or $Sr_{0.60}Ba_{0.2}Ca_{0.2}(Cu_{\frac{1}{3}}Nb_{\frac{2}{3}})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $Ta_2O_5$, and CoO sintering at 900° C. and grinding.

The manufacturing method for other materials, sintering accelerant or the like, was the same as Example 3 and electric characteristics thereof were measured by the same method as Example 3 and the results are shown in Table 12.

control agent to control the grain growth, and a forming agent of 2.0 wt % to form a grain boundary depletion layer which also functions as a control agent to control the grain growth and sintering has excellent varistor and dielectric characteristics and can be used as a varistor with high electrostatic capacitance. The electric characteristics of the materials used in these devices are similar to those used in Example 10.

EXAMPLE 13

The forming agent $Sr(Cu_{\frac{1}{3}}W_{\frac{2}{3}})O_3$ (0.1 to 6.0 wt %) was added instead of the forming agent $Sr(Cu_{\frac{1}{3}}Nb_{\frac{2}{3}})O_3$ (0.1 to 6.0 wt %) to form a grain boundary depletion of Example 1. The manufacturing method for other materials, sintering accelerant or the like, was the same as Example 1 and electric characteristics thereof were measured by the same method as Example 1. The results

TABLE 12

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | ε | tan δ (%) | $V_1$mA (V/mm) | α |
|---|---|---|---|---|---|---|---|---|
| 3.0 | $WO_3$ 0.05 | $Sr_{0.8}Ba_{0.1}Ca_{0.1}(Co_{1/3}Ta_{2/3})O_3$ 2.0 | 1.5 | 8.5 | 9300 | 1.3 | 310 | 12 |
| 3.0 | $Nb_2O_5$ 0.05 | $Sr_{0.8}Ba_{0.1}Ca_{0.1}(Co_{1/3}Ta_{2/3})O_3$ 2.0 | 1.5 | 8.0 | 8800 | 1.2 | 330 | 13 |
| 3.0 | $La_2O_3$ 0.05 | $Sr_{0.8}Ba_{0.1}Ca_{0.1}(Co_{1/3}Ta_{2/3})O_3$ 2.0 | 1.5 | 7.5 | 8500 | 1.3 | 350 | 12 |
| 3.0 | $Y_2O_3$ 0.05 | $Sr_{0.8}Ba_{0.1}Ca_{0.1}(Co_{1/3}Ta_{2/3})O_3$ 2.0 | 1.5 | 8.0 | 8700 | 1.3 | 320 | 13 |
| 3.0 | $WO_3$ 0.50 | $Sr_{0.6}Ba_{0.2}Ca_{0.2}(Co_{1/3}Ta_{2/3})O_3$ 2.0 | 1.5 | 8.0 | 8900 | 1.6 | 320 | 13 |
| 3.0 | $Nb_2O_5$ 0.50 | $Sr_{0.6}Ba_{0.2}Ca_{0.2}(Co_{1/3}Ta_{2/3})O_3$ 2.0 | 1.5 | 8.0 | 8800 | 1.5 | 330 | 12 |
| 3.0 | $La_2O_3$ 0.50 | $Sr_{0.6}Ba_{0.2}Ca_{0.2}(Co_{1/3}Ta_{2/3})O_3$ 2.0 | 1.5 | 8.5 | 9200 | 1.6 | 320 | 12 |
| 3.0 | $Y_2O_3$ 0.50 | $Sr_{0.6}Ba_{0.2}Ca_{0.2}(Co_{1/3}Ta_{2/3})O_3$ 2.0 | 1.5 | 7.5 | 8200 | 1.4 | 370 | 13 |
| 3.0 | $WO_3$ 2.0 | $Sr_{0.8}Ba_{0.1}Ca_{0.1}(Co_{1/3}Ta_{2/3})O_3$ 2.0 | 1.5 | 8.0 | 8700 | 1.4 | 330 | 12 |
| 3.0 | $Nb_2O_5$ 2.0 | $Sr_{0.8}Ba_{0.1}Ca_{0.1}(Co_{1/3}Ta_{2/3})O_3$ 2.0 | 1.5 | 8.5 | 9100 | 1.5 | 310 | 11 |
| 3.0 | $La_2O_3$ 2.0 | $Sr_{0.8}Ba_{0.1}Ca_{0.1}(Co_{1/3}Ta_{2/3})O_3$ 2.0 | 1.5 | 7.5 | 8300 | 1.6 | 360 | 11 |
| 3.0 | $Y_2O_3$ 2.0 | $Sr_{0.8}Ba_{0.1}Ca_{0.1}(Co_{1/3}Ta_{2/3})O_3$ 2.0 | 1.5 | 7.5 | 8400 | 1.6 | 370 | 13 |

As is apparent from the results in Table 12, the present material obtained by adding $SrTiO_3$ to a sintering accelerant such as $TiO_2$-MgO-$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high electrostatic capacitance. The electric characteristics of the materials used in these devices are similar to those used in Example 10.

are shown in Table 13. The forming agent $Sr(Cu_{\frac{1}{3}}W_{\frac{2}{3}})O_3$ to form a grain boundary depletion which also functions as a control agent to control the grain growth was obtained by mixing commercial $SrCO_3$, $WO_3$, and CoO, sintering at 1000° C. and grinding.

TABLE 13

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/2}W_{1/2})O_3$ (wt %) | solid electrolyte which functions as a control agent to control the grain growth $ZrO_2$ (wt %) | mean grain diameter (μm) | ε | tan δ (%) | rising voltage $V_1$mA (V/mm) | α |
|---|---|---|---|---|---|---|---|---|
| 0.05 | 0.2 | 0.5 | 0.8 | 2.5 | 3300 | 19.5 | 190 | 4.0 |
| 0.1 | 0.2 | 0.5 | 0.8 | 5.0 | 6200 | 1.6 | 610 | 12 |
| 0.5 | 0.2 | 0.5 | 0.8 | 5.0 | 5800 | 1.6 | 580 | 12 |
| 1.0 | 0.2 | 0.5 | 0.8 | 5.5 | 6300 | 1.3 | 540 | 11 |
| 3.0 | 0.2 | 0.5 | 0.8 | 6.0 | 6500 | 1.7 | 480 | 12 |
| 5.0 | 0.2 | 0.5 | 0.8 | 6.0 | 6800 | 1.4 | 500 | 11 |
| 6.0 | 0.2 | 0.5 | 0.8 | 6.0 | 6700 | 1.8 | 480 | 12 |
| 1.0 | 0.02 | 0.5 | 0.8 | 3.5 | 4200 | 26.5 | 180 | 4.5 |
| 1.0 | 0.05 | 0.5 | 0.8 | 5.0 | 6100 | 1.7 | 630 | 12 |
| 1.0 | 0.5 | 0.5 | 0.8 | 5.0 | 5800 | 1.8 | 590 | 11 |
| 1.0 | 2.0 | 0.5 | 0.8 | 5.5 | 6200 | 1.9 | 570 | 12 |

TABLE 13-continued

| sintering accelerant TiO$_2$—Al$_2$O$_3$—SiO$_2$ compound (wt %) | semiconducting accelerant Nb$_2$O$_5$ (wt %) | forming agent to form a grain boundary depletion layer which also functions as a control agent to control the grain growth Sr(Cu$_{1/2}$W$_{1/2}$)O$_3$ (wt %) | solid electrolyte which functions as a control agent to control the grain growth ZrO$_2$ (wt %) | mean grain diameter (μm) | ε | tan δ (%) | rising voltage V$_1$mA (V/mm) | α |
|---|---|---|---|---|---|---|---|---|
| 1.0 | 3.0 | 0.5 | 0.8 | 4.5 | 5100 | 24.0 | 220 | 5.5 |
| 1.0 | 0.2 | 0.1 | 0.8 | 5.0 | 5900 | 15.5 | 240 | 5.0 |
| 1.0 | 0.2 | 0.2 | 0.8 | 5.5 | 6300 | 1.8 | 550 | 11 |
| 1.0 | 0.2 | 0.5 | 0.8 | 6.0 | 6600 | 1.6 | 530 | 12 |
| 1.0 | 0.2 | 2.0 | 0.8 | 6.0 | 6700 | 1.6 | 490 | 12 |
| 1.0 | 0.2 | 5.0 | 0.8 | 5.5 | 6400 | 1.8 | 540 | 11 |
| 1.0 | 0.2 | 6.0 | 0.8 | 5.0 | 6000 | 10.5 | 180 | 5.0 |
| 1.0 | 0.2 | 0.5 | 0.05 | 5.5 | 6400 | 14.0 | 150 | 6.0 |
| 1.0 | 0.2 | 0.5 | 0.1 | 5.5 | 6200 | 1.9 | 580 | 12 |
| 1.0 | 0.2 | 0.5 | 1.0 | 5.0 | 6100 | 1.9 | 600 | 11 |
| 1.0 | 0.2 | 0.5 | 5.0 | 5.5 | 6400 | 1.6 | 550 | 12 |
| 1.0 | 0.2 | 0.5 | 10.0 | 5.0 | 5800 | 1.8 | 620 | 12 |
| 1.0 | 0.2 | 0.5 | 12.0 | 4.0 | 4700 | 12.0 | 190 | 4.0 |

As is apparent from the results in Table 13, the present material obtained by adding SrTiO$_3$ to a sintering accelerant TiO$_2$-Al$_2$O$_3$-SiO$_2$ of 0.1 to 5.0 wt %, a semiconducting accelerant Nb$_2$O$_5$ of 0.05 to 2.0 wt %, a solid electrolyte ZrO$_2$ 0.1 to 10.0 wt %, and a forming agent Sr(Cu$_{\frac{1}{2}}$W$_{\frac{1}{2}}$)O$_3$ of 0.2 to 5.0 wt % to form a grain boundary depletion layer which also functions as a control agent to control the grain growth and sintering has excellent varistor and dielectric characteristics with uniform grain diameter and can be used as a varistor with high electrostatic capacitance. According to a microscopic examination, the grain diameters of corpuscles in the sintered body were uniform and the mean grain diameter was approximately 5.0 to 6.0 μm and the dielectric loss was 2.0% or less and the apparent dielectric constant was 5500 or more. The riser voltage V$_1$ mA of the materials as a varistor was 450 to 650 V/mm and the resistance non-linearity coeffecient α is 10 or more in most cases between V$_1$ mA to V$_{0.1}$ mA. Other values such as surge durability as a varistor, the ratio of limited voltage representing the nonlinearity resistive charac-teristics in high current area, the temperature coefficient of the riser voltage V$_1$ mA and capacitance were measured and sufficient values were obtained.

When the amount of the sintering accelerant added exceeds 5%, the sintered body is prone to deform or adhere, therefore it is not practical.

EXAMPLE 14

The forming agent Sr(Cu$_{\frac{1}{2}}$W$_{\frac{1}{2}}$)O$_3$ (0.4 to 4.0 wt %) was added instead of the forming agent Sr(Cu$_{\frac{1}{3}}$Nb$_{2/3}$)O$_3$ (0.4 to 3.0 wt %) to form a grain boundary depletion of Example 2. The manufacturing method for other materials, sintering accelerant or the like, was the same as Example 2 and electric characteristics thereof were measured by the same method as Example 2. The results are shown in Table 14.

The forming agent Sr(Cu$_{\frac{1}{2}}$W$_{\frac{1}{2}}$)O$_3$ to form a grain boundary depletion which also functions as a control agent to control the grain growth was obtained by mixing commercial SrCO$_3$, WO$_3$ and CoO sintering at 900° C. and grinding.

TABLE 14

| sintering accelerant (wt %) | semiconducting accelerant Y$_2$O$_3$ (wt %) | forming agent to form a grain boundary depletion layer which also functions as a control agent to control the grain growth Sr(Cu$_{1/2}$W$_{1/2}$)O$_3$ (wt %) | solid electrolyte which functions as a control agent to control the grain growth ZrO$_2$ (wt %) | mean grain diameter (μm) | ε | tan δ (%) | V$_1$mA (V/mm) | α |
|---|---|---|---|---|---|---|---|---|
| TiO$_2$—Al$_2$O$_3$—SiO$_2$ compound | | | | | | | | |
| 1.0 | 0.4 | 0.4 | 2.0 | 6.0 | 6500 | 1.6 | 480 | 13 |
| 1.0 | 0.4 | 4.0 | 2.0 | 5.5 | 6200 | 1.5 | 560 | 12 |
| 1.0 | 0.4 | 1.0 | 0.2 | 6.0 | 6600 | 1.6 | 520 | 12 |
| 1.0 | 0.4 | 1.0 | 8.0 | 5.5 | 6400 | 1.5 | 530 | 11 |
| TiO$_2$—MnO—SiO$_2$ compound | | | | | | | | |
| 1.0 | 0.4 | 0.4 | 2.0 | 5.5 | 6400 | 1.4 | 550 | 12 |
| 1.0 | 0.4 | 4.0 | 2.0 | 5.0 | 6000 | 1.4 | 620 | 13 |
| 1.0 | 0.4 | 1.0 | 0.2 | 6.0 | 6700 | 1.3 | 530 | 12 |
| 1.0 | 0.4 | 1.0 | 8.0 | 5.5 | 6200 | 1.6 | 580 | 11 |
| TiO$_2$—MgO—SiO$_2$ compound | | | | | | | | |
| 1.0 | 0.4 | 0.4 | 2.0 | 5.5 | 6300 | 1.5 | 530 | 12 |
| 1.0 | 0.4 | 4.0 | 2.0 | 5.0 | 5900 | 1.3 | 580 | 12 |
| 1.0 | 0.4 | 1.0 | 0.2 | 6.0 | 6600 | 1.4 | 500 | 13 |
| 1.0 | 0.4 | 1.0 | 8.0 | 5.5 | 6100 | 1.2 | 540 | 13 |

As is apparent from the results in Table 14, the present material obtained by adding SrTiO$_3$ to a sintering accelerant such as $TiO_2$-$MgO$-$SiO_2$ of 1.0 wt % mainly forming a liquid phase at a high temperature, a semiconducting accelerant $Y_2O_3$ of 0.4 wt %, a solid electrolyte $ZrO_2$ of 0.2 to 8.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 13.

EXAMPLE 15

The forming agent $Sr_{0.8}Ba_{0.1}Ca_{0.1}(Cu_{\frac{1}{4}}W_{\frac{3}{4}})O_3$ or $Sr_{0.6}Ba_{0.2}Ca_{0.2}(Cu_{\frac{1}{4}}W_{\frac{3}{4}})O_3$ of 2.0 wt % was added instead of the forming agent $Sr_{0.8}Ba_{0.1}Ca_{0.1}(Cu_{\frac{1}{4}}Nb_{\frac{3}{4}})O_3$ or $Sr_{0.6}Ba_{0.2}Ca_{0.2}(Cu_{\frac{1}{4}}Nb_{\frac{3}{4}})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $WO_2$, and $CuO$, sintering at 900° C. and grinding.

The manufacturing method for other materials, sintering accelerant or the like, was the same as Example 3 and electric characteristics thereof were measured by the same method as Example 3. The results are shown in Table 15.

TABLE 15

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain diameter (μm) | ε | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Cu_{1/2}W_{1/2})O_3$ 2.0 | 1.5 | 5.5 | 6600 | 1.9 | 530 | 12 |
| 3.0 | $Nb_2O_5$ 0.05 | $Sr_{0.8}Ba_{0.1}Ca_{0.1}(Cu_{1/2}W_{1/2})O_3$ 2.0 | 1.5 | 5.0 | 6300 | 1.8 | 580 | 11 |
| 3.0 | $La_2O_3$ 0.05 | $Sr_{0.8}Ba_{0.1}Ca_{0.1}(Cu_{1/2}W_{1/2})O_3$ 2.0 | 1.5 | 5.5 | 6500 | 1.5 | 580 | 12 |
| 3.0 | $Y_2O_3$ 0.05 | $Sr_{0.8}Ba_{0.1}Ca_{0.1}(Cu_{1/2}W_{1/2})O_3$ 2.0 | 1.5 | 5.0 | 6100 | 1.8 | 630 | 11 |
| 3.0 | $WO_3$ 0.50 | $Sr_{0.6}Ba_{0.2}Ca_{0.2}(Cu_{1/2}W_{1/2})O_3$ 2.0 | 1.5 | 5.0 | 6200 | 1.7 | 610 | 13 |
| 3.0 | $Nb_2O_5$ 0.50 | $Sr_{0.6}Ba_{0.2}Ca_{0.2}(Cu_{1/2}W_{1/2})O_3$ 2.0 | 1.5 | 5.5 | 6400 | 1.7 | 560 | 12 |
| 3.0 | $La_2O_3$ 0.50 | $Sr_{0.6}Ba_{0.2}Ca_{0.2}(Cu_{1/2}W_{1/2})O_3$ 2.0 | 1.5 | 5.5 | 6300 | 1.9 | 540 | 13 |
| 3.0 | $Y_2O_3$ 0.50 | $Sr_{0.6}Ba_{0.2}Ca_{0.2}(Cu_{1/2}W_{1/2})O_3$ 2.0 | 1.5 | 5.0 | 6200 | 1.8 | 590 | 12 |
| 3.0 | $WO_3$ 2.0 | $Sr_{0.8}Ba_{0.1}Ca_{0.1}(Cu_{1/2}W_{1/2})O_3$ 2.0 | 1.5 | 6.0 | 6700 | 1.8 | 520 | 11 |
| 3.0 | $Nb_2O_5$ 2.0 | $Sr_{0.8}Ba_{0.1}Ca_{0.1}(Cu_{1/2}W_{1/2})O_3$ 2.0 | 1.5 | 5.0 | 6300 | 1.7 | 600 | 11 |
| 3.0 | $La_2O_3$ 2.0 | $Sr_{0.8}Ba_{0.1}Ca_{0.1}(Cu_{1/2}W_{1/2})O_3$ 2.0 | 1.5 | 5.5 | 6300 | 1.6 | 570 | 11 |
| 3.0 | $Y_2O_3$ 2.0 | $Sr_{0.8}Ba_{0.1}Ca_{0.1}(Cu_{1/2}W_{1/2})O_3$ 2.0 | 1.5 | 6.0 | 6600 | 1.7 | 510 | 12 |

As is apparent from the results in Table 15, the present material obtained by adding $SrTiO_3$ to a sintering accelerant such as $TiO_2$-$MgO$-$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 13.

EXAMPLE 16

The forming agent $Sr(Co_{\frac{1}{4}}W_{\frac{3}{4}})O_3$ (0.1 to 7.0 wt %) was added instead of the forming agent $Sr(Cu_{\frac{1}{4}}Nb_{\frac{3}{4}})O_3$ (0.1 to 6.0 wt %) to form a grain boundary depletion of Example 1. The manufacturing method for other materials, sintering accelerant or the like, was the same as Example 1 and electric characteristics thereof were measured by the same method as Example 1. The results are shown in Table 16. The forming agent $Sr(Co_{\frac{1}{4}}W_{\frac{3}{4}})O_3$ to form a grain boundary depletion was obtained by mixing commercial $SrCO_3$, $WO_3$, and $CoO$, sintering at 1000° C. and grinding.

TABLE 16

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $ZrO_2$ (wt %) | mean grain diameter (μm) | ε | tan δ (%) | rising voltage $V_1mA$ (V/mm) | α |
|---|---|---|---|---|---|---|---|---|
| 0.05 | 0.2 | 0.5 | 0.8 | 2.0 | 2200 | 35.0 | 190 | 3.0 |
| 0.1 | 0.2 | 0.5 | 0.8 | 4.5 | 5500 | 1.9 | 650 | 12 |
| 0.5 | 0.2 | 0.5 | 0.8 | 5.0 | 5700 | 1.5 | 680 | 12 |

TABLE 16-continued

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $ZrO_2$ (wt %) | mean grain diameter (μm) | ε | tan δ (%) | rising voltage $V_1$mA (V/mm) | α |
|---|---|---|---|---|---|---|---|---|
| 1.0 | 0.2 | 0.5 | 0.8 | 5.0 | 5700 | 1.5 | 620 | 14 |
| 3.0 | 0.2 | 0.5 | 0.8 | 5.0 | 5600 | 1.7 | 600 | 12 |
| 5.0 | 0.2 | 0.5 | 0.8 | 5.5 | 5900 | 1.6 | 560 | 13 |
| 6.0 | 0.2 | 0.5 | 0.8 | 5.5 | 5800 | 1.6 | 540 | 12 |
| 1.0 | 0.02 | 0.5 | 0.8 | 4.5 | 5300 | 28.0 | 150 | 4.0 |
| 1.0 | 0.05 | 0.5 | 0.8 | 4.5 | 5600 | 1.8 | 660 | 11 |
| 1.0 | 0.5 | 0.5 | 0.8 | 5.0 | 5800 | 1.5 | 630 | 11 |
| 1.0 | 2.0 | 0.5 | 0.8 | 5.5 | 5700 | 1.5 | 540 | 13 |
| 1.0 | 3.0 | 0.5 | 0.8 | 4.5 | 5000 | 15.5 | 140 | 3.5 |
| 1.0 | 0.2 | 0.1 | 0.8 | 5.5 | 6300 | 21.5 | 130 | 4.5 |
| 1.0 | 0.2 | 0.2 | 0.8 | 4.5 | 5400 | 1.6 | 660 | 13 |
| 1.0 | 0.2 | 0.5 | 0.8 | 5.0 | 5600 | 1.4 | 590 | 13 |
| 1.0 | 0.2 | 2.0 | 0.8 | 5.5 | 5900 | 1.6 | 530 | 14 |
| 1.0 | 0.2 | 5.0 | 0.8 | 5.0 | 5800 | 1.8 | 610 | 13 |
| 1.0 | 0.2 | 7.0 | 0.8 | 4.5 | 5500 | 14.5 | 200 | 4.0 |
| 1.0 | 0.2 | 0.5 | 0.05 | 6.0 | 6900 | 35.0 | 190 | 3.5 |
| 1.0 | 0.2 | 0.5 | 0.1 | 5.0 | 5700 | 1.7 | 590 | 12 |
| 1.0 | 0.2 | 0.5 | 1.0 | 5.5 | 6100 | 1.6 | 570 | 12 |
| 1.0 | 0.2 | 0.5 | 5.0 | 5.5 | 6200 | 1.6 | 560 | 13 |
| 1.0 | 0.2 | 0.5 | 10.0 | 4.5 | 5600 | 1.5 | 640 | 12 |
| 1.0 | 0.2 | 0.5 | 12.0 | 4.0 | 4600 | 12.0 | 220 | 5.5 |

As is apparent from the results in Table 16, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt %, and a forming agent $Sr(Co_{\frac{1}{2}}W_{\frac{1}{2}})O_3$ of 0.2 to 5.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 4.5 to 5.5 μm and the dielectric loss was 2.0% or less and the apparent dielectric constant was 5000 or more. The riser voltage $V_1$ mA of the materials as a varistor was 500 to 700 V/mm and the resistance non-linearity coeffecient o is 10 or more in most cases between $V_1$ mA to $V_{0.1}$ mA. Other values such as surge durability as a varistor, the ratio of limited voltage representing the nonlinearity resistive characteristics in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

When the amount of the sintering accelerant added exceeds 5%, the sintered body is prone to deform or adhere, therefore it is not practical.

EXAMPLE 17

The forming agent $Sr(Co_{1/8}W_{\frac{1}{8}})O_3$ (0.4 to 4.0 wt %) was added instead of the forming agent $Sr(Cu_{\frac{1}{2}}Nb_{\frac{1}{2}})O_3$ (0.4 to 3.0 wt %) to form a grain boundary depletion of Example 2. The manufacturing method for other materials, sintering accelerant or the like, was the same as Example 2 and electric characteristics thereof were measured by the same method as Example 2. The results are shown in Table 17.

The forming agent $Sr(Co_{\frac{1}{2}}W_{2/3})O_3$ to form a grain boundary depletion which also functions as a control agent to control the grain growth was obtained by mixing commercial $SrCO_3$, $WO_3$ and CoO sintering at 900° C. and grinding.

TABLE 17

| sintering accelerant (wt %) | semiconducting accelerant $Y_2O_3$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $ZrO_2$ (wt %) | mean grain diameter (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |
| 1.0 | 0.4 | 0.4 | 2.0 | 5.0 | 5800 | 1.5 | 590 | 11 |
| 1.0 | 0.4 | 4.0 | 2.0 | 4.5 | 5400 | 1.3 | 640 | 12 |
| 1.0 | 0.4 | 1.0 | 0.2 | 5.5 | 6100 | 1.4 | 530 | 13 |
| 1.0 | 0.4 | 1.0 | 8.0 | 5.0 | 5600 | 1.2 | 610 | 12 |
| $TiO_2$—MnO—$SiO_2$ compound | | | | | | | | |
| 1.0 | 0.4 | 0.4 | 2.0 | 5.5 | 6000 | 1.6 | 560 | 11 |
| 1.0 | 0.4 | 4.0 | 2.0 | 5.0 | 5700 | 1.5 | 620 | 13 |
| 1.0 | 0.4 | 1.0 | 0.2 | 5.5 | 6100 | 1.6 | 550 | 11 |

TABLE 17-continued

| sintering accelerant (wt %) | semiconducting accelerant $Y_2O_3$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $ZrO_2$ (wt %) | mean grain diameter (μm) | ε | tan δ (%) | $V_1$mA (V/mm) | α |
|---|---|---|---|---|---|---|---|---|
| 1.0 $TiO_2$—MgO—$SiO_2$ compound | 0.4 | 1.0 | 8.0 | 5.0 | 5600 | 1.5 | 590 | 12 |
| 1.0 | 0.4 | 0.4 | 2.0 | 5.5 | 5900 | 1.4 | 580 | 13 |
| 1.0 | 0.4 | 4.0 | 2.0 | 4.5 | 5500 | 1.4 | 650 | 12 |
| 1.0 | 0.4 | 1.0 | 0.2 | 5.5 | 6000 | 1.3 | 560 | 12 |
| 1.0 | 0.4 | 1.0 | 8.0 | 5.0 | 5700 | 1.6 | 620 | 11 |

As is apparent from the results in Table 17, the present material obtained by adding $SrTiO_3$ to a sintering accelerant such as $TiO_2$-MgO-$SiO_2$ of 1.0 wt % mainly forming a liquid phase at a high temperature, a semiconducting accelerant $Y_2O_3$ of 0.4 wt %, a solid electrolyte $ZrO_2$ of 0.2 to 8.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 16.

EXAMPLE 18

The forming agent $Sr_{0.8}Ba_{0.1}Ca_{0.1}(Co_\frac{1}{2}W_\frac{1}{2})O_3$ or $Sr_{0.6}Ba_{0.2}Ca_{0.2}(Co_\frac{1}{2}W_\frac{1}{2})O_3$ of 2.0 wt % was added instead of the forming agent $Sr_{0.8}Ba_{0.1}Ca_{0.1}(Cu_\frac{1}{2}Nb_\frac{1}{2})O_3$ or $Sr_{0.6}Ba_{0.2}Ca_\frac{1}{2}(Cu_\frac{1}{2}Nb_\frac{1}{2})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $WO_3$, and CoO, sintering at 900° C. and grinding.

The manufacturing method for other materials, sintering accelerant or the like, was the same as Example 3 and electric characteristics thereof were measured by the same method as Example 3. The results are shown in Table 18.

TABLE 18

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain (μm) | ε | tan δ (%) | $V_1$mA (V/mm) | α |
|---|---|---|---|---|---|---|---|---|
| 3.0 | $WO_3$ 0.05 | $Sr_{0.8}Ba_{0.1}Ca_{0.1}(Co_{1/2}W_{1/2})O_3$ 2.0 | 1.5 | 4.5 | 5600 | 1.3 | 630 | 12 |
| 3.0 | $Nb_2O_5$ 0.05 | $Sr_{0.8}Ba_{0.1}Ca_{0.1}(Co_{1/2}W_{1/2})O_3$ 2.0 | 1.5 | 4.5 | 5600 | 1.2 | 650 | 13 |
| 3.0 | $La_2O_3$ 0.05 | $Sr_{0.8}Ba_{0.1}Ca_{0.1}(Co_{1/2}W_{1/2})O_3$ 2.0 | 1.5 | 5.0 | 5900 | 1.2 | 590 | 13 |
| 3.0 | $Y_2O_3$ 0.05 | $Sr_{0.8}Ba_{0.1}Ca_{0.1}(Co_{1/2}W_{1/2})O_3$ 2.0 | 1.5 | 5.0 | 6200 | 1.4 | 610 | 12 |
| 3.0 | $WO_3$ 0.50 | $Sr_{0.6}Ba_{0.2}Ca_{0.2}(Co_{1/2}W_{1/2})O_3$ 2.0 | 1.5 | 4.5 | 5700 | 1.3 | 670 | 13 |
| 3.0 | $Nb_2O_5$ 0.50 | $Sr_{0.6}Ba_{0.2}Ca_{0.2}(Co_{1/2}W_{1/2})O_3$ 2.0 | 1.5 | 5.0 | 6100 | 1.4 | 600 | 13 |
| 3.0 | $La_2O_3$ 0.50 | $Sr_{0.6}Ba_{0.2}Ca_{0.2}(co_{1/2}W_{1/2})O_3$ 2.0 | 1.5 | 4.5 | 5800 | 1.3 | 660 | 11 |
| 3.0 | $Y_2O_3$ 0.50 | $Sr_{0.6}Ba_{0.2}Ca_{0.2}(Co_{1/2}W_{1/2})O_3$ 2.0 | 1.5 | 5.0 | 6000 | 1.3 | 620 | 13 |
| 3.0 | $WO_3$ 2.0 | $Sr_{0.8}Ba_{0.1}Ca_{0.1}(Co_{1/2}W_{1/2})O_3$ 2.0 | 1.5 | 4.5 | 5700 | 1.3 | 670 | 12 |
| 3.0 | $Nb_2O_5$ 2.0 | $Sr_{0.8}Ba_{0.1}Ca_{0.1}(Co_{1/2}W_{1/2})O_3$ 2.0 | 1.5 | 4.5 | 5800 | 1.3 | 650 | 12 |
| 3.0 | $La_2O_3$ 2.0 | $Sr_{0.8}Ba_{0.1}Ca_{0.1}(Co_{1/2}W_{1/2})O_3$ 2.0 | 1.5 | 5.0 | 6000 | 1.4 | 620 | 11 |
| 3.0 | $Y_2O_3$ 2.0 | $Sr_{0.8}Ba_{0.1}Ca_{0.1}(Co_{1/2}W_{1/2})O_3$ 2.0 | 1.5 | 4.5 | 5600 | 1.5 | 660 | 11 |

As is apparent from the results in Table 18, the present material obtained by adding $SrTiO_3$ to a sintering accelerant such as $TiO_2$-MgO-$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 16.

EXAMPLE 19

The forming agent $Sr(Co_{\frac{1}{2}}Mo_{\frac{1}{2}})O_3$ (0.1 to 6.0 wt %) was added instead of the forming agent $Sr(Cu_{\frac{1}{2}}Nb_{\frac{1}{2}})O_3$ (0.1 to 6.0 wt %) to form a grain boundary depletion of Example 1. The manufacturing method for other materials, sintering accelerant or the like, was the same as Example 1 and electric characteristics thereof were measured by the same method as Example 1. The results are shown in Table 19.

The forming agent $Sr(Co_{\frac{1}{2}}Mo_{\frac{1}{2}})O_3$ to form a grain boundary depletion which also functions as a control agent to control the grain growth was obtained by mixing commercial $SrCO_3$, $MoO_3$, and $CoO$, sintering at 1000° C. and grinding.

ter was approximately 9.0 to 10 μm and the dielectric loss was 5.0% or less and the apparent dielectric constant was 10000 or more. The riser voltage $V_1$ mA of the materials as a varistor was 250 to 350 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

TABLE 19

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/2}Mo_{1/2})O_3$ (wt %) | solid electrolyte which functions as a control agent to control the grain growth $ZrO_2$ (wt %) | mean grain (μm) | ε | tan δ (%) | rising voltage $V_1$mA (V/mm) | α |
|---|---|---|---|---|---|---|---|---|
| 0.05 | 0.2 | 0.5 | 0.8 | 4.0 | 4400 | 17.0 | 170 | 5.5 |
| 0.1 | 0.2 | 0.5 | 0.8 | 9.0 | 10500 | 4.8 | 320 | 12 |
| 0.5 | 0.2 | 0.5 | 0.8 | 10.0 | 11200 | 4.5 | 310 | 14 |
| 1.0 | 0.2 | 0.5 | 0.8 | 10.0 | 11300 | 4.4 | 300 | 12 |
| 3.0 | 0.2 | 0.5 | 0.8 | 10.0 | 11500 | 4.6 | 280 | 13 |
| 5.0 | 0.2 | 0.5 | 0.8 | 11.0 | 12200 | 4.3 | 270 | 12 |
| 6.0 | 0.2 | 0.5 | 0.8 | 11.0 | 12300 | 4.5 | 260 | 12 |
| 1.0 | 0.02 | 0.5 | 0.8 | 9.0 | 10300 | 23.0 | 140 | 6.0 |
| 1.0 | 0.05 | 0.5 | 0.8 | 9.5 | 10800 | 4.3 | 290 | 14 |
| 1.0 | 0.5 | 0.5 | 0.8 | 10.0 | 11200 | 4.5 | 290 | 13 |
| 1.0 | 2.0 | 0.5 | 0.8 | 11.0 | 12000 | 4.4 | 280 | 14 |
| 1.0 | 3.0 | 0.5 | 0.8 | 9.0 | 9500 | 17.5 | 110 | 4.5 |
| 1.0 | 0.2 | 0.1 | 0.8 | 8.0 | 8300 | 17.5 | 150 | 6.5 |
| 1.0 | 0.2 | 0.2 | 0.8 | 9.5 | 10700 | 4.6 | 320 | 12 |
| 1.0 | 0.2 | 0.5 | 0.8 | 10.5 | 11100 | 4.1 | 300 | 13 |
| 1.0 | 0.2 | 2.0 | 0.8 | 11.0 | 12200 | 4.6 | 270 | 13 |
| 1.0 | 0.2 | 5.0 | 0.8 | 10.0 | 11300 | 4.8 | 290 | 14 |
| 1.0 | 0.2 | 6.0 | 0.8 | 9.0 | 10300 | 12.5 | 170 | 4.5 |
| 1.0 | 0.2 | 0.5 | 0.05 | 12.0 | 13500 | 21.0 | 160 | 5.0 |
| 1.0 | 0.2 | 0.5 | 0.1 | 10.0 | 11300 | 4.7 | 290 | 12 |
| 1.0 | 0.2 | 0.5 | 1.0 | 11.0 | 12200 | 4.6 | 270 | 14 |
| 1.0 | 0.2 | 0.5 | 5.0 | 11.0 | 12400 | 4.6 | 260 | 14 |
| 1.0 | 0.2 | 0.5 | 10.0 | 9.0 | 10200 | 4.5 | 310 | 11 |
| 1.0 | 0.2 | 0.5 | 12.0 | 9.0 | 9200 | 16.0 | 210 | 6.5 |

As is apparent from the results in Table 19, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt %, and a forming agent $Sr(Co_{\frac{1}{2}}Mo_{\frac{1}{2}})O_3$ of 0.2 to 5.0 wt % to form a grain boundary depletion layer which also functions as a control agent to control the grain growth and sintering, has excellent varistor and dielectric characteristics with uniform grain diameter and can be used as a varistor with high capacitance. According to a microscopic examination, the grain diameters of corpuscles in the sintered body were uniform and the mean grain diame-

EXAMPLE 20

The forming agent $Sr(Co_{\frac{1}{2}}Mo_{\frac{1}{2}})O_3$ (0.4 to 4.0 wt %) was added instead of the forming agent $Sr(Cu_{\frac{1}{2}}Nb_{\frac{1}{2}})O_3$ (0.4 to 3.0 wt %) to form a grain boundary depletion of Example 2. The manufacturing method for other materials, sintering accelerant or the like, was the same as Example 2 and electric characteristics thereof were measured by the same method as Example 2. The results are shown in Table 20. The forming agent $Sr(Co_{\frac{1}{2}}Mo_{\frac{1}{2}})O_3$ to form a grain boundary depletion which also functions as a control agent to control the grain growth was obtained by mixing commercial $SrCO_3$, $MoO_3$ and $CoO$ sintering at 900° C. and grinding.

TABLE 20

| sintering accelerant (wt %) | semiconducting accelerant $Y_2O_3$ (wt %) | forming agent to form a grain boundary depletion layer which also functions as a control agent to control the grain growth $Sr(Co_{1/2}Mo_{1/2})O_3$ (wt %) | solid electrolyte which functions as a control agent to control the grain growth $ZrO_2$ (wt %) | mean grain (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |

TABLE 20-continued

| sintering accelerant (wt %) | semiconducting accelerant $Y_2O_3$ (wt %) | forming agent to form a grain boundary depletion layer which also functions as a control agent to control the grain growth $Sr(Co_{1/2}Mo_{1/2})O_3$ (wt %) | solid electrolyte which functions as a control agent to control the grain growth $ZrO_2$ (wt %) | mean grain ($\mu$m) | $\epsilon$ | tan $\delta$ (%) | $V_1$mA (V/mm) | $\alpha$ |
|---|---|---|---|---|---|---|---|---|
| 1.0 | 0.4 | 0.4 | 2.0 | 10.0 | 11200 | 4.5 | 310 | 12 |
| 1.0 | 0.4 | 4.0 | 2.0 | 9.5 | 10800 | 4.2 | 320 | 12 |
| 1.0 | 0.4 | 1.0 | 0.2 | 11.0 | 12200 | 4.4 | 280 | 13 |
| 1.0 | 0.4 | 1.0 | 8.0 | 10.0 | 11100 | 4.1 | 290 | 13 |
| $TiO_2$—MnO—$SiO_2$ compound | | | | | | | | |
| 1.0 | 0.4 | 0.4 | 2.0 | 11.0 | 12000 | 4.3 | 260 | 12 |
| 1.0 | 0.4 | 4.0 | 2.0 | 10.0 | 11400 | 4.5 | 300 | 14 |
| 1.0 | 0.4 | 1.0 | 0.2 | 11.0 | 12100 | 4.5 | 270 | 12 |
| 1.0 | 0.4 | 1.0 | 8.0 | 10.5 | 11700 | 4.5 | 290 | 12 |
| $TiO_2$—MgO—$SiO_2$ compound | | | | | | | | |
| 1.0 | 0.4 | 0.4 | 2.0 | 10.5 | 11800 | 4.4 | 280 | 14 |
| 1.0 | 0.4 | 4.0 | 2.0 | 10.5 | 11600 | 4.1 | 270 | 12 |
| 1.0 | 0.4 | 1.0 | 0.2 | 11.0 | 12000 | 4.3 | 270 | 13 |
| 1.0 | 0.4 | 1.0 | 8.0 | 10.0 | 11300 | 4.3 | 300 | 12 |

As is apparent from the results in Table 20, the present material obtained by adding $SrTiO_3$ to a sintering accelerant such as $TiO_2$-MgO-$SiO_2$ of 1.0 wt % mainly forming a liquid phase at a high temperature, a semiconducting accelerant $Y_2O_3$ of 0.4 wt %, a solid electrolyte $ZrO_2$ of 0.2 to 8.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 19.

EXAMPLE 21

The forming agent $Sr_{0.8}Ba_{0.1}Ca_{0.1}(Co_{\frac{1}{3}}W_{0\frac{1}{3}})O_3$ or $Sr_{0.6}Ba_{0.2}Ca_{0.2}(Co_{\frac{1}{3}}W_{0\frac{1}{3}})O_3$ of 2.0 wt % was added instead of the forming agent $Sr_{0.8}Ba_{0.1}Ca_{0.1}(Cu_{\frac{1}{3}}Nb_{\frac{2}{3}}$ or $Sr_{0.2}Ba_{0.2}Ca_{0.2}(Cu_{\frac{1}{3}}Nb_{\frac{2}{3}})O_3$ of 2.0 wt % to form a grain boundary depletion of Example 3. The forming agent to form a grain boundary depletion which also functions as a control agent to control the grain growth was obtained by mixing commercial $SrCO_3$, $BaCO_3$, $CaCO_3$, $Mo_3$, and CoO, sintering at 900° C. and grinding.

The manufacturing method for other materials, sintering accelerant or the like, was the same as Example 3 and electric characteristics thereof were measured by the same method as Example 3. The results are shown in Table 21.

TABLE 21

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain ($\mu$m) | $\epsilon$ | tan $\delta$ (%) | $V_1$mA (V/mm) | $\alpha$ |
|---|---|---|---|---|---|---|---|---|
| 3.0 | $WO_3$ 0.05 | $Sr_{0.8}Ba_{0.1}Ca_{0.1}(Co_{1/2}Mo_{1/2})O_3$ 2.0 | 1.5 | 9.0 | 10100 | 4.3 | 330 | 13 |
| 3.0 | $Nb_2O_5$ 0.05 | $Sr_{0.8}Ba_{0.1}Ca_{0.1}(Co_{1/2}Mo_{1/2})O_3$ 2.0 | 1.5 | 9.5 | 10800 | 4.2 | 320 | 12 |
| 3.0 | $La_2O_3$ 0.05 | $Sr_{0.8}Ba_{0.1}Ca_{0.1}(Co_{1/2}Mo_{1/2})O_3$ 2.0 | 1.5 | 10.0 | 11300 | 3.9 | 300 | 12 |
| 3.0 | $Y_2O_3$ 0.05 | $Sr_{0.8}Ba_{0.1}Ca_{0.1}(Co_{1/2}Mo_{1/2})O_3$ 2.0 | 1.5 | 10.0 | 11100 | 4.0 | 290 | 13 |
| 3.0 | $WO_3$ 0.50 | $Sr_{0.8}Ba_{0.1}Ca_{0.1}(Co_{1/2}Mo_{1/2})O_3$ 2.0 | 1.5 | 10.0 | 11400 | 4.0 | 300 | 12 |
| 3.0 | $Nb_2O_5$ 0.50 | $Sr_{0.8}Ba_{0.1}Ca_{0.1}(Co_{1/2}Mo_{1/2})O_3$ 2.0 | 1.5 | 10.5 | 12200 | 3.5 | 280 | 12 |
| 3.0 | $La_2O_3$ 0.50 | $Sr_{0.8}Ba_{0.1}Ca_{0.1}(Co_{1/2}Mc_{1/2})O_3$ 2.0 | 1.5 | 10.0 | 11000 | 4.1 | 300 | 13 |
| 3.0 | $Y_2O_3$ 0.50 | $Sr_{0.8}Ba_{0.1}Ca_{0.1}(Co_{1/2}Mo_{1/2})O_3$ 2.0 | 1.5 | 10.5 | 11800 | 4.0 | 270 | 12 |
| 3.0 | $WO_3$ 2.0 | $Sr_{0.8}Ba_{0.1}Ca_{0.1}(Co_{1/2}Mo_{1/2})O_3$ 2.0 | 1.5 | 9.5 | 10700 | 4.3 | 310 | 12 |
| 3.0 | $Nb_2O_5$ 2.0 | $Sr_{0.8}Ba_{0.1}Ca_{0.1}(Co_{1/2}Mo_{1/2})O_3$ 2.0 | 1.5 | 10.0 | 11200 | 3.8 | 290 | 12 |
| 3.0 | $La_2O_3$ 2.0 | $Sr_{0.8}Ba_{0.1}Ca_{0.1}(Co_{1/2}Mo_{1/2})O_3$ 2.0 | 1.5 | 9.5 | 10600 | 4.0 | 290 | 13 |
| 3.0 | $Y_2O_3$ 2.0 | $Sr_{0.8}Ba_{0.1}Ca_{0.1}(Co_{1/2}Mo_{1/2})O_3$ 2.0 | 1.5 | 10.5 | 12000 | 4.3 | 280 | 12 |

As is apparent from the results in Table 21, the present material obtained by adding $SrTiO_3$ to a sintering accelerant such as $TiO_2$-$MgO$-$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 19.

EXAMPLE 22

The forming agent $SrO·\tfrac{1}{3}Mn_2O_3·\tfrac{1}{3}MoO_3$ (0.1 to 10.0 wt %) was added instead of the forming agent $Sr(Cu_{\tfrac{1}{3}}Nb_{\tfrac{2}{3}})O_3$ (0.1 to 6.0 wt %) to form a grain boundary depletion of Example 1. The manufacturing method for other materials, sintering accelerant or the like, was the same as Example 1 and electric characteristics thereof were measured by the same method as Example 1. The results are shown in Table 22.

The forming agent $SrO·\tfrac{1}{3}Mn_2O_3·\tfrac{1}{3}MoO_3$ to form a grain boundary depletion which also functions as a control agent to control the grain growth was obtained by mixing commercial $SrCO_3$, $MoO_3$, and $MnCO_3$, sintering at 1000° C. and grinding.

a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 9.0 to 10.5 μm and the dielectric loss was 3.0% or less and the apparent dielectric constant was 10000 or more. The riser voltage $V_1$ mA of the materials as a varistor was 300 to 400 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 23

The forming agent $SrO·\tfrac{1}{3}Mn_2O_3·\tfrac{1}{3}MoO_3$ (0.4 to 6.0 wt %) was added instead of the forming agent $Sr(Cu_{\tfrac{1}{3}}Nb_{\tfrac{2}{3}})O_3$ (0.4 to 3.0 wt %) to form a grain boundary depletion of Example 2. The manufacturing method for other materials, sintering accelerant or the like, was the same as Example 2 and electric characteristics thereof were

TABLE 22

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $SrO.1/3Mn_2O_3.1/3MoO_3$ (wt %) | solid electrolyte which functions as a control agent to control the grain growth $ZrO_2$ (wt %) | mean grain (μm) | ε | tan δ (%) | rising voltage $V_1$mA (V/mm) | α |
|---|---|---|---|---|---|---|---|---|
| 0.05 | 0.2 | 0.5 | 0.8 | 6.5 | 5500 | 9.2 | 220 | 5.5 |
| 0.1 | 0.2 | 0.5 | 0.8 | 9.5 | 10200 | 2.4 | 320 | 12 |
| 0.5 | 0.2 | 0.5 | 0.8 | 9.5 | 10300 | 2.6 | 310 | 11 |
| 1.0 | 0.2 | 0.5 | 0.8 | 9.5 | 10100 | 2.3 | 310 | 13 |
| 3.0 | 0.2 | 0.5 | 0.8 | 10.0 | 10700 | 2.3 | 320 | 12 |
| 5.0 | 0.2 | 0.5 | 0.8 | 9.5 | 10500 | 2.4 | 310 | 12 |
| 6.0 | 0.2 | 0.5 | 0.8 | 10.0 | 10900 | 2.8 | 340 | 12 |
| 1.0 | 0.02 | 0.5 | 0.8 | 7.0 | 5400 | 11.0 | 190 | 4.5 |
| 1.0 | 0.05 | 0.5 | 0.8 | 9.0 | 9800 | 2.6 | 340 | 11 |
| 1.0 | 0.5 | 0.5 | 0.8 | 9.5 | 10200 | 2.5 | 320 | 13 |
| 1.0 | 2.0 | 0.5 | 0.8 | 9.5 | 10100 | 2.3 | 320 | 13 |
| 1.0 | 3.0 | 0.5 | 0.8 | 6.0 | 5500 | 14.5 | 180 | 3.4 |
| 1.0 | 0.2 | 0.1 | 0.8 | 10.5 | 5400 | 10.5 | 170 | 5.0 |
| 1.0 | 0.2 | 0.2 | 0.8 | 10.5 | 11000 | 2.7 | 310 | 13 |
| 1.0 | 0.2 | 1.0 | 0.8 | 10.0 | 10500 | 2.5 | 330 | 12 |
| 1.0 | 0.2 | 2.0 | 0.8 | 9.5 | 10100 | 2.7 | 310 | 14 |
| 1.0 | 0.2 | 8.0 | 0.8 | 9.0 | 9700 | 2.4 | 320 | 12 |
| 1.0 | 0.2 | 10.0 | 0.8 | 7.5 | 7100 | 11.5 | 150 | 3.5 |
| 1.0 | 0.2 | 0.5 | 0.05 | 12.0 | 7700 | 17.5 | 130 | 4.5 |
| 1.0 | 0.2 | 0.5 | 0.1 | 10.0 | 11000 | 2.7 | 310 | 12 |
| 1.0 | 0.2 | 0.5 | 1.0 | 9.5 | 10400 | 2.2 | 330 | 12 |
| 1.0 | 0.2 | 0.5 | 3.0 | 9.0 | 9600 | 2.3 | 310 | 13 |
| 1.0 | 0.2 | 0.5 | 10.0 | 9.5 | 10200 | 2.9 | 340 | 14 |
| 1.0 | 0.2 | 0.5 | 12.0 | 7.0 | 6400 | 12.0 | 170 | 4.5 |

As is apparent from the results in Table 22, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $ZrO_2$ 0.1 to 10.0 wt %, and a forming agent $SrO·\tfrac{1}{3}Mn_2O_3·\tfrac{1}{3}MoO_3$ of 0.2 to 8.0 wt % to form a grain boundary depletion layer which also functions as measured by the same method as Example 2. The results are shown in Table 23.

The forming agent $SrO·\tfrac{1}{3}Mn_2O_3·\tfrac{1}{3}MoO_3$ to form a grain boundary depletion which also functions as a control agent to control the grain growth was obtained by mixing commercial $SrCO_3$, $MoO_3$, and $MnCO_3$, sintering at 900° C. and grinding.

TABLE 23

| sintering accelerant (wt %) | semiconducting accelerant Y$_2$O$_3$ (wt %) | forming agent to form a grain boundary depletion layer which also functions as a control agent to control the grain growth SrO.1/3Mn$_2$O$_3$.1/3MoO$_3$ (wt %) | solid electrolyte which functions as a control agent to control the grain growth ZrO$_2$ (wt %) | mean grain (μm) | ε | tan δ (%) | V$_1$mA (V/mm) | α |
|---|---|---|---|---|---|---|---|---|
| TiO$_2$—MgO—SiO$_2$ compound | | | | | | | | |
| 1.0 | 0.4 | 0.4 | 2.0 | 9.5 | 9800 | 2.5 | 340 | 13 |
| 1.0 | 0.4 | 6.0 | 2.0 | 10.0 | 10400 | 2.3 | 320 | 12 |
| 1.0 | 0.4 | 1.0 | 0.2 | 10.0 | 10700 | 2.4 | 310 | 13 |
| 1.0 | 0.4 | 1.0 | 8.0 | 9.5 | 10100 | 2.1 | 340 | 11 |
| TiO$_2$—MnO—SiO$_2$ compound | | | | | | | | |
| 1.0 | 0.4 | 0.4 | 2.0 | 10.0 | 10500 | 2.4 | 330 | 12 |
| 1.0 | 0.4 | 6.0 | 2.0 | 10.0 | 10500 | 2.3 | 310 | 12 |
| 1.0 | 0.4 | 1.0 | 0.2 | 9.5 | 10100 | 2.7 | 330 | 13 |
| 1.0 | 0.4 | 1.0 | 8.0 | 10.0 | 10600 | 2.4 | 320 | 13 |
| TiO$_2$—Al$_2$O$_3$—SiO$_2$ compound | | | | | | | | |
| 1.0 | 0.4 | 0.4 | 2.0 | 9.5 | 10000 | 2.5 | 310 | 12 |
| 1.0 | 0.4 | 6.0 | 2.0 | 9.5 | 9900 | 2.8 | 340 | 13 |
| 1.0 | 0.4 | 1.0 | 0.2 | 10.0 | 10500 | 2.7 | 310 | 13 |
| 1.0 | 0.4 | 1.0 | 8.0 | 9.5 | 10300 | 2.8 | 330 | 12 |

As is apparent from the results in Table 23, the present material obtained by adding SrTiO$_3$ to a sintering accelerant such as TiO$_2$-MgO-SiO$_2$ of 1.0 wt % mainly forming a liquid phase at a high temperature, a semiconducting accelerant Y$_2$O$_3$ of 0.4 wt %, a good oxygen conductive solid electrolyte ZrO$_2$ of 0.2 to 8.0 wt %, and a forming agent of 0.4 to 6.0 wt % to form a grain boundary depletion layer which also functions as a control agent to control the grain growth and sintering has excellent varistor and dielectric characteristics with uniform grain diameter and can be used as a varistor with high capacitance. The electric characteristics of the materials used in these devices are similar to those used in Example 22.

EXAMPLE 24

The forming agent 0.8SrO·0.1BaO·0.1CaO·⅓Mn$_2$O$_3$·⅓MoO$_3$ or 0.6SrO·0.2BaO·0.2CaO·⅓Mn$_2$O$_3$·⅓MoO$_3$ of 2.0 wt % was added instead of the forming agent Sr$_{0.8}$Ba$_{0.1}$Ca$_{0.1}$(Cu$_¼$Nb$_¾$)O$_3$ or Sr$_{0.6}$ boundary depletion of Example 3. The forming agent to form a grain boundary depletion which also functions as a control agent to control the grain growth was obtained by mixing commercial SrCO$_3$, BaCO$_3$, CaCO$_3$, MoO$_3$, and MnCO$_3$, sintering at 900° C. and grinding.

The manufacturing method for other materials, sintering accelerant or the like, was the same as Example 3 and electric characteristics thereof were measured by the same method as Example 3. The results are shown in Table 24.

TABLE 24

| sintering accelerant TiO$_2$—MgO—SiO$_2$ compound (wt %) | semiconducting accelerant (wt %) | forming agent to form a grain boundary depletion layer which also functions as a control agent to control the grain growth (wt %) | solid electrolyte which functions as a control agent to control the grain growth ZrO$_2$ (wt %) | mean grain (μm) | ε | tan δ (%) | V$_1$mA (V/mm) | α |
|---|---|---|---|---|---|---|---|---|
| 3.0 | WO$_3$ 0.05 | 0.8SrO.9.1CaO.0.1BaO .1/3Mn$_2$O$_3$.1/3MoO$_3$ 2.0 | 1.5 | 9.5 | 9800 | 2.3 | 340 | 13 |
| 3.0 | Nb$_2$O$_5$ 0.05 | 0.8SrO.0.1CaO.0.1BaO .1/3Mn$_2$O$_3$.1/3MoO$_3$ 2.0 | 1.5 | 9.5 | 10000 | 2.4 | 340 | 12 |
| 3.0 | La$_2$O$_3$ 0.05 | 0.8SrO.0.1CaO.0.1BaO .1/3Mn$_2$O$_3$.1/3MoO$_3$ 2.0 | 1.5 | 9.5 | 10100 | 2.1 | 340 | 12 |
| 3.0 | Y$_2$O$_3$ 0.05 | 0.8SrO.0.1CaO.0.1BaO .1/3Mn$_2$O$_3$.1/3MoO$_3$ 2.0 | 1.5 | 10.0 | 10500 | 2.3 | 310 | 11 |
| 3.0 | WO$_3$ 0.50 | 0.6SrO.0.2CaO.0.2BaO .1/3Mn$_2$O$_3$.1/3MoO$_3$ 2.0 | 1.5 | 9.5 | 9900 | 2.3 | 340 | 12 |
| 3.0 | Nb$_2$O$_5$ 0.50 | 0.6 SrO.0.2CaO.0.2BaO .1/3Mn$_2$O$_3$.1/3MoO$_3$ 2.0 | 1.5 | 10.0 | 10300 | 2.2 | 310 | 13 |
| 3.0 | La$_2$O$_3$ 0.50 | 0.6SrO.0.2CaO.0.2BaO .1/3Mn$_2$O$_3$.1/3MoO$_3$ 2.0 | 1.5 | 9.5 | 9800 | 2.3 | 340 | 12 |
| 3.0 | Y$_2$O$_3$ 0.50 | 0.6SrO.0.2CaO.0.2BaO .1/3Mn$_2$O$_3$.1/3MoO$_3$ 2.0 | 1.5 | 10.0 | 10300 | 2.9 | 320 | 12 |
| 3.0 | WO$_3$ 2.0 | 0.8SrO.0.1CaO.0.1BaO .1/3Mn$_2$O$_3$.1/3MoO$_3$ 2.0 | 1.5 | 10.0 | 10400 | 2.5 | 310 | 13 |
| 3.0 | Nb$_2$O$_5$ 2.0 | 0.8SrO.0.1CaO.0.1BaO .1/3Mn$_2$O$_3$.1/3MoO$_3$ 2.0 | 1.5 | 10.0 | 10500 | 2.3 | 310 | 12 |
| 3.0 | La$_2$O$_3$ 2.0 | 0.8SrO.0.1CaO.0.1BaO .1/3Mn$_2$O$_3$.1/3MoO$_3$ 2.0 | 1.5 | 9.5 | 9800 | 2.0 | 340 | 12 |
| 3.0 | Y$_2$O$_3$ | 0.8SrO.0.1CaO.0.1BaO | 1.5 | 9.5 | 10000 | 2.4 | 340 | 11 |

TABLE 24-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $ZrO_2$ (wt %) | mean grain ($\mu$m) | $\epsilon$ | tan $\delta$ (%) | $V_1$mA (V/mm) | $\alpha$ |
|---|---|---|---|---|---|---|---|---|
| | 2.0 | .1/3$Mn_2O_3$.1/3$MoO_3$ 2.0 | | | | | | |

As is apparent from the results in Table 24, the present material obtained by adding $SrTiO_3$ to a sintering accelerant such as $TiO_2$-MgO-$SiO_2$ series of 3.0 wt %, a semiconducting accelerant of 0.05 to 2.0 wt %, a solid electrolyte $ZrO_2$ of 1.5 wt % which also functions as a control agent to control the grain growth, and a forming agent 0.8SrO·0.1BaO·0.1CaO·⅓$Mn_2O_3$MoO$_3$ or 0.6SrO·0.2BaO·0.2CaO·⅓$Mn_2O_3$·⅓$MoO_2$ of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 22.

EXAMPLE 25

A sintering accelerant $TiO_2$-$Al_2O_3$-$SiO_2$ (ratio of 20:35:45 wt %) of 0.05 to 6.0 wt % mainly forming a liquid phase at a high temperature, a semiconducting accelerant $Nb_2O_5$ of 0.02 to 3.0 wt % which can form a solid solution with perovskite type oxides, a good oxygen conductive solid electrolyte $CeO_2$ of 0.05 to 4.0 wt % which functions as a control agent to control the grain growth, and a forming agent $Sr(Mn_{\frac{1}{2}}Nb_{\frac{1}{2}})O_3$ (0.1 to 12.0 wt %) to form a grain boundary depletion layer which also functions as a control agent to control the grain growth were added to strontium titanat ($SrTiO_3$) obtained by pyrolyzing titanyl strontium oxalate (SrTiO($C_2O_4$)$_2$·4$H_2O$) and mixed well followed by calcination at 900° C. Then it was ground in a wet state followed by drying, making grain, and molding, sintering at 1300° C. in the air. It was reground in a wet state, made into a paste using resin and organic solutions so as to form a sheet, printed platinum paste for inner electrodes were laminated thereon, sintered at 1400° C. in the air followed by the hydrogen reduction at 1300° C., and heat-treated at 950° C. in the air. Finally, electrodes were adjusted so as to connect inner electrodes with outer electrodes, thereby completing the manufacture of a laminated ceramic capacitor having grain boundary varistor characteristics of FIG. 1. Electric characteristics of the laminated ceramic capacitor were measured and the results are shown in Table 25. The sintering accelerant $TiO_2$-$Al_2O_3$-$SiO_2$ (ratio of 20:35:45 wt %) was obtained by weighing commercial $TiO_2$, $Al_2O_3$ and $SiO_2$ powder according to the predetermined weight ratio, mixing, calcinating at 1200° C., and grinding. The forming agent $Sr(Mn_{\frac{1}{2}}Nb_{\frac{1}{2}})O_3$ to form a grain boundary depletion layer which also functions as a control agent to control the grain growth was obtained by mixing commercial $SrCO_3$, $Nb_2O_5$, $MnCO_3$ or the like, calcinating at 1000° C., and grinding. The size of the varistor after sintering was approximately 4 mm square and about 0.6 mm in thickness and composed of 8 layers of the dielectrics, each of which was about 70 pm in thickness. The apparent dielectric constant was calculated from the value of the capacitance (measurement 1 kHz) of the laminated varistor. The grain diameter in the sintered body was obtained by examining a cross section after polishing under an optical microscope, to the surface of which $Bi_2O_3$ series metallic soap was applied and heat-treated at 1000° C. to make the grain boundary clear.

TABLE 25

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Mn_{1/2}Nb_{1/2})O_3$ (wt %) | solid electrolyte which functions as a control agent to control the grain growth $CeO_2$ (wt %) | mean grain ($\mu$m) | $\epsilon$ | tan $\delta$ (%) | rising voltage $V_1$mA (V/mm) | $\alpha$ |
|---|---|---|---|---|---|---|---|---|
| 0.05 | 0.2 | 0.5 | 0.8 | 2.0 | 2400 | 11.0 | 330 | 4.5 |
| 0.1 | 0.2 | 0.5 | 0.8 | 3.0 | 3400 | 1.2 | 960 | 14 |
| 0.5 | 0.2 | 0.5 | 0.8 | 3.5 | 4400 | 0.9 | 860 | 13 |
| 1.0 | 0.2 | 0.5 | 0.8 | 3.5 | 3800 | 1.0 | 910 | 12 |
| 3.0 | 0.2 | 0.5 | 0.8 | 3.0 | 3600 | 1.1 | 1040 | 13 |
| 5.0 | 0.2 | 0.5 | 0.8 | 3.0 | 3200 | 1.0 | 980 | 14 |
| 6.0 | 0.2 | 0.5 | 0.8 | 3.0 | 3300 | 1.2 | 1020 | 13 |
| 1.0 | 0.02 | 0.5 | 0.8 | 3.5 | 2100 | 19.0 | 850 | 3.0 |
| 1.0 | 0.05 | 0.5 | 0.8 | 3.0 | 3500 | 1.3 | 970 | 14 |
| 1.0 | 0.5 | 0.5 | 0.8 | 3.0 | 3100 | 0.9 | 1130 | 13 |
| 1.0 | 2.0 | 0.5 | 0.8 | 3.5 | 4000 | 1.0 | 880 | 14 |
| 1.0 | 3.0 | 0.5 | 0.8 | 3.0 | 2100 | 18.0 | 1030 | 6.0 |
| 1.0 | 0.2 | 0.1 | 0.8 | 3.0 | 2400 | 12.5 | 1010 | 3.5 |
| 1.0 | 0.2 | 0.2 | 0.8 | 3.5 | 3900 | 1.2 | 860 | 14 |
| 1.0 | 0.2 | 1.0 | 0.8 | 3.0 | 3100 | 1.1 | 1140 | 12 |
| 1.0 | 0.2 | 3.0 | 0.8 | 3.5 | 4100 | 1.0 | 870 | 11 |
| 1.0 | 0.2 | 10.0 | 0.8 | 3.0 | 3600 | 1.1 | 970 | 12 |
| 1.0 | 0.2 | 12.0 | 0.8 | 2.0 | 1300 | 5.5 | 350 | 6.0 |
| 1.0 | 0.2 | 0.5 | 0.05 | 2.5 | 1800 | 12.5 | 320 | 4.0 |
| 1.0 | 0.2 | 0.5 | 0.1 | 3.0 | 3200 | 1.4 | 990 | 13 |
| 1.0 | 0.2 | 0.5 | 0.5 | 3.5 | 4400 | 1.1 | 910 | 13 |
| 1.0 | 0.2 | 0.5 | 1.0 | 3.0 | 3400 | 1.0 | 930 | 12 |

TABLE 25-continued

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Mn_{1/2}Nb_{1/2})O_3$ (wt %) | solid electrolyte which functions as a control agent to control the grain growth $CeO_2$ (wt %) | mean grain (μm) | ε | tan δ (%) | rising voltage $V_1mA$ (V/mm) | α |
|---|---|---|---|---|---|---|---|---|
| 1.0 | 0.2 | 0.5 | 3.0 | 3.0 | 3100 | 1.0 | 1130 | 13 |
| 1.0 | 0.2 | 0.5 | 4.0 | 2.0 | 2100 | 12.5 | 350 | 5.0 |

As is apparent from the results in Table 25, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt %, and a forming agent $Sr(Mn_{\frac{1}{2}}Nb_{\frac{1}{2}})O_3$ of 0.2 to 10.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3.0 to 3.5 μm and the dielectric loss was 2.0% or less and the apparent dielectric constant was 3,000 or more. The riser voltage $V_1$ mA of the materials as a varistor was 850 to 1150 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained. When the amount of the sintering accelerant added exceeds 5%, the sintered body is prone to deform or adhere, therefore it is not practical.

EXAMPLE 26

A sintering accelerant of 1.0 wt % selected from $TiO_2$-MgO-$SiO_{02}$ series (for example, ratio of 30:30:40 wt %), $TiO_2$-MnO-$SiO_2$ series (for example, ratio of 10:50:40 wt %), $TiO_2$-$Al_2O_3$-$SiO_2$ series (for example, ratio of 20:35:45 wt %) mainly forming a liquid phase at a high temperature, a semiconducting accelerant $Y_2O_3$ of 0.04 wt % which can form a solid solution with perovskite type oxides, a good oxygen conductive solid electrolyte $CeO_2$ of 0.2 to 2.0 wt % which functions as a control agent to control the grain growth, and a forming agent $Sr(Mn_{\frac{1}{2}}Nb_{\frac{1}{2}})O_3$ of 0.4 to 8.0 wt % to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molded like a disk shape, sintered at 1380° C. in a reducing atmosphere composed of 95% of nitrogen and 5% of hydrogen. It was heat-treated at 950° C. in the air and silver electrodes were formed on both sides of the disk, thereby completing the manufacture of a ceramic capacitor having grain boundary varistor characteristics of FIG. 2. Electric characteristics of the laminated ceramic capacitor were measured and the results are shown in Table 26.

The sintering accelerant, for example $TiO_2$-MgO-$SiO_2$ series (for example, ratio of 30:30:40 wt %), was obtained by weighing commercial $TiO_2$, MgO and $SiO_2$ powder according to the predetermined weight ratio, mixing, calcinating at 1200° C., and grinding. The forming agent $Sr(Mn_{\frac{1}{2}}Nb_{\frac{1}{2}})O_3$ to form a grain boundary depletion layer which also functions as a control agent to control the grain growth was obtained by mixing commercial $SrCO_3$, $Nb_2O_5$ and $MnCO_3$, calcinating at 900° C., and grinding.

TABLE 26

| sintering accelerant (wt %) | semiconducting accelerant $Y_2O_3$ (wt %) | forming agent to form a grain boundary depletion layer which also functions as a control agent to control the grain growth $SrO(Mn_{1/2}Nb_{1/2})O_3$ (wt %) | solid electrolyte which functions as a control agent to control the grain growth $CeO_2$ (wt %) | mean grain (μm) | ε | tan δ (%) | $V_1mA$ (V/mm) | α |
|---|---|---|---|---|---|---|---|---|
| $TiO_2$—$Al_2O_3$—$SiO_2$ compound | | | | | | | | |
| 1.0 | 0.4 | 0.4 | 1.0 | 3.0 | 3100 | 1.2 | 1120 | 13 |
| 1.0 | 0.4 | 8.0 | 1.0 | 3.0 | 3300 | 1.4 | 950 | 12 |
| 1.0 | 0.4 | 1.0 | 0.2 | 3.0 | 3200 | 1.1 | 1050 | 13 |
| 1.0 | 0.4 | 1.0 | 2.0 | 3.0 | 3500 | 1.1 | 990 | 14 |
| $TiO_2$—MnO—$SiO_2$ compound | | | | | | | | |
| 1.0 | 0.4 | 0.4 | 1.0 | 3.5 | 3800 | 1.3 | 890 | 12 |
| 1.0 | 0.4 | 8.0 | 1.0 | 3.0 | 3400 | 1.2 | 1020 | 11 |
| 1.0 | 0.4 | 1.0 | 0.2 | 3.5 | 4000 | 1.2 | 910 | 12 |
| 1.0 | 0.4 | 1.0 | 2.0 | 3.0 | 3300 | 1.0 | 930 | 12 |
| $TIO_2$—MgO—$SiO_2$ compound | | | | | | | | |
| 1.0 | 0.4 | 0.4 | 1.0 | 3.0 | 3400 | 0.9 | 960 | 13 |
| 1.0 | 0.4 | 8.0 | 1.0 | 3.5 | 3900 | 1.1 | 880 | 12 |
| 1.0 | 0.4 | 1.0 | 0.2 | 3.5 | 4200 | 0.9 | 860 | 13 |

TABLE 26-continued

| sintering accelerant (wt %) | semiconducting accelerant $Y_2O_3$ (wt %) | forming agent to form a grain boundary depletion layer which also functions as a control agent to control the grain growth $SrO(Mn_{1/2}Nb_{1/2})O_3$ (wt %) | solid electrolyte which functions as a control agent to control the grain growth $CeO_2$ (wt %) | mean grain (μm) | ε | tan δ (%) | $V_1mA$ (V/mm) | α |
|---|---|---|---|---|---|---|---|---|
| 1.0 | 0.4 | 1.0 | 2.0 | 3.0 | 3300 | 1.2 | 930 | 12 |

As is apparent from the results in Table 26, the present material obtained by adding $SrTiO_2$ to a sintering accelerant such as $TiO_2$-MgO-$SiO_2$ of 1.0 wt %, a semiconducting accelerant $Y_2O_3$ of 0.4 wt %, a good oxygen conductive solid electrolyte $CeO_2$ of 0.2 to 2.0 wt % which also functions as a control agent to control the grain growth, and a forming agent of 0.4 to 3.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 25.

EXAMPLE 27

A sintering accelerant of 3.0 wt % of $TiO_2$-MgO-$SiO_2$ series (for example, ratio of 30:30:40 wt %) mainly forming a liquid phase at a high temperature, semiconducting accelerants $WO_3$, $Nb_2O_5$, $La_2O_3$ and $Y_2O_3$ of 0.05 to 2.0 wt %, a good oxygen conductive solid electrolyte $CeO_2$ of 1.5 wt % which functions as a control agent to control the grain growth, and a forming agent $Sr_{0.8}Ba_{0.1}Ca_{0.1}(Mn_{\frac{1}{2}}Nb_{\frac{1}{2}})O_3$ or $Sr_{0.6}Ba_{0.2}Ca_{0.2}(Mn_{\frac{1}{2}}Nb_{\frac{1}{2}})O_3$ of 2.0 wt % to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molding; sintering at 1380° C. in the reducing atmosphere composed of 95% of nitrogen and 5% of hydrogen. It was heat-treated at 950° C. in the air and electrodes were formed, thereby completing the manufacture of a ceramic capacitor having grain boundary varistor characteristics of FIG. 2. Electric characteristics of the laminated ceramic capacitor were measured and the results are shown in Table 27.

The sintering accelerant $TiO_2$-MgO$_{SiO_2}$ series (ratio of 30:30:40 wt %) was obtained by weighing commercial $TiO_2$, MgO, $SiO_2$ powder according to the predetermined weight ratio, mixing, calcinating at 1200° C., and grinding. The forming agent to form a grain boundary depletion layer which also functions as a control agent to control the grain growth was obtained by mixing commercial $SrCO_3$, $BaCO_3$, $CaCO_3$, $Nb_2O_5$ and $MnCO_3$, calcinating at 900° C., and grinding.

TABLE 27

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain (μm) | ε | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Mn_{1/2}Nb_{1/2})O_3$ 2.0 | 1.5 | 3.5 | 4100 | 1.0 | 880 | 14 |
| 3.0 | $Nb_2O_5$ 0.05 | $Sr_{0.8}Ba_{0.1}Ca_{0.1}(Mn_{1/2}Nb_{1/2})O_3$ 2.0 | 1.5 | 3.0 | 3200 | 1.2 | 960 | 13 |
| 3.0 | $La_2O_3$ 0.05 | $Sr_{0.8}Ba_{0.1}Ca_{0.1}(Mn_{1/2}Nb_{1/2})O_3$ 2.0 | 1.5 | 3.0 | 3300 | 1.2 | 1010 | 13 |
| 3.0 | $Y_2O_3$ 0.05 | $Sr_{0.8}Ba_{0.1}Ca_{0.1}(Mn_{1/2}Nb_{1/2})O_3$ 2.0 | 1.5 | 3.5 | 3800 | 1.4 | 860 | 12 |
| 3.0 | $WO_3$ 0.50 | $Sr_{0.6}Ba_{0.2}Ca_{0.2}(Mn_{1/2}Nb_{1/2})O_3$ 2.0 | 1.5 | 3.0 | 3400 | 1.3 | 970 | 13 |
| 3.0 | $Nb_2O_6$ 0.50 | $Sr_{0.6}Ba_{0.2}Ca_{0.2}(Mn_{1/2}Nb_{1/2})O_3$ 2.0 | 1.5 | 3.5 | 4000 | 1.2 | 870 | 12 |
| 3.0 | $La_2O_3$ 0.50 | $Sr_{0.6}Ba_{0.2}Ca_{0.2}(Mn_{1/2}Nb_{1/2})O_3$ 2.0 | 1.5 | 3.0 | 3600 | 1.2 | 950 | 14 |
| 3.0 | $Y_2O_3$ 0.50 | $Sr_{0.6}Ba_{0.2}Ca_{0.2}(Mn_{1/2}Nb_{1/2})O_3$ 2.0 | 1.5 | 3.0 | 3300 | 1.0 | 1020 | 13 |
| 3.0 | $WO_3$ 2.0 | $Sr_{0.8}Ba_{0.1}Ca_{0.1}(Mn_{1/2}Nb_{1/2})O_3$ 2.0 | 1.5 | 3.5 | 4200 | 1.0 | 900 | 14 |
| 3.0 | $Nb_2O_5$ 2.0 | $Sr_{0.8}Ba_{0.1}Ca_{0.1}(Mn_{1/2}Nb_{1/2})O_3$ 2.0 | 1.5 | 3.0 | 3500 | 1.2 | 980 | 14 |
| 3.0 | $La_2O_3$ 2.0 | $Sr_{0.8}Ba_{0.1}Ca_{0.1}(Mn_{1/2}Nb_{1/2})O_3$ 2.0 | 1.5 | 3.0 | 3200 | 1.2 | 910 | 13 |
| 3.0 | $Y_2O_3$ 2.0 | $Sr_{0.8}Ba_{0.1}Ca_{0.1}(MN_{1/2}Nb_{1/2})O_3$ 2.0 | 1.5 | 3.5 | 3900 | 1.4 | 680 | 12 |

As is apparent from the results in Table 27, the present material obtained by adding $SrTiO_3$ to a sintering accelerant such as $TiO_2$—MgO—$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 25.

EXAMPLE 28

A capacitor was manufactured according to the method in Example 25 including the manufacturing method for other materials, sintering accelerant or the like, except that the forming agent $Sr(Mn_{\frac{1}{2}}Ta_{\frac{1}{2}})O_3$ (0.1 to 12.0 wt %) was used instead of the forming agent $Sr(Mn_{\frac{1}{2}}Nb_{\frac{1}{2}})$ (0.1 to 12.0 wt %) to form a grain boundary depletion both of which also function as a control agent to control the grain growth and electric characteristics thereof were measured by the same method as Example 25.

The results are shown in Table 28.

The forming agent $Sr(Mn_{\frac{1}{2}}Ta_{\frac{1}{2}})O_3$ to form a grain boundary depletion which also functions as a control agent to control the grain growth was obtained by mixing commercial $SrCO_3$, $Ta_2O_5$, $MnCO_3$ or the like, sintering at 1000° C. and grinding.

the sintered body were uniform and the mean grain diameter was approximately 3.0 to 3.5 μm and the dielectric loss was 2.0% or less and the apparent dielectric constant was 3000 or more. The riser voltage $V_1$ mA of the materials as a varistor was 750 to 1000 V/mm and the resistance non-linearity coeffecient α is 10 or more in most cases between $V_1$ mA to $V_{0.1}$ mA. Other values such as surge durability as a varistor, the ratio of limited voltage representing the non-linearity resistive characteristics in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 29

A capacitor was manufactured according to the method in Example 26 including the manufacturing method for other materials, sintering accelerant or the

TABLE 28

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Mn_{1/2}Ta_{1/2})O_3$ (wt %) | solid electrolyte which functions as a control agent to control the grain growth $CeO_2$ (wt %) | mean grain (μm) | ε | tan δ (%) | rising voltage $V_1$mA (V/mm) | α |
|---|---|---|---|---|---|---|---|---|
| 0.05 | 0.2 | 0.5 | 0.8 | 2.0 | 3500 | 23.0 | 350 | 3.5 |
| 0.1 | 0.2 | 0.5 | 0.8 | 3.5 | 3600 | 1.8 | 910 | 11 |
| 0.5 | 0.2 | 0.5 | 0.8 | 3.0 | 3300 | 1.7 | 960 | 12 |
| 1.0 | 0.2 | 0.5 | 0.8 | 3.5 | 3900 | 0.5 | 830 | 13 |
| 3.0 | 0.2 | 0.5 | 0.8 | 3.5 | 4200 | 1.4 | 880 | 12 |
| 5.0 | 0.2 | 0.5 | 0.8 | 4.0 | 4600 | 1.1 | 800 | 12 |
| 6.0 | 0.2 | 0.5 | 0.8 | 4.0 | 4700 | 1.3 | 760 | 12 |
| 1.0 | 0.02 | 0.5 | 0.8 | 2.0 | 2500 | 33.0 | 420 | 6.0 |
| 1.0 | 0.05 | 0.5 | 0.8 | 3.5 | 4300 | 1.6 | 890 | 11 |
| 1.0 | 0.5 | 0.5 | 0.8 | 3.0 | 3600 | 1.3 | 980 | 12 |
| 1.0 | 2.0 | 0.5 | 0.8 | 3.5 | 3700 | 1.7 | 860 | 11 |
| 1.0 | 3.0 | 0.5 | 0.8 | 2.0 | 2200 | 18.5 | 260 | 5.5 |
| 1.0 | 0.2 | 0.1 | 0.8 | 3.0 | 2700 | 25.5 | 310 | 4.5 |
| 1.0 | 0.2 | 0.2 | 0.8 | 3.0 | 3300 | 1.9 | 940 | 11 |
| 1.0 | 0.2 | 1.0 | 0.8 | 3.5 | 3900 | 1.4 | 810 | 12 |
| 1.0 | 0.2 | 3.0 | 0.8 | 4.0 | 5100 | 1.3 | 770 | 13 |
| 1.0 | 0.2 | 10.0 | 0.8 | 3.5 | 4100 | 1.8 | 870 | 13 |
| 1.0 | 0.2 | 12.0 | 0.8 | 2.5 | 2700 | 20.5 | 400 | 4.5 |
| 1.0 | 0.2 | 0.5 | 0.05 | 4.0 | 2500 | 17.7 | 280 | 5.0 |
| 1.0 | 0.2 | 0.5 | 0.1 | 3.5 | 4400 | 1.7 | 830 | 12 |
| 1.0 | 0.2 | 0.5 | 0.5 | 3.5 | 3800 | 1.7 | 890 | 12 |
| 1.0 | 0.2 | 0.5 | 1.0 | 3.5 | 4200 | 1.4 | 810 | 13 |
| 1.0 | 0.2 | 0.5 | 3.0 | 3.0 | 3400 | 1.3 | 980 | 11 |
| 1.0 | 0.2 | 0.5 | 4.0 | 2.5 | 2500 | 18.8 | 320 | 4.0 |

As is apparent from the results in Table 28, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt % which also functions as a control agent to control the grain growth, and a forming agent $Sr(Mn_{\frac{1}{2}}Ta_{\frac{1}{2}})O_3$ of 0.2 to 10.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in like, except that the forming agent $Sr(Mn_{\frac{1}{2}}Ta_{\frac{1}{2}})O_3$ (0.4 to 8.0 wt %) was used instead of the forming agent $Sr(Mn_{\frac{1}{2}}Nb_{\frac{1}{2}})$ (0.4 to 8.0 wt %) to form a grain boundary depletion both of which also function as control agents to control grain growth and electric characteristics thereof was measured by the same method as Example 26. The results are shown in Table 29. The forming agent $Sr(Mn_{\frac{1}{2}}Ta_{\frac{1}{2}})O_3$ to form a grain boundary depletion which also functions as a control agent to control grain growth was obtained by mixing commercial $SrCO_3$, $Ta_2O_5$, $MnCO_3$ or the like, sintering at 900° C. and grinding.

TABLE 29

| sintering accelerant (wt %) | semiconducting accelerant $Y_2O_3$ (wt %) | forming agent to form a grain boundary depletion layer which also functions as a control agent to control the grain growth $Sr(Mn_{1/2}Ta_{1/2})O_3$ (wt %) | solid electrolyte which functions as a control agent to control the grain growth $CeO_2$ (wt %) | mean grain (μm) | $\epsilon$ | tan δ (%) | $V_1mA$ (V/mm) | α |
|---|---|---|---|---|---|---|---|---|
| $TiO_2$—$Al_2O_3$—$SiO_2$ compound | | | | | | | | |
| 1.0 | 0.4 | 0.4 | 1.0 | 3.5 | 4200 | 1.4 | 850 | 12 |
| 1.0 | 0.4 | 8.0 | 1.0 | 3.5 | 4000 | 1.5 | 890 | 12 |
| 1.0 | 0.4 | 1.0 | 0.2 | 4.0 | 4900 | 1.6 | 790 | 11 |
| 1.0 | 0.4 | 1.0 | 2.0 | 3.0 | 3400 | 1.3 | 920 | 11 |
| $TiO_2$—$MnO$—$SiO_2$ compound | | | | | | | | |
| 1.0 | 0.4 | 0.4 | 1.0 | 3.5 | 3800 | 1.7 | 830 | 12 |
| 1.0 | 0.4 | 8.0 | 1.0 | 3.5 | 4100 | 1.4 | 880 | 11 |
| 1.0 | 0.4 | 1.0 | 0.2 | 3.5 | 4200 | 1.4 | 900 | 11 |
| 1.0 | 0.4 | 1.0 | 2.0 | 3.5 | 3900 | 1.6 | 830 | 11 |
| $TiO_2$—$MgO$—$SiO_2$ compound | | | | | | | | |
| 1.0 | 0.4 | 0.4 | 1.0 | 4.0 | 4800 | 1.3 | 800 | 12 |
| 1.0 | 0.4 | 8.0 | 1.0 | 3.5 | 3700 | 1.6 | 850 | 12 |
| 1.0 | 0.4 | 1.0 | 0.2 | 4.0 | 5000 | 1.7 | 780 | 11 |
| 1.0 | 0.4 | 1.0 | 2.0 | 3.5 | 4200 | 1.7 | 870 | 12 |

As is apparent from the results in Table 29, the present material obtained by adding $SrTiO_3$ to a sintering accelerant such as $TiO_2$—$MgO$—$SiO_2$ of 1.0 wt % mainly forming a liquid phase at high temperature, a semiconducting accelerant $Y_2O_3$ of 0.4 wt %, a good oxygen conductive solid electrolyte $CeO_2$ of 0.2 to 2.0 wt % which also functions as a control agent to control the grain growth, and a forming agent of 0.4 to 8.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 28.

EXAMPLE 30

The forming agent $Sr_{0.8}Ba_{0.1}Ca_{0.1}(Mn_{\frac{1}{2}}Ta_{\frac{1}{2}})O_3$ or $Sr_{0.6}Ba_{0.2}Ca_{0.2}(Mn_{\frac{1}{2}}Nb_{\frac{1}{2}})O_3$ of 2.0 wt % was added instead of the forming agent $Sr_{0.8}Ba_{0.1}Ca_{0.1}(Mn_{\frac{1}{2}}Nb_{\frac{1}{2}})$ or $Sr_{0.6}Ba_{0.2}Ca_{0.2}(Mn_{\frac{1}{2}}Nb_{\frac{1}{2}})O_3$ of 2.0 wt % to form a grain boundary depletion of Example 27. The manufacturing method for other materials, sintering accelerant or the like, was the same as Example 27 and electric characteristics thereof were measured by the same method as Example 27. The forming agent to form a grain boundary depletion which also functions as a control agent to control the grain growth was obtained by mixing commercial $SrCO_3$, $BaCO_3$, $CaCO_3$, $Ta_2O_5$, and $MnCO_3$ sintering at 900° C. and grinding.

TABLE 30

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain (μm) | $\epsilon$ | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Mn_{1/2}Ta_{1/2})O_3$ 2.0 | 1.5 | 4.0 | 5000 | 1.2 | 790 | 12 |
| 3.0 | $Nb_2O_5$ 0.05 | $Sr_{0.8}Ba_{0.1}Ca_{0.1}(Mn_{1/2}Ta_{1/2})O_3$ 2.0 | 1.5 | 3.5 | 4200 | 1.2 | 820 | 13 |
| 3.0 | $La_2O_3$ 0.05 | $Sr_{0.8}Ba_{0.1}Ca_{0.1}(Mn_{1/2}Ta_{1/2})O_3$ 2.0 | 1.5 | 3.5 | 3800 | 1.3 | 870 | 13 |
| 3.0 | $Y_2O_3$ 0.05 | $Sr_{0.8}Ba_{0.1}Ca_{0.1}(Mn_{1/2}Ta_{1/2})O_3$ 2.0 | 1.5 | 3.0 | 3400 | 1.4 | 940 | 12 |
| 3.0 | $WO_3$ 0.50 | $Sr_{0.6}Ba_{0.2}Ca_{0.2}(Mn_{1/2}Ta_{1/2})O_3$ 2.0 | 1.5 | 4.0 | 4800 | 1.3 | 800 | 11 |
| 3.0 | $Nb_2O_6$ 0.50 | $Sr_{0.6}Ba_{0.2}Ca_{0.2}(Mn_{1/2}Ta_{1/2})O_3$ 2.0 | 1.5 | 3.5 | 4100 | 1.3 | 840 | 13 |
| 3.0 | $La_2O_3$ 0.50 | $Sr_{0.6}Ba_{0.2}Ca_{0.2}(Mn_{1/2}Ta_{1/2})O_3$ 2.0 | 1.5 | 3.5 | 3700 | 1.6 | 810 | 11 |
| 3.0 | $Y_2O_3$ 0.50 | $Sr_{0.6}Ba_{0.2}Ca_{0.2}(Mn_{1/2}Ta_{1/2})O_3$ 2.0 | 1.5 | 4.0 | 4900 | 1.5 | 790 | 12 |
| 3.0 | $WO_3$ 2.0 | $Sr_{0.8}Ba_{0.1}Ca_{0.1}(Mn_{1/2}Ta_{1/2})O_3$ 2.0 | 1.5 | 3.5 | 4300 | 1.2 | 830 | 12 |
| 3.0 | $Nb_2O_5$ 2.0 | $Sr_{0.8}Ba_{0.1}Ca_{0.1}(Mn_{1/2}Ta_{1/2})O_3$ 2.0 | 1.5 | 4.0 | 4700 | 1.2 | 770 | 13 |
| 3.0 | $La_2O_3$ 2.0 | $Sr_{0.8}Ba_{0.1}Ca_{0.1}(Mn_{1/2}Ta_{1/2})O_3$ 2.0 | 1.5 | 3.5 | 3800 | 1.3 | 870 | 13 |
| 3.0 | $Y_2O_3$ | $Sr_{0.8}Ba_{0.1}Ca_{0.1}$ | 1.5 | 3.0 | 3500 | 1.4 | 920 | 12 |

TABLE 30-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain (μm) | ε | tan δ (%) | $V_1$mA (V/mm) | α |
|---|---|---|---|---|---|---|---|---|
| | 2.0 | $(Mn_{1/2}Ta_{1/2})O_3$ 2.0 | | | | | | |

As is apparent from the results in Table 30, the present material obtained by adding $SrTiO_3$ to a sintering accelerant such as $TiO_2$—MgO—$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 28.

EXAMPLE 31

A capacitor was manufactured according to the method in Example 25 including the manufacturing method for other materials, sintering accelerant or the like, except that the forming agent $Sr(Cu_{\frac{1}{2}}W_{\frac{1}{2}})O_3$ (0.1 to 6.0 wt %) was used instead of the forming agent $Sr(Mn_{\frac{1}{2}}Nb_{\frac{1}{2}})$ (0.1 to 12.0 wt %) to form a grain boundary depletion and electric characteristics thereof were measured by the same method as Example 25. The results are shown in Table 31. The forming agent $Sr(Cu_{\frac{1}{2}}W_{\frac{1}{2}})O_3$ to form a grain boundary depletion which also functions as a control agent to control the grain growth was obtained by mixing commercial $SrCO_3$, $WO_3$, CuO or the like, sintering at 1000° C. and grinding.

TABLE 31

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/2}W_{1/2})O_3$ (wt %) | solid electrolyte which functions as a control agent to control the grain growth $CeO_2$ (wt %) | mean grain (μm) | ε | tan δ (%) | rising voltage $V_1$mA (V/mm) | α |
|---|---|---|---|---|---|---|---|---|
| 0.05 | 0.2 | 0.5 | 0.8 | 2.5 | 1800 | 18.0 | 460 | 2.5 |
| 0.1 | 0.2 | 0.5 | 0.8 | 3.5 | 4200 | 1.9 | 880 | 12 |
| 0.5 | 0.2 | 0.5 | 0.8 | 3.5 | 4000 | 0.5 | 900 | 12 |
| 1.0 | 0.2 | 0.5 | 0.8 | 3.0 | 3600 | 0.5 | 940 | 13 |
| 3.0 | 0.2 | 0.5 | 0.8 | 3.5 | 4100 | 1.7 | 900 | 13 |
| 5.0 | 0.2 | 0.5 | 0.8 | 3.5 | 4100 | 1.6 | 850 | 12 |
| 6.0 | 0.2 | 0.5 | 0.8 | 3.5 | 3800 | 1.8 | 870 | 12 |
| 1.0 | 0.02 | 0.5 | 0.8 | 3.0 | 2500 | 25.0 | 340 | 3.5 |
| 1.0 | 0.05 | 0.5 | 0.8 | 3.0 | 3300 | 1.8 | 910 | 13 |
| 1.0 | 0.5 | 0.5 | 0.8 | 3.0 | 3100 | 0.5 | 950 | 13 |
| 1.0 | 2.0 | 0.5 | 0.8 | 3.5 | 3900 | 0.5 | 830 | 12 |
| 1.0 | 3.0 | 0.5 | 0.8 | 3.5 | 2500 | 17.0 | 330 | 4.5 |
| 1.0 | 0.2 | 0.1 | 0.8 | 3.5 | 2200 | 22.0 | 430 | 4.0 |
| 1.0 | 0.2 | 0.2 | 0.8 | 3.5 | 4200 | 1.6 | 870 | 11 |
| 1.0 | 0.2 | 0.5 | 0.8 | 3.0 | 3500 | 1.4 | 970 | 12 |
| 1.0 | 0.2 | 2.0 | 0.8 | 3.5 | 4100 | 1.6 | 850 | 12 |
| 1.0 | 0.2 | 5.0 | 0.8 | 3.0 | 3500 | 1.8 | 980 | 13 |
| 1.0 | 0.2 | 6.0 | 0.8 | 3.0 | 2400 | 18.0 | 530 | 4.5 |
| 1.0 | 0.2 | 0.5 | 0.05 | 3.5 | 2800 | 17.0 | 310 | 2.5 |
| 1.0 | 0.2 | 0.5 | 0.1 | 3.5 | 4000 | 1.8 | 890 | 11 |
| 1.0 | 0.2 | 0.5 | 0.5 | 3.0 | 3200 | 1.7 | 980 | 12 |
| 1.0 | 0.2 | 0.5 | 1.0 | 3.0 | 3500 | 1.7 | 930 | 12 |
| 1.0 | 0.2 | 0.5 | 3.0 | 3.0 | 3300 | 0.5 | 910 | 11 |
| 1.0 | 0.2 | 0.5 | 4.0 | 2.5 | 2700 | 10.0 | 280 | 3.5 |

As is apparent from the results in Table 31, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt %, and a forming agent $Sr(Cu_{\frac{1}{2}}W_{\frac{1}{2}})O_3$ of 0.2 to 5.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3.0 to 3.5 μm and the dielectric loss was 2.0% or less and the apparent dielectric constant was 3,000 or more. The riser voltage $V_1$ mA of the materials as a varistor was 800 to 1000 V/mm and the resistance non-linearity coeffecient α is 10 or more in most cases between $V_2$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained. When the amount of the sintering accelerant added exceeds 5%, the sintered body is prone to deform or adhere, therefore it is not practical.

EXAMPLE 32

A capacitor was manufactured according to the method in Example 26 including the manufacturing method for other materials, sintering accelerant or the like, except that the forming agent $Sr(Cu_{\frac{1}{2}}W_{\frac{1}{2}})O_3$ (0.4 to 4.0 wt %) was used instead of the forming agent $Sr(Mn_{\frac{1}{2}}Nb_{\frac{1}{2}})O_3$ (0.4 to 8.0 wt %) to form a grain boundary depletion and electric characteristics thereof were measured by the same method as Example 26. The results are shown in Table 32. The forming agent $Sr(Cu_{\frac{1}{2}}W_{\frac{1}{2}})O_3$ to form a grain boundary depletion which also functions as a control agent to control the grain growth was obtained by mixing commercial $SrCO_3$, $WO_3$ and $CuO$, sintering at 900° C. and grinding.

the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 31.

EXAMPLE 33

The forming agent $Sr_{0.8}Ba_{0.1}Ca_{0.1}(Cu_{\frac{1}{2}}W_{\frac{1}{2}})O_3$ or $Sr_{0.6}Ba_{0.2}Ca_{0.2}(Cu_{\frac{1}{2}}W_{\frac{1}{2}})O_3$ of 2.0 wt % was added instead of the forming agent $Sr_{0.8}Ba_{0.1}Ca_{0.1}(Mn_{\frac{1}{2}}Nb_{\frac{1}{2}})$ or $Sr_{0.6}Ba_{0.2}Ca_{0.2}(Mn_{\frac{1}{2}}Nb_{\frac{1}{2}})O_3$ of 2.0 wt % to form a grain boundary depletion of Example 27. The manufacturing method for other materials, sintering accelerant or the like, was the same as Example 27 and electric characteristics thereof were measured by the same method as

TABLE 32

| sintering accelerant (wt %) | semiconducting accelerant $Y_2O_3$ (wt %) | forming agent to form a grain boundary depletion layer which also functions as a control agent to control the grain growth $Sr(Cu_{1/2}W_{1/2})O_3$ (wt %) | solid electrolyte which functions as a control agent to control the grain growth $CeO_2$ (wt %) | mean grain (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |
| 1.0 | 0.4 | 0.4 | 2.0 | 3.0 | 3500 | 1.6 | 920 | 12 |
| 1.0 | 0.4 | 4.0 | 2.0 | 3.5 | 4200 | 0.5 | 840 | 12 |
| 1.0 | 0.4 | 1.0 | 0.2 | 3.5 | 4100 | 1.4 | 870 | 13 |
| 1.0 | 0.4 | 1.0 | 1.0 | 3.0 | 3600 | 0.5 | 940 | 12 |
| $TiO_2$—$MnO$—$SiO_2$ compound | | | | | | | | |
| 1.0 | 0.4 | 0.4 | 2.0 | 3.5 | 3800 | 1.4 | 890 | 12 |
| 1.0 | 0.4 | 4.0 | 2.0 | 3.0 | 3300 | 1.4 | 990 | 13 |
| 1.0 | 0.4 | 1.0 | 0.2 | 3.5 | 4000 | 1.3 | 820 | 12 |
| 1.0 | 0.4 | 1.0 | 1.0 | 3.0 | 3400 | 1.6 | 980 | 12 |
| $TiO_2$—$MgO$—$SiO_2$ compound | | | | | | | | |
| 1.0 | 0.4 | 0.4 | 2.0 | 3.5 | 4100 | 0.5 | 850 | 13 |
| 1.0 | 0.4 | 4.0 | 2.0 | 3.5 | 4400 | 1.3 | 880 | 12 |
| 1.0 | 0.4 | 1.0 | 0.2 | 3.5 | 3900 | 1.4 | 900 | 12 |
| 1.0 | 0.4 | 1.0 | 1.0 | 3.0 | 3600 | 1.2 | 950 | 12 |

As is apparent from the results in Table 32, the present material obtained by adding $SrTiO_3$ to a sintering accelerant such as $TiO_2$—$MgO$—$SiO_2$ of 1.0 wt % mainly forming a liquid phase at a high temperature, a semiconducting accelerant $Y_2O_3$ of 0.4 wt %, a good oxygen conductive solid electrolyte $CeO_2$ of 0.2 to 2.0 wt % which also functions as a control agent to control Example 27. The forming agent to form a grain boundary depletion which also functions as a control agent to control the grain growth was obtained by mixing commercial $SrCO_3$, $BaCO_3$, $CaCO_3$, $WO_3$ and $CuO$, sintering at 900° C. and grinding. The results are shown in Table 33.

TABLE 33

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain (μm) | ε | tan δ (%) | $V_1$mA (V/mm) | α |
|---|---|---|---|---|---|---|---|---|
| 3.0 | $WO_3$ 0.05 | $Sr_{0.8}Ba_{0.1}Ca_{0.1}(Cu_{1/2}W_{1/2})O_3$ 2.0 | 1.5 | 3.0 | 3400 | 1.3 | 930 | 12 |
| 3.0 | $Nb_2O_5$ 0.05 | $Sr_{0.8}Ba_{0.1}Ca_{0.1}(Cu_{1/2}W_{1/2})O_3$ 2.0 | 1.5 | 3.0 | 3600 | 1.6 | 970 | 12 |
| 3.0 | $La_2O_3$ 0.05 | $Sr_{0.8}Ba_{0.1}Ca_{0.1}9Cu_{1/2}W_{1/2})O_3$ 2.0 | 1.5 | 3.5 | 3900 | 0.5 | 890 | 11 |
| 3.0 | $Y_2O_3$ 0.05 | $Sr_{0.8}Ba_{0.1}Ca_{0.1}(Cu_{1/2}W_{1/2})O_3$ 2.0 | 1.5 | 3.0 | 3500 | 1.2 | 910 | 12 |
| 3.0 | $WO_3$ 0.50 | $Sr_{0.6}Ba_{0.2}Ca_{0.2}(Cu_{1/2}W_{1/2})O_3$ 2.0 | 1.5 | 3.5 | 4300 | 1.2 | 870 | 13 |
| 3.0 | $Nb_2O_5$ 0.50 | $Sr_{0.6}Ba_{0.2}Ca_{0.2}(Cu_{1/2}W_{1/2})O_3$ 2.0 | 1.5 | 3.0 | 3300 | 1.2 | 950 | 11 |
| 3.0 | $La_2O_3$ 0.50 | $Sr_{0.6}Ba_{0.2}Ca_{0.2}(Cu_{1/2}W_{1/2})O_3$ 2.0 | 1.5 | 3.0 | 3600 | 1.1 | 930 | 13 |

TABLE 33-continued

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain ($\mu$m) | $\epsilon$ | tan $\delta$ (%) | $V_1$mA (V/mm) | $\alpha$ |
|---|---|---|---|---|---|---|---|---|
| 3.0 | $Y_2O_3$ 0.50 | $Sr_{0.6}Ba_{0.2}Ca_{0.2}(Cu_{1/2}W_{1/2})O_3$ 2.0 | 1.5 | 3.5 | 4000 | 1.3 | 860 | 12 |
| 3.0 | $WO_3$ 2.0 | $Sr_{0.8}Ba_{0.1}Ca_{0.1}(Cu_{1/2}W_{1/2})O_3$ 2.0 | 1.5 | 3.0 | 3400 | 1.3 | 970 | 13 |
| 3.0 | $Nb_2O_5$ 2.0 | $Sr_{0.8}Ba_{0.1}Ca_{0.1}(Cu_{1/2}W_{1/2})O_3$ 2.0 | 1.5 | 3.0 | 3500 | 1.6 | 930 | 13 |
| 3.0 | $La_2O_3$ 2.0 | $Sr_{0.8}Ba_{0.1}Ca_{0.1}(Cu_{1/2}W_{1/2})O_3$ 2.0 | 1.5 | 3.5 | 4100 | 0.5 | 890 | 11 |
| 3.0 | $Y_2O_3$ 2.0 | $Sr_{0.8}Ba_{0.1}Ca_{0.1}(Cu_{1/2}W_{1/2})O_3$ 2.0 | 1.5 | 3.0 | 3300 | 1.2 | 910 | 12 |

As is apparent from the results in Table 33, the present material obtained by adding $SrTiO_3$ to a sintering accelerant such as $TiO_2$—$MgO$—$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 31.

EXAMPLE 34

A capacitor was manufactured according to the method in Example 25 including the manufacturing method for other materials, sintering accelerant or the like, except that the forming agent $Sr(Co_{\frac{1}{2}}W_{\frac{1}{2}})O_3$ (0.1 to 6.0 wt %) was used instead of the forming agent $Sr(Mn_{\frac{1}{2}}Nb_{\frac{1}{2}})$ (0.1 to 12.0 wt %) to form a grain boundary depletion both of which also function as control agents to control the grain growth and electric characteristics thereof were measured by the same method as Example 25. The results are shown in Table 34.

The forming agent $Sr(Co_{\frac{1}{2}}W_{\frac{1}{2}})O_3$ to form grain boundary depletion which also functions as a control agent to control the grain growth was obtained by mixing commercial $SrCO_3$, $WO_3$, $CoO$ or the like, sintering at 1000° C. and grinding.

TABLE 34

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $CeO_2$ (wt %) | mean grain ($\mu$m) | $\epsilon$ | tan $\delta$ (%) | rising voltage $V_1$mA (V/mm) | $\alpha$ |
|---|---|---|---|---|---|---|---|---|
| 0.05 | 0.2 | 0.5 | 0.8 | 1.0 | 1300 | 27.5 | 330 | 3.5 |
| 0.1 | 0.2 | 0.5 | 0.8 | 3.0 | 3200 | 1.7 | 950 | 11 |
| 0.5 | 0.2 | 0.5 | 0.8 | 3.5 | 3800 | 1.6 | 910 | 12 |
| 1.0 | 0.2 | 0.5 | 0.8 | 3.5 | 4000 | 0.5 | 870 | 11 |
| 3.0 | 0.2 | 0.5 | 0.8 | 3.5 | 4100 | 1.7 | 860 | 12 |
| 5.0 | 0.2 | 0.5 | 0.8 | 3.5 | 4100 | 1.7 | 890 | 11 |
| 6.0 | 0.2 | 0.5 | 0.8 | 3.5 | 4300 | 1.4 | 900 | 12 |
| 1.0 | 0.02 | 0.5 | 0.8 | 3.5 | 3300 | 24.0 | 240 | 2.5 |
| 1.0 | 0.05 | 0.5 | 0.8 | 3.5 | 3900 | 1.7 | 890 | 11 |
| 1.0 | 0.5 | 0.5 | 0.8 | 3.0 | 3400 | 1.6 | 980 | 12 |
| 1.0 | 2.0 | 0.5 | 0.8 | 3.5 | 4200 | 1.6 | 870 | 12 |
| 1.0 | 3.0 | 0.5 | 0.8 | 3.5 | 3100 | 20.5 | 270 | 3.5 |
| 1.0 | 0.2 | 0.1 | 0.8 | 3.5 | 3200 | 17.5 | 330 | 5.5 |
| 1.0 | 0.2 | 0.2 | 0.8 | 3.5 | 4200 | 1.7 | 860 | 11 |
| 1.0 | 0.2 | 0.5 | 0.8 | 3.0 | 3600 | 0.5 | 960 | 12 |
| 1.0 | 0.2 | 2.0 | 0.8 | 3.0 | 3500 | 1.6 | 990 | 11 |
| 1.0 | 0.2 | 5.0 | 0.8 | 3.0 | 3400 | 1.7 | 920 | 12 |
| 1.0 | 0.2 | 6.0 | 0.8 | 2.5 | 2800 | 12.5 | 550 | 5.5 |
| 1.0 | 0.2 | 0.5 | 0.05 | 3.5 | 3100 | 17.0 | 490 | 4.0 |
| 1.0 | 0.2 | 0.5 | 0.1 | 3.5 | 4400 | 1.6 | 870 | 11 |
| 1.0 | 0.2 | 0.5 | 0.5 | 3.5 | 4100 | 1.6 | 910 | 12 |
| 1.0 | 0.2 | 0.5 | 1.0 | 3.5 | 4300 | 1.7 | 900 | 11 |
| 1.0 | 0.2 | 0.5 | 3.0 | 3.0 | 3600 | 1.6 | 960 | 11 |
| 1.0 | 0.2 | 0.5 | 4.0 | 2.0 | 2200 | 15.0 | 460 | 6.5 |

As is apparent from the results in Table 34, the present material obtained by adding $SrTiO_3$ to a sintering accelerant $TiO_2$-$Al_2O_3$-$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt % which also functions as a control agent to control the grain growth, and a forming agent $Sr(Co_{\frac{1}{2}}W_{\frac{1}{2}})O$ of 0.2 to 5.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3.0 to 3.5 μm and the dielectric loss was 2.0% or less and the apparent dielectric constant was 3,000 or more. The riser voltage $V_1$ mA of the materials as a varistor was 850 to 1000 V/mm and the resistance non-linearity coeffecient $\alpha$ is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 35

A capacitor was manufactured according to the method in Example 26 including the manufacturing method for other materials, sintering accelerant or the like, except that the forming agent $Sr(Co_{\frac{1}{2}}W_{\frac{1}{2}})O_3$ (0.4 to 4.0 wt %) was used instead of the forming agent $Sr(Mn_{\frac{1}{2}}Nb_{\frac{1}{2}})O_3$ (0.4 to 8.0 wt %) to form a grain boundary depletion both of which function as control agents to control the grain growth and electric characteristics thereof were measured by the same method as Example 26. The results are shown in Table 35.

The forming agent $Sr(Co_{\frac{1}{2}}W_{\frac{1}{2}})O_3$ to form a grain boundary depletion which also functions as a control agent to control the grain growth was obtained by mixing commercial $SrCO_3$, $WO_3$ and $CoO$, sintering at 900° C. and grinding.

As is apparent from the results in Table 35, the present material obtained by adding $SrTiO_3$ to a sintering accelerant such as $TiO_2$—$MgO$—$SiO_2$ of 1.0 wt % mainly forming a liquid phase at a high temperature, a semiconducting accelerant $Y_2O_3$ of 0.4 wt %, a solid electrolyte $CeO_2$ of 0.2 to 2.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 34.

EXAMPLE 36

The forming agent $Sr_{0.8}Ba_{0.1}Ca_{0.1}(Co_{\frac{1}{2}}W_{\frac{1}{2}})O_3$ or $Sr_{0.8}Ba_{0.2}Ca_{0.2}(Co_{\frac{1}{2}}W_{\frac{1}{2}})O_3$ of 2.0 wt % was added instead of the forming agent $Sr_{0.8}Ba_{0.1}Ca_{0.1}(M_{\frac{1}{2}}Nb_{\frac{1}{2}})O_3$ or $Sr_{0.6}Ba_{0.2}Ca_{0.2}(Mn_{\frac{1}{2}}Nb_{\frac{1}{2}})O_3$ of 2.0 wt % to form a grain boundary depletion all of which function as control agents to control the grain growth of Example 27. The manufacturing method for other materials, sintering accelerant or the like, was the same as Example 27 and electric characteristics thereof were measured by the same method as Example 27.

The forming agent to form a grain boundary depletion which also functions as a control agent to control the grain growth was obtained by mixing commercial $SrCO_3$, $BaCO_3$, $CaCO_3$, $WO_3$ and $CoO$, sintering at 900° C. and grinding.

The results are shown in Table 36.

TABLE 35

| sintering accelerant (wt %) | semiconducting accelerant $Y_2O_3$ (wt %) | forming agent to form a grain boundary depletion layer which also functions as a control agent to control the grain growth $Sr(Co_{1/2}W_{1/2})O_3$ (wt %) | solid electrolyte which functions as a control agent to control the grain growth $CeO_2$ (wt %) | mean grain diameter (μm) | $\epsilon$ | tan δ (%) | $V_1$mA (V/mm) | $\alpha$ |
|---|---|---|---|---|---|---|---|---|
| $TiO_2$—$Al_2O_3$—$SiO_2$ compound | | | | | | | | |
| 1.0 | 0.4 | 0.4 | 2.0 | 3.0 | 3400 | 1.4 | 940 | 11 |
| 1.0 | 0.4 | 4.0 | 2.0 | 3.5 | 3900 | 0.5 | 910 | 12 |
| 1.0 | 0.4 | 1.0 | 0.2 | 3.5 | 4100 | 1.7 | 880 | 11 |
| 1.0 | 0.4 | 1.0 | 1.0 | 3.0 | 3600 | 0.5 | 920 | 12 |
| $TiO_2$—$MnO$—$SiO_2$ compound | | | | | | | | |
| 1.0 | 0.4 | 0.4 | 2.0 | 3.5 | 4000 | 1.6 | 860 | 11 |
| 1.0 | 0.4 | 4.0 | 2.0 | 3.0 | 3400 | 1.7 | 930 | 11 |
| 1.0 | 0.4 | 1.0 | 0.2 | 3.5 | 4200 | 1.7 | 840 | 12 |
| 1.0 | 0.4 | 1.0 | 1.0 | 3.0 | 3600 | 1.8 | 990 | 12 |
| $TiO_2$—$MgO$—$SiO_2$ compound | | | | | | | | |
| 1.0 | 0.4 | 0.4 | 2.0 | 3.5 | 3800 | 0.5 | 890 | 12 |
| 1.0 | 0.4 | 4.0 | 2.0 | 3.5 | 4200 | 1.6 | 910 | 11 |
| 1.0 | 0.4 | 1.0 | 0.2 | 3.5 | 4000 | 1.8 | 860 | 11 |
| 1.0 | 0.4 | 1.0 | 1.0 | 3.0 | 3500 | 1.8 | 970 | 11 |

TABLE 36

| sintering accelerant $TiO_2$—$MgO$—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain diameter (μm) | $\epsilon$ | tan δ (%) | $V_1$mA (V/mm) | $\alpha$ |
|---|---|---|---|---|---|---|---|---|
| 3.0 | $WO_3$ 0.05 | $Sr_{0.8}Ba_{0.1}Ca_{0.1}(Co_{1/2}W_{1/2})O_3$ 2.0 | 1.5 | 3.5 | 4100 | 1.2 | 870 | 12 |
| 3.0 | $Nb_2O_5$ 0.05 | $Sr_{0.8}Ba_{0.1}Ca_{0.1}(Co_{1/2}W_{1/2})O_3$ 2.0 | 1.5 | 3.5 | 3900 | 1.1 | 900 | 13 |

TABLE 36-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain diameter (μm) | $\epsilon$ | tan δ (%) | $V_1$mA (V/mm) | α |
|---|---|---|---|---|---|---|---|---|
| 3.0 | $La_2O_3$ 0.05 | $Sr_{0.8}Ba_{0.1}Ca_{0.1}(Co_{1/2}W_{1/2})O_3$ 2.0 | 1.5 | 3.0 | 3600 | 1.2 | 960 | 13 |
| 3.0 | $Y_2O_3$ 0.05 | $Sr_{0.8}Ba_{0.1}Ca_{0.1}(Co_{1/2}W_{1/2})O_3$ 2.0 | 1.5 | 3.0 | 3500 | 1.3 | 920 | 12 |
| 3.0 | $WO_3$ 0.50 | $Sr_{0.6}Ba_{0.2}Ca_{0.2}(Co_{1/2}W_{1/2})O_3$ 2.0 | 1.5 | 3.5 | 4000 | 0.5 | 870 | 13 |
| 3.0 | $Nb_2O_5$ 0.50 | $Sr_{0.6}Ba_{0.2}Ca_{0.2}(Co_{1/2}W_{1/2})O_3$ 2.0 | 1.5 | 3.0 | 3400 | 1.6 | 990 | 13 |
| 3.0 | $La_2O_3$ 0.50 | $Sr_{0.6}Ba_{0.2}Ca_{0.2}(Co_{1/2}W_{1/2})O_3$ 2.0 | 1.5 | 3.5 | 4300 | 0.5 | 890 | 11 |
| 3.0 | $Y_2O_3$ 0.50 | $Sr_{0.6}Ba_{0.2}Ca_{0.2}(Co_{1/2}W_{1/2})O_3$ 2.0 | 1.5 | 3.5 | 4200 | 1.6 | 870 | 13 |
| 3.0 | $WO_3$ 2.0 | $Sr_{0.8}Ba_{0.1}Ca_{0.1}(Co_{1/2}W_{1/2})O_3$ 2.0 | 1.5 | 3.5 | 4100 | 1.2 | 900 | 12 |
| 3.0 | $Nb_2O_5$ 2.0 | $Sr_{0.8}Ba_{0.1}Ca_{0.1}(Co_{1/2}W_{1/2})O_3$ 2.0 | 1.5 | 3.5 | 3900 | 1.1 | 880 | 13 |
| 3.0 | $La_2O_3$ 2.0 | $Sr_{0.8}Ba_{0.1}Ca_{0.1}(Co_{1/2}W_{1/2})O_3$ 2.0 | 1.5 | 3.0 | 3600 | 1.2 | 940 | 13 |
| 3.0 | $Y_2O_3$ 2.0 | $Sr_{0.8}Ba_{0.1}Ca_{0.1}(Co_{1/2}W_{1/2})O_3$ 2.0 | 1.5 | 3.0 | 3500 | 1.3 | 950 | 12 |

As is apparent from the results in Table 36, the present material obtained by adding $SrTiO_3$ to a sintering accelerant such as $TiO_2$—MgO—$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 34.

EXAMPLE 37

A capacitor was manufactured according to the method in Example 25 including the manufacturing method for other materials, sintering accelerant or the like, except that the forming agent $Sr(Cu_\frac{1}{3}Nb_\frac{2}{3})O_3$ (0.1 to 5.0 wt %) was used instead of the forming agent $Sr(Mn_\frac{1}{3}Nb_\frac{2}{3})O_3$ (0.1 to 12.0 wt %) to form a grain boundary depletion both of which function as control agents to control the grain growth and electric characteristics thereof were measured by the same method as Example 25. The results are shown in Table 37. The forming agent $Sr(Cu_\frac{1}{3}Nb_\frac{2}{3})O_3$ to form a grain boundary depletion which also functions as a control agent to control the grain growth was obtained by mixing commercial $SrCO_3$, $Nb_2O_5$, CuO or the like, sintering at 1000° C. and grinding.

TABLE 37

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/3}Nb_{2/3})O_3$ (wt %) | solid electrolyte which functions as a control agent to control the grain growth $CeO_2$ (wt %) | mean grain diameter (μm) | $\epsilon$ | tan δ (%) | rising voltage $V_1$mA (V/mm) | α |
|---|---|---|---|---|---|---|---|---|
| 0.05 | 0.2 | 0.5 | 0.8 | 2.0 | 2200 | 15.0 | 220 | 3.0 |
| 0.1 | 0.2 | 0.5 | 0.8 | 3.5 | 3800 | 1.6 | 860 | 11 |
| 0.5 | 0.2 | 0.5 | 0.8 | 4.0 | 4700 | 1.4 | 730 | 12 |
| 1.0 | 0.2 | 0.5 | 0.8 | 3.5 | 3900 | 1.0 | 840 | 12 |
| 3.0 | 0.2 | 0.5 | 0.8 | 4.0 | 4800 | 0.8 | 780 | 11 |
| 5.0 | 0.2 | 0.5 | 0.8 | 4.0 | 5200 | 1.0 | 790 | 11 |
| 6.0 | 0.2 | 0.5 | 0.8 | 4.0 | 5100 | 1.2 | 770 | 12 |
| 1.0 | 0.02 | 0.5 | 0.8 | 2.5 | 2300 | 26.0 | 150 | 4.0 |
| 1.0 | 0.05 | 0.5 | 0.8 | 3.5 | 4100 | 0.5 | 810 | 11 |
| 1.0 | 0.5 | 0.5 | 0.8 | 4.0 | 4800 | 0.7 | 750 | 12 |
| 1.0 | 2.0 | 0.5 | 0.8 | 3.5 | 4400 | 1.2 | 890 | 12 |
| 1.0 | 3.0 | 0.5 | 0.8 | 2.0 | 2000 | 19.0 | 320 | 6.5 |
| 1.0 | 0.2 | 0.1 | 0.8 | 2.5 | 2300 | 17.5 | 300 | 4.0 |
| 1.0 | 0.2 | 0.2 | 0.8 | 3.5 | 4100 | 1.7 | 890 | 12 |
| 1.0 | 0.2 | 0.5 | 0.8 | 4.0 | 4600 | 0.9 | 770 | 13 |
| 1.0 | 0.2 | 2.0 | 0.8 | 3.5 | 4400 | 1.0 | 870 | 12 |
| 1.0 | 0.2 | 4.0 | 0.8 | 4.0 | 4800 | 1.6 | 780 | 12 |
| 1.0 | 0.2 | 6.0 | 0.8 | 2.5 | 2400 | 18.5 | 550 | 3.0 |
| 1.0 | 0.2 | 0.5 | 0.05 | 3.0 | 3100 | 22.0 | 330 | 4.5 |
| 1.0 | 0.2 | 0.5 | 0.1 | 4.0 | 4700 | 1.7 | 770 | 11 |
| 1.0 | 0.2 | 0.5 | 0.5 | 3.5 | 4100 | 1.0 | 860 | 12 |

TABLE 37-continued

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/3}Nb_{2/3})O_3$ (wt %) | solid electrolyte which functions as a control agent to control the grain growth $CeO_2$ (wt %) | mean grain diameter (μm) | ε | tan δ (%) | rising voltage $V_1mA$ (V/mm) | α |
|---|---|---|---|---|---|---|---|---|
| 1.0 | 0.2 | 0.5 | 1.0 | 3.5 | 4200 | 1.2 | 830 | 11 |
| 1.0 | 0.2 | 0.5 | 3.0 | 3.5 | 3800 | 1.8 | 810 | 11 |
| 1.0 | 0.2 | 0.5 | 4.0 | 2.5 | 2200 | 17.0 | 250 | 5.0 |

As is apparent from the results in Table 37, the present material obtained by adding $SrTiO_3$ to a sintering accelerant $TiO_2$—$Al_2O_3$—$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt % which also functions as a control agent to control the grain growth, and a forming agent $Sr(Cu_{\frac{1}{3}}Nb_{\frac{2}{3}})O_3$ of 0.2 to 4.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3.5 to 4.0 μm and the dielectric loss was 2.0% or less and the apparent dielectric constant was 3500 or more. The riser voltage $V_1$ mA of the materials as a varistor was 700 to 900 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained.

When the amount of the sintering accelerant added exceeds 5%, the sintered body is prone to deform or adhere, therefore it is not practical.

EXAMPLE 38

A capacitor was manufactured according to the method in Example 26 including the manufacturing method for other materials, sintering accelerant or the like, except that the forming agent $Sr(Cu_{\frac{1}{3}}Nb_{\frac{2}{3}})O_3$ (0.4 to 3.0 wt %) was used instead of the forming agent $Sr(Mn_{\frac{1}{3}}Nb_{\frac{2}{3}})O_3$ (0.4 to 3.0 wt %) to form a grain boundary depletion both of which function as control agents to control the grain growth and electric characteristics thereof were measured by the same method as Example 26. The results are shown in Table 38.

The forming agent $Sr(Cu\ Nb\ )O$ to form a grain boundary depletion was obtained by mixing commercial $SrCO$, $Nb\ O$, and $CuO$, sintering at 900° C. and grinding.

TABLE 38

| sintering accelerant (wt %) | semiconducting accelerant $Y_2O_3$ (wt %) | forming agent to form a grain boundary depletion layer which also functions as a control agent to control the grain growth $Sr(Co_{1/3}Nb_{2/3})O_3$ (wt %) | solid electrolyte which functions as a control agent to control the grain growth $CeO_2$ (wt %) | mean grain diameter (μm) | ε | tan δ (%) | $V_1mA$ (V/mm) | α |
|---|---|---|---|---|---|---|---|---|
| $TiO_2$—$Al_2O_3$—$SiO_2$ compound | | | | | | | | |
| 1.0 | 0.4 | 0.4 | 1.0 | 4.0 | 4800 | 1.2 | 770 | 12 |
| 1.0 | 0.4 | 3.0 | 1.0 | 4.0 | 4700 | 1.4 | 760 | 11 |
| 1.0 | 0.4 | 1.0 | 0.2 | 3.5 | 4400 | 1.3 | 830 | 12 |
| 1.0 | 0.4 | 1.0 | 2.0 | 4.0 | 4600 | 1.6 | 730 | 11 |
| $TiO_2$—$MnO$—$SiO_2$ compound | | | | | | | | |
| 1.0 | 0.4 | 0.4 | 1.0 | 4.0 | 5100 | 1.1 | 770 | 12 |
| 1.0 | 0.4 | 3.0 | 1.0 | 3.5 | 4100 | 1.3 | 810 | 13 |
| 1.0 | 0.4 | 1.0 | 0.2 | 3.5 | 4300 | 1.4 | 820 | 12 |
| 1.0 | 0.4 | 1.0 | 2.0 | 4.0 | 4800 | 1.2 | 790 | 12 |
| $TiO_2$—$MgO$—$SiO_2$ compound | | | | | | | | |
| 1.0 | 0.4 | 0.4 | 1.0 | 3.5 | 4200 | 1.0 | 820 | 11 |
| 1.0 | 0.4 | 3.0 | 1.0 | 4.0 | 4800 | 1.5 | 780 | 12 |
| 1.0 | 0.4 | 1.0 | 0.2 | 4.0 | 5000 | 1.4 | 740 | 11 |
| 1.0 | 0.4 | 1.0 | 2.0 | 4.0 | 5100 | 1.2 | 770 | 12 |

As is apparent from the results in Table 38, the present material obtained by adding $SrTiO_2$ to a sintering accelerant such as $TiO_2$-$MgO$-$SiO_2$ of 1.0 wt % mainly forming a liquid phase at a high temperature, a semiconducting accelerant $Y_2O_3$ of 0.4 wt %, a good oxygen conductive solid electrolyte $CeO_2$ of 0.2 to 2.0 wt % which also functions as a control agent to control the grain growth, and a forming agent of 0.4 to 3.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 37.

EXAMPLE 39

The forming agent $Sr_{0.8}Ba_{0.1}Ca_{0.1}(Cu_{\frac{1}{4}}Nb_{\frac{3}{4}})O_3$ or $Sr_{0.6}Ba_{0.2}Ca_{0.2}(Cu_{\frac{1}{4}}Nb_{\frac{3}{4}})O_3$ of 2.0 wt % was added instead of the forming agent $Sr_{0.8}Ba_{0.1}Ca_{0.1}(Mn_{1/8}Nb_{\frac{7}{8}})O_3$ or $Sr_{0.6}Ba_{0.1}Ca_{0.1}(Mn_{\frac{1}{4}}Nb_{\frac{3}{4}})O_3$ of 2.0 wt % to form a grain boundary depletion all of which function as control agents to control the grain growth of Example 27. The manufacturing method for other materials, sintering accelerant or the like, was the same as Example 27 and electric characteristics thereof were measured by the same method as Example 27.

The forming agent to form a grain boundary depletion which also functions as a control agent to control the grain growth was obtained by mixing commercial $SrCO_3$, $BaCO_3$, $CaCO_3$, $Nb_2O_5$, and CuO, sintering at 900° C. and grinding.

The results are shown in Table 39.

to 12.0 wt %) to form a grain boundary depletion layer which also functions as a control agent to control the grain growth were added to strontium titanat ($SrTiO_3$) obtained by pyrolyzing titanyl strontium oxalate ($SrTiO(C_2O_4)_2 \cdot 4H_2O$) and mixed well followed by calcination at 900° C. Then it was ground in a wet state followed by drying, making grain, and molding, sintering at 1300° C. in the air. It was reground in a wet state, made paste using resin and organic solutions so as to form a sheet, printed platinum paste for inner electrodes were laminated theron, sintered at 1400° C. in the air followed by the hydrogen reduction at 1300° C., and heat-treated at 950° C. in the air. Finally, electrodes were adjusted so as to connect inner electrodes with outer electrodes, thereby completing the manufacture of a laminated ceramic capacitor having grain boundary varistor characteristics of FIG. 1. Electric characteristics of the laminated ceramic capacitor were measured

TABLE 39

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain diameter (μm) | ε | tan δ (%) | $V_1mA$ (V/mm) | α |
|---|---|---|---|---|---|---|---|---|
| 3.0 | $WO_3$ 0.05 | $Sr_{0.8}Ba_{0.1}Ca_{0.1}(Cu_{1/3}Nb_{2/3})O_3$ 2.0 | 1.5 | 4.0 | 4800 | 1.2 | 750 | 12 |
| 3.0 | $Nb_2O_5$ 0.05 | $Sr_{0.8}Ba_{0.1}Ca_{0.1}(Cu_{1/3}Nb_{2/3})O_3$ 2.0 | 1.5 | 3.5 | 4300 | 1.2 | 810 | 12 |
| 3.0 | $La_2O_3$ 0.05 | $Sr_{0.8}Ba_{0.1}Ca_{0.1}(Cu_{1/3}Nb_{2/3})O_3$ 2.0 | 1.5 | 4.0 | 4900 | 1.2 | 760 | 13 |
| 3.0 | $Y_2O_3$ 0.05 | $Sr_{0.8}Ba_{0.1}Ca_{0.1}(Cu_{1/3}Nb_{2/3})O_3$ 2.0 | 1.5 | 4.0 | 4700 | 1.1 | 790 | 13 |
| 3.0 | $WO_3$ 0.50 | $Sr_{0.6}Ba_{0.2}Ca_{0.2}(Cu_{1/3}Nb_{2/3})O_3$ 2.0 | 1.5 | 3.5 | 4100 | 1.3 | 830 | 11 |
| 3.0 | $Nb_2O_5$ 0.50 | $Sr_{0.6}Ba_{0.2}Ca_{0.2}(Cu_{1/3}Nb_{2/3})O_3$ 2.0 | 1.5 | 4.0 | 4600 | 1.3 | 790 | 12 |
| 3.0 | $La_2O_3$ 0.50 | $Sr_{0.6}Ba_{0.2}Ca_{0.2}(Cu_{1/3}Nb_{2/3})O_3$ 2.0 | 1.5 | 4.0 | 4700 | 1.6 | 770 | 12 |
| 3.0 | $Y_2O_3$ 0.50 | $Sr_{0.6}Ba_{0.2}Ca_{0.2}(Cu_{1/3}Nb_{2/3})O_3$ 2.0 | 1.5 | 4.0 | 4600 | 1.5 | 790 | 11 |
| 3.0 | $WO_3$ 2.0 | $Sr_{0.8}Ba_{0.1}Ca_{0.1}(Cu_{1/3}Nb_{2/3})O_3$ 2.0 | 1.5 | 4.0 | 4800 | 1.2 | 750 | 13 |
| 3.0 | $Nb_2O_5$ 2.0 | $Sr_{0.8}Ba_{0.1}Ca_{0.1}(Cu_{1/3}Nb_{2/3})O_3$ 2.0 | 1.5 | 3.5 | 4200 | 1.2 | 810 | 12 |
| 3.0 | $La_2O_3$ 2.0 | $Sr_{0.8}Ba_{0.1}Ca_{0.1}(Cu_{1/3}Nb_{2/3})O_3$ 2.0 | 1.5 | 4.0 | 4900 | 1.2 | 760 | 12 |
| 3.0 | $Y_2O_3$ 2.0 | $Sr_{0.8}Ba_{0.1}Ca_{0.1}(Cu_{1/3}Nb_{2/3})O_3$ 2.0 | 1.5 | 3.5 | 4400 | 1.1 | 850 | 13 |

As is apparent from the results in Table 39, the present material obtained by adding $SrTiO_3$ to a sintering accelerant such as $TiO_2$-MgO-$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 37.

A sintering accelerant $TiO_2$-$Al_2O_3$-$SiO_2$ (ratio of 20:30:45 wt %) of 0.05 to 6.0 wt % mainly forming a liquid phase at a high temperature, a semiconducting accelerant $Nb_2O_5$ of 0.02 to 3.0 wt % which can form a solid solution with perovskite type oxides, a good oxygen conductive solid electrolyte $Pr_6O_{11}$ of 0.05 to 5.0 wt % which functions as a control agent to control the grain growth, and a forming agent $Sr(Mn_{\frac{1}{4}}Nb_{\frac{3}{4}})O_3$ (0.1 to 12.0 wt %) to form a grain boundary depletion layer which also functions as a control agent to control the grain growth were added to strontium titanat ($SrTiO_3$) obtained by pyrolyzing titanyl strontium oxalate ($SrTiO(C_2O_4)_2 \cdot 4H_2O$) and mixed well followed by calcination at 900° C. Then it was ground in a wet state followed by drying, making grain, and molding, sintering at 1300° C. in the air. It was reground in a wet state, made paste using resin and organic solutions so as to form a sheet, printed platinum paste for inner electrodes were laminated theron, sintered at 1400° C. in the air followed by the hydrogen reduction at 1300° C., and heat-treated at 950° C. in the air. Finally, electrodes were adjusted so as to connect inner electrodes with outer electrodes, thereby completing the manufacture of a laminated ceramic capacitor having grain boundary varistor characteristics of FIG. 1. Electric characteristics of the laminated ceramic capacitor were measured and the results are shown in Table 40. The sintering accelerant $TiO_2$-$Al_2O_3$-$SiO_2$ (ratio of 20:30:45 wt %) was obtained by weighing commercial $TiO_2$, $Al_2O_3$ and $SiO_2$ powder according to the predetermined weight ratio, mixing, calcinating at 1200° C., and grinding. The forming agent $Sr(Mn_{\frac{1}{4}}Nb_{\frac{3}{4}})O_3$ to form a grain boundary depletion layer which also functions as a control agent to control the grain growth was obtained by mixing commercial $SrCO_3$, $Nb_2O_5$, $MnCO_3$ or the like, calcinating at 1000° C., and grinding. The size of the varistor after sintering was approximately 4 mm square and about 0.6 mm in thickness and composed of 8 layers of the dielectrics each of which was about 70 μm in thickness. The apparent dielectric constant ε was calculated from the value of the capacitance (measurement 1 kHz) of the laminated varistor. The grain diameter in the sintered body was obtained by examining a cross section after polishing under an optical microscope, to the surface of which $Bi_2O_3$ series metallic soap was applied and heat-treated at 1000° C. to make the grain boundary clear.

TABLE 40

| sintering accelerant TiO$_2$—Al$_2$O$_3$—SiO$_2$ compound (wt %) | semiconducting accelerant Nb$_2$O$_5$ (wt %) | forming agent to form a grain boundary depletion layer which also functions as a control agent to control the grain growth Sr(Mn$_{1/2}$Nb$_{1/2}$)O$_3$ (wt %) | solid electrolyte which functions as a control agent to control the grain growth Pr$_6$O$_{11}$ (wt %) | mean grain diameter (μm) | ε | tan δ (%) | rising voltage V$_1$mA (V/mm) | α |
|---|---|---|---|---|---|---|---|---|
| 0.05 | 0.2 | 0.5 | 0.8 | 1.5 | 2800 | 28.0 | 220 | 3.0 |
| 0.1 | 0.2 | 0.5 | 0.8 | 3.5 | 4400 | 2.9 | 820 | 11 |
| 0.5 | 0.2 | 0.5 | 0.8 | 3.5 | 4500 | 2.4 | 840 | 11 |
| 1.0 | 0.2 | 0.5 | 0.8 | 3.5 | 4200 | 2.6 | 820 | 12 |
| 3.0 | 0.2 | 0.5 | 0.8 | 4.0 | 4900 | 2.2 | 770 | 12 |
| 5.0 | 0.2 | 0.5 | 0.8 | 4.0 | 4800 | 2.5 | 780 | 11 |
| 6.0 | 0.2 | 0.5 | 0.8 | 4.0 | 4800 | 2.5 | 760 | 11 |
| 1.0 | 0.02 | 0.5 | 0.8 | 3.5 | 4300 | 31.0 | 270 | 5.0 |
| 1.0 | 0.05 | 0.5 | 0.8 | 3.5 | 4200 | 2.3 | 820 | 12 |
| 1.0 | 0.5 | 0.5 | 0.8 | 4.0 | 4600 | 2.6 | 770 | 12 |
| 1.0 | 2.0 | 0.5 | 0.8 | 3.5 | 4400 | 2.1 | 800 | 11 |
| 1.0 | 3.0 | 0.5 | 0.8 | 2.0 | 3700 | 22.4 | 270 | 4.0 |
| 1.0 | 0.2 | 0.1 | 0.8 | 3.5 | 4500 | 17.4 | 250 | 3.5 |
| 1.0 | 0.2 | 0.2 | 0.8 | 4.0 | 4700 | 2.8 | 760 | 12 |
| 1.0 | 0.2 | 1.0 | 0.8 | 4.0 | 4800 | 2.4 | 750 | 11 |
| 1.0 | 0.2 | 3.0 | 0.8 | 3.5 | 4400 | 2.3 | 810 | 11 |
| 1.0 | 0.2 | 10.0 | 0.8 | 3.5 | 4200 | 2.5 | 830 | 12 |
| 1.0 | 0.2 | 12.0 | 0.8 | 2.5 | 2800 | 19.2 | 280 | 4.5 |
| 1.0 | 0.2 | 0.5 | 0.05 | 3.5 | 4200 | 24.3 | 810 | 6.5 |
| 1.0 | 0.2 | 0.5 | 0.1 | 4.0 | 4800 | 2.3 | 790 | 11 |
| 1.0 | 0.2 | 0.5 | 0.5 | 4.0 | 4800 | 2.2 | 780 | 12 |
| 1.0 | 0.2 | 0.5 | 2.0 | 3.5 | 4200 | 2.7 | 820 | 12 |
| 1.0 | 0.2 | 0.5 | 4.0 | 3.5 | 4100 | 2.4 | 800 | 11 |
| 1.0 | 0.2 | 0.5 | 5.0 | 2.0 | 3200 | 14.2 | 320 | 4.5 |

As is apparent from the results in Table 40, the present material obtained by adding SrTiO$_3$ to a sintering accelerant TiO$_3$-Al$_2$O$_3$-SiO$_2$ of 0.1 to 5.0 wt %, a semiconducting accelerant Nb$_2$O$_5$ of 0.05 to 2.0 wt %, a solid electrolyte Pr$_6$O$_{11}$ 0.1 to 4.0 wt %, and a forming agent Sr(Mn$_{\frac{1}{2}}$Nb$_{\frac{1}{2}}$)O$_3$ of 0.2 to 10.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3.5 to 4.0 μm and the dielectric loss was 3.0% or less and the apparent dielectric constant was 4,000 or more. The riser voltage V$_1$ mA of the materials as a varistor was 750 to 850 V/mm and the resistance non-linearity coeffecient α is 10 or more in most cases between v$_1$ mA to V$_{0.1}$ mA. Other values such as surge durability as a varistor, the ratio of limited voltage representing the resistance non-linearity coeffecient in high current area, the temperature coefficient of the riser voltage V$_1$ mA and capacitance were measured and sufficient values were obtained. When the amount of the sintering accelerant added exceeds 5%, the sintered body is prone to deform or adhere, therefore it not practical.

EXAMPLE 41

A sintering accelerant of 1.0 wt % selected from TiO$_2$—MgO—SiO$_2$ series (for example, ratio of 30:30:40 wt %), TiO$_2$—MnO—SiO$_2$ series (for example, ratio of 10:50:40 wt %), TiO$_2$—Al$_2$O$_3$—SiO$_2$ series (for example, ratio of 20:35:45 wt %) mainly forming a liquid phase at a high temperature, a semiconducting accelerant Y$_2$O$_3$ of 0.04 wt % which can form a solid solution with perovskite type oxides, a good oxygen conductive solid electrolyte Pr$_6$O$_{11}$ of 0.2 to 3.0 wt % which functions as a control agent to control the grain growth, and a forming agent Sr(Mn$_{\frac{1}{2}}$Nb$_{\frac{1}{2}}$)O$_3$ of 0.4 to 0.8 wt % to form a grain boundary depletion layer which also functions as a control agent to control the grain growth, and a forming agent Sr(Mn$_{\frac{1}{2}}$Nb$_{\frac{1}{2}}$)O$_3$ of 0.4 to 0.8 wt % to form a grain boundary depletion layer which also functions as a control agent to control the grain growth were added to commercial industrial strontium titanat (SrTiO$_3$) and mixed well followed by calcination at 900° C. Then it was ground in a wet state followed by drying, making grain, and molded into a disk shape, sintered at 1380° C. in the reducing atmosphere composed of 95% of nitrogen and 5% of hydrogen. It was heat-treated at 950° C. in the air and silver electrodes were formed on both sides of the disk, thereby completing the manufacture of a ceramic capacitor having grain boundary varistor characteristics of FIG. 2. Electric characteristics of the laminated ceramic capacitor were measured and the results are shown in Table 41. The sintering accelerant, for example, TiO$_2$—MgO—SiO$_2$ series (for example, ratio of 30:30:40 wt %) was obtained by weighing commercial TiO$_2$, MgO and SiO$_2$ powder according to the predetermined weight ratio, mixing, calcinating at 120° C., and grinding. The forming agent Sr(Mn$_{\frac{1}{2}}$Nb$_{\frac{1}{2}}$)O$_3$ to form a grain boundary depletion layer which also functions as a control agent to control the grain growth was obtained by mixing commercial SrCO$_3$, Nb$_2$O$_5$ and MnCO$_3$, calcinating at 900° C., and grinding.

TABLE 41

| sintering accelerant (wt %) | semiconducting accelerant $Y_2O_3$ (wt %) | forming agent to form a grain boundary depletion layer which also functions as a control agent to control the grain growth $Sr(Mn_{1/2}Nb_{1/2})O_3$ (wt %) | solid electrolyte which functions as a control agent to control the grain growth $Pr_6O_{11}$ (wt %) | mean grain diameter (μm) | $\epsilon$ | tan δ (%) | $V_1mA$ (V/mm) | $\alpha$ |
|---|---|---|---|---|---|---|---|---|
| $TiO_2$—$Al_2O_3$—$SiO_2$ compound | | | | | | | | |
| 1.0 | 0.4 | 0.4 | 1.0 | 3.5 | 4300 | 2.7 | 800 | 12 |
| 1.0 | 0.4 | 8.0 | 1.0 | 3.5 | 4200 | 2.4 | 810 | 12 |
| 1.0 | 0.4 | 1.0 | 0.2 | 4.0 | 4800 | 2.7 | 760 | 11 |
| 1.0 | 0.4 | 1.0 | 3.0 | 3.5 | 4500 | 2.1 | 830 | 12 |
| $TiO_2$—MnO—$SiO_2$ compound | | | | | | | | |
| 1.0 | 0.4 | 0.4 | 1.0 | 4.0 | 4800 | 2.3 | 780 | 11 |
| 1.0 | 0.4 | 8.0 | 1.0 | 3.5 | 4300 | 2.5 | 840 | 12 |
| 1.0 | 0.4 | 1.0 | 0.2 | 4.0 | 4600 | 2.2 | 780 | 11 |
| 1.0 | 0.4 | 1.0 | 3.0 | 3.5 | 4300 | 2.2 | 820 | 11 |
| $TiO_2$—MgO—$SiO_2$ compound | | | | | | | | |
| 1.0 | 0.4 | 0.4 | 1.0 | 4.0 | 4700 | 2.3 | 790 | 12 |
| 1.0 | 0.4 | 8.0 | 1.0 | 4.0 | 4600 | 2.7 | 760 | 11 |
| 1.0 | 0.4 | 1.0 | 0.2 | 4.0 | 4700 | 2.5 | 770 | 12 |
| 1.0 | 0.4 | 1.0 | 3.0 | 3.5 | 4400 | 2.3 | 830 | 11 |

As is apparent from the results in Table 41, the present material obtained by adding $SrTiO_3$ to a sintering accelerant such as $TiO_2$—MgO—$SiO_2$ of 1.0 wt % mainly forming a liquid phase at a high temperature, a semiconducting accelerant $Y_2O_3$ of 0.4 wt %, a good oxygen conductive solid electrolyte $Pr_6O_{11}$ of 0.2 to 3.0 wt % which also functions as a control agent to control the grain growth, and a forming agent of 0.4 to 8.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 40.

EXAMPLE 42

A sintering accelerant of 3.0 wt % of $TiO_2$—MgO—$SiO_2$ series (for example, ratio of 30:30:40 wt %) mainly forming a liquid phase at a high temperature, semiconducting accelerants $WO_3$, $Nb_2O_5$, $La_2O_3$ and $Y_2O_3$ of 0.05 to 2.0 wt %, a good oxygen conductive solid electrolyte $Pr_6O_{11}$ of 1.5 wt % which functions as a control agent to control the grain growth, and a forming agent $Sr_{0.8}Ba_{0.1}Ca_{0.1}(Mn_{\frac{1}{2}}Nb_{\frac{1}{2}})O_3$ or $Sr_{0.6}Ba_{0.2}Ca_{0.2}(Mn_{\frac{1}{2}}Nb_{\frac{1}{2}})O_3$ of to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molding, sintering at 1380° C. in the reducing atmosphere composed of 95% of nitrogen and 5% of hydrogen. It was heat-treated at 950° C. in the air and electrodes were formed, thereby completing the manufacture of a ceramic capacitor having grain boundary varistor characteristics of FIG. 2. Electric characteristics of the laminated ceramic capacitor were measured and the results are shown in Table 42.

The sintering accelerant $TiO_2$—MgO—$SiO_2$ series (ratio of 30:30:40 wt %) was obtained by weighing commercial $TiO_2$, MgO, $SiO_2$ powder according to the predetermined weight ratio, mixing, calcinating at 1200° C., and grinding. The forming agent to form a grain boundary depletion layer which also functions as a control agent to control the grain growth was obtained by mixing commercial $SrCO_3$, $BaCO_3$, $CaCO_3$, $Nb_2O_5$ and $MnCO_3$, calcinating at 900° C., and grinding.

TABLE 42

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $Pr_6O_{11}$ (wt %) | mean grain diameter (μm) | $\epsilon$ | tan δ (%) | $V_1mA$ (V/mm) | $\alpha$ |
|---|---|---|---|---|---|---|---|---|
| 3.0 | $WO_3$ 0.05 | $Sr_{0.8}Ba_{0.1}Ca_{0.1}(Mn_{1/2}Nb_{1/2})O_3$ 2.0 | 1.5 | 4.0 | 4700 | 2.8 | 780 | 12 |
| 3.0 | $Nb_2O_5$ 0.05 | $Sr_{0.8}Ba_{0.1}Ca_{0.1}(Mn_{1/2}Nb_{1/2})O_3$ 2.0 | 1.5 | 3.5 | 4300 | 2.7 | 810 | 12 |
| 3.0 | $La_2O_3$ 0.05 | $Sr_{0.8}Ba_{0.1}Ca_{0.1}(Mn_{1/2}Nb_{1/2})O_3$ 2.0 | 1.5 | 4.0 | 4800 | 2.7 | 790 | 13 |
| 3.0 | $Y_2O_3$ 0.05 | $Sr_{0.8}Ba_{0.1}Ca_{0.1}(Mn_{1/2}Nb_{1/2})O_3$ 2.0 | 1.5 | 3.5 | 4300 | 2.6 | 840 | 11 |
| 3.0 | $WO_3$ 0.50 | $Sr_{0.6}Ba_{0.2}Ca_{0.2}(Mn_{1/2}Nb_{1/2})O_3$ 2.0 | 1.5 | 4.0 | 4800 | 2.3 | 790 | 12 |
| 3.0 | $Nb_2O_5$ 0.50 | $Sr_{0.6}Ba_{0.2}Ca_{0.2}(Mn_{1/2}Nb_{1/2})O_3$ 2.0 | 1.5 | 3.5 | 4500 | 2.4 | 830 | 11 |
| 3.0 | $La_2O_3$ 0.50 | $Sr_{0.6}Ba_{0.2}Ca_{0.2}(Mn_{1/2}Nb_{1/2})O_3$ 2.0 | 1.5 | 3.5 | 4400 | 2.5 | 820 | 12 |

TABLE 42-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $Pr_6O_{11}$ (wt %) | mean grain diameter (μm) | ε | tan δ (%) | $V_1$mA (V/mm) | α |
|---|---|---|---|---|---|---|---|---|
| 3.0 | $Y_2O_3$ 0.50 | $Sr_{0.6}Ba_{0.2}Ca_{0.2}$ $(Mn_{1/2}Nb_{1/2})O_3$ 2.0 | 1.5 | 3.5 | 4400 | 2.4 | 810 | 11 |
| 3.0 | $WO_3$ 2.0 | $Sr_{0.8}Ba_{0.1}Ca_{0.1}$ $(Mn_{1/2}Nb_{1/2})O_3$ 2.0 | 1.5 | 3.5 | 4300 | 2.4 | 830 | 12 |
| 3.0 | $Nb_2O_5$ 2.0 | $Sr_{0.8}Ba_{0.1}Ca_{0.1}$ $(Mn_{1/2}Nb_{1/2})O_3$ 2.0 | 1.5 | 3.5 | 4400 | 2.3 | 810 | 13 |
| 3.0 | $La_2O_3$ 2.0 | $Sr_{0.8}Ba_{0.1}Ca_{0.1}$ $(Mn_{1/2}Nb_{1/2})O_3$ 2.0 | 1.5 | 4.0 | 4600 | 2.6 | 790 | 13 |
| 3.0 | $Y_2O_3$ 2.0 | $Sr_{0.8}Ba_{0.1}Ca_{0.1}$ $(Mn_{1/2}Nb_{1/2})O_3$ 2.0 | 1.5 | 3.5 | 4300 | 2.4 | 820 | 11 |

As is apparent from the results in Table 42, the present material obtained by adding $SrTiO_3$ to a sintering accelerant such as $TiO_2$—MgO—$SiO_2$ series of 3.0 wt %, semiconducting accelerants $WO_3$, $Nb_2O_5$, $La_2O_3$ and $Y_2O_3$ of 0.05 to 2.0 wt %, a solid electrolyte $Pr_6O_{11}$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 40.

EXAMPLE 43

A capacitor was manufactured according to the method in Example 40 including the manufacturing method for other materials, sintering accelerant or the like, except that the forming agent $Sr(Cu_{\frac{1}{4}}Nb_{\frac{3}{4}})O_3$ (0.1 to 6.0 wt %) was used instead of the forming agent $Sr(Mn_{\frac{1}{4}}Nb_{\frac{3}{4}})$ (0.1 to 12.0 wt %) to form a grain boundary depletion both of which also function as control agents to control the grain growth and electric characteristics thereof were measured by the same method as Example 40. The results are shown in Table 43. The forming agent $Sr(Cu_{\frac{1}{4}}Nb_{\frac{3}{4}})O_3$ to form a grain boundary depletion was obtained by mixing commercial $SrCO_3$, $Nb_2O_5$, CuO or the like, sintering at 1000° C. and grinding.

TABLE 43

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Cu_{1/3}Nb_{2/3})O_3$ (wt %) | solid electrolyte which functions as a control agent to control the grain growth $Pr_6O_{11}$ (wt %) | mean grain diameter (μm) | ε | tan δ (%) | rising voltage $V_1$mA (V/mm) | α |
|---|---|---|---|---|---|---|---|---|
| 0.05 | 0.2 | 0.5 | 0.8 | 1.2 | 1500 | 55.0 | 250 | 5.0 |
| 0.1 | 0.2 | 0.5 | 0.8 | 3.0 | 3600 | 2.6 | 940 | 12 |
| 0.5 | 0.2 | 0.5 | 0.8 | 3.0 | 3600 | 2.2 | 920 | 13 |
| 1.0 | 0.2 | 0.5 | 0.8 | 3.5 | 3900 | 1.8 | 860 | 13 |
| 3.0 | 0.2 | 0.5 | 0.8 | 3.5 | 3700 | 1.8 | 830 | 12 |
| 5.0 | 0.2 | 0.5 | 0.8 | 3.5 | 3800 | 1.7 | 860 | 13 |
| 6.0 | 0.2 | 0.5 | 0.8 | 3.5 | 3700 | 1.7 | 840 | 13 |
| 1.0 | 0.02 | 0.5 | 0.8 | 1.2 | 2500 | 25.0 | 310 | 5.0 |
| 1.0 | 0.05 | 0.5 | 0.8 | 3.0 | 3600 | 2.2 | 920 | 12 |
| 1.0 | 0.5 | 0.5 | 0.8 | 3.5 | 3900 | 1.8 | 850 | 13 |
| 1.0 | 2.0 | 0.5 | 0.8 | 3.5 | 3800 | 1.7 | 870 | 12 |
| 1.0 | 3.0 | 0.5 | 0.8 | 3.0 | 3400 | 25.0 | 400 | 4.5 |
| 1.0 | 0.2 | 0.1 | 0.8 | 3.0 | 3100 | 32.5 | 380 | 3.5 |
| 1.0 | 0.2 | 0.2 | 0.8 | 3.5 | 3900 | 2.8 | 880 | 11 |
| 1.0 | 0.2 | 1.0 | 0.8 | 3.0 | 3600 | 1.1 | 900 | 12 |
| 1.0 | 0.2 | 3.0 | 0.8 | 3.5 | 3800 | 1.9 | 890 | 13 |
| 1.0 | 0.2 | 5.0 | 0.8 | 3.5 | 3900 | 1.8 | 860 | 11 |
| 1.0 | 0.2 | 6.0 | 0.8 | 3.5 | 2700 | 17.0 | 320 | 5.5 |
| 1.0 | 0.2 | 0.5 | 0.05 | 3.0 | 3300 | 17.7 | 430 | 4.0 |
| 1.0 | 0.2 | 0.5 | 0.1 | 3.5 | 3700 | 2.2 | 850 | 13 |
| 1.0 | 0.2 | 0.5 | 0.5 | 3.5 | 3800 | 1.7 | 880 | 12 |
| 1.0 | 0.2 | 0.5 | 2.0 | 3.5 | 3700 | 1.9 | 830 | 13 |
| 1.0 | 0.2 | 0.5 | 4.0 | 3.0 | 3600 | 1.1 | 900 | 11 |
| 1.0 | 0.2 | 0.5 | 5.0 | 2.0 | 2700 | 12.5 | 330 | 5.0 |

As is apparent from the results in Table 43, the present material obtained by adding $SrTiO_3$ to a sintering accelerant $TiO_2$—$Al_2O_3$—SiO of 0.1 to 5.0 wt %, a semiconducting accelerant $Nb_2O_5$ of 0.05 to 2.0 wt %, a solid electrolyte $Pr_6O_{11}$ 0.1 to 4.0 wt % which also functions as a control agent to control the grain growth, and a forming agent $Sr(Cu_{\frac{1}{4}}Nb_{\frac{3}{4}})O_3$ of 0.2 to 5.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and the mean grain diameter was approximately 3 0 to 3.5 μm and the dielectric loss was 3.0% or less and the apparent dielectric constant was 3,500 or more. The riser voltage V₁ mA of the materials as a varistor was 800 to 950 V/mm and the resistance non-linearity coeffecient α is 10 or more in most cases between V₁ mA to V₀.₁ mA. Other values such as surge durability as a varistor, the ratio of limited voltage representing the resistance non-linearity coeffecient in high current area, the temperature coefficient of the riser voltage V₁ mA and capacitance were measured and sufficient values were obtained. When the amount of the sintering accelerant added exceeds 5%, the sintered body is prone to deform or adhere, therefore it is not practical.

EXAMPLE 44

A capacitor was manufactured according to the method in Example 41 including the manufacturing method for other materials, sintering accelerant or the like, except that the forming agent Sr(Cu₃Nb₃)O₃ (0.4 to 4.0 wt %) was used instead of the forming agent Sr(Mn₃Nb₃) (0.4 to 8.0 wt %) to form a grain boundary depletion both of which also function as control agents to control the grain growth and electric characteristics thereof were measured by the same method as Example 41. The results are shown in Table 44. The forming agent Sr(Cu₃Nb₃)O₃ to form a grain boundary depletion was obtained by mixing commercial SrCO₃, Nb₂O₅ and CuO, sintering at 900° C. and grinding.

As is apparent from the results in Table 44, the present material obtained by adding SrTiO₃ to a sintering accelerant such as TiO₂—MgO—SiO₂ of 1.0 wt % mainly forming a liquid phase at a high temperature, a semiconducting accelerant Y₂O₃ of 0.4 wt %, a good oxygen conductive solid electrolyte Pr₆O₁₁ of 0.2 to 3.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 43.

EXAMPLE 45

The forming agent Sr₀.₈Ba₀.₁Ca₀.₁(Cu₃Nb₃) O₃ or Sr₀.₆Ba₀.₂Ca₀.₂(Cu₃Nb₃)O₃ of 2.0 wt % was added instead of the forming agent Sr₀.₈Ba₀.₁Ca₀.₁ Mn₃Nb₃)O₃ or Sr₀.₆Ba₀.₂Ca₀.₂(Mn₃Nb₃)O₃ of 2.0 wt % to form a grain boundary depletion all of which also function as control agents to control the grain growth of Example 42. The manufacturing method for other materials, sintering accelerant or the like, was the same as Example 42 and electric characteristics thereof were measured by the same method as Example 42. The forming agent to form a grain boundary depletion was obtained by mixing commercial SrCO₃, BaCO₃, CaCO₃, Mb₂O₅, and CuO, sintering at 900° C. and grinding The results are shown in Table 45.

TABLE 44

| sintering accelerant (wt %) | semiconducting accelerant Y₂O₃ (wt %) | forming agent to form a grain boundary depletion layer which also functions as a control agent to control the grain growth Sr(Co₁/₃Nb₂/₃)O₃ (wt %) | solid electrolyte which functions as a control agent to control the grain growth Pr₆O₁₁ (wt %) | mean grain diameter (μm) | ε | tan δ (%) | V₁mA (V/mm) | α |
|---|---|---|---|---|---|---|---|---|
| TiO₂—Al₂O₃—SiO₂ compound | | | | | | | | |
| 1.0 | 0.4 | 0.4 | 1.0 | 3.5 | 3800 | 1.2 | 890 | 12 |
| 1.0 | 0.4 | 4.0 | 1.0 | 3.0 | 3600 | 1.4 | 950 | 12 |
| 1.0 | 0.4 | 1.0 | 0.2 | 3.5 | 3800 | 1.2 | 840 | 12 |
| 1.0 | 0.4 | 1.0 | 3.0 | 3.0 | 3500 | 1.0 | 930 | 11 |
| TiO₂—MnO—SiO₂ compound | | | | | | | | |
| 1.0 | 0.4 | 0.4 | 1.0 | 3.5 | 3900 | 1.8 | 870 | 13 |
| 1.0 | 0.4 | 4.0 | 1.0 | 3.5 | 3700 | 1.8 | 880 | 12 |
| 1.0 | 0.4 | 1.0 | 0.2 | 3.5 | 3800 | 1.9 | 880 | 12 |
| 1.0 | 0.4 | 1.0 | 3.0 | 3.0 | 3500 | 1.7 | 910 | 13 |
| TiO₂—MgO—SiO₂ compound | | | | | | | | |
| 1.0 | 0.4 | 0.4 | 1.0 | 3.5 | 3800 | 0.8 | 890 | 13 |
| 1.0 | 0.4 | 4.0 | 1.0 | 3.5 | 3700 | 0.8 | 880 | 12 |
| 1.0 | 0.4 | 1.0 | 0.2 | 3.5 | 3600 | 0.9 | 850 | 11 |
| 1.0 | 0.4 | 1.0 | 3.0 | 3.0 | 3500 | 0.9 | 900 | 12 |

TABLE 45

| sintering accelerant TiO₂—MgO—SiO₂ compound (wt %) | semiconducting accelerant (wt %) | forming agent to form a grain boundary depletion layer which also functions as a control agent to control the grain growth (wt %) | solid electrolyte which functions as a control agent to control the grain growth Pr₆O₁₁ (wt %) | mean grain diameter (μm) | ε | tan δ (%) | V₁mA (V/mm) | α |
|---|---|---|---|---|---|---|---|---|
| 3.0 | WO₃ 0.05 | Sr₀.₈Ba₀.₁Ca₀.₁(Cu₁/₃Nb₂/₃)O₃ 2.0 | 1.5 | 3.5 | 3800 | 1.9 | 880 | 13 |
| 3.0 | Nb₂O₅ 0.05 | Sr₀.₈Ba₀.₁Ca₀.₁(Cu₁/₃Nb₂/₃)O₃ 2.0 | 1.5 | 3.0 | 3500 | 1.4 | 920 | 12 |
| 3.0 | La₂O₃ 0.05 | Sr₀.₈Ba₀.₁Ca₀.₁(Cu₁/₃Nb₂/₃)O₃ 2.0 | 1.5 | 3.0 | 3600 | 1.8 | 910 | 13 |

TABLE 45-continued

| sintering accelerant TiO$_2$—MgO—SiO$_2$ compound (wt %) | semiconducting accelerant (wt %) | forming agent to form a grain boundary depletion layer which also functions as a control agent to control the grain growth (wt %) | solid electrolyte which functions as a control agent to control the grain growth Pr$_6$O$_{11}$ (wt %) | mean grain diameter (μm) | ε | tan δ (%) | V$_1$mA (V/mm) | α |
|---|---|---|---|---|---|---|---|---|
| 3.0 | Y$_2$O$_3$ 0.05 | Sr$_{0.8}$Ba$_{0.1}$Ca$_{0.1}$ (Cu$_{1/3}$Nb$_{2/3}$)O$_3$ 2.0 | 1.5 | 3.0 | 3500 | 1.9 | 920 | 12 |
| 3.0 | WO$_3$ 0.50 | Sr$_{0.6}$Ba$_{0.2}$Ca$_{0.2}$ (Cu$_{1/3}$Nb$_{2/3}$)O$_3$ 2.0 | 1.5 | 3.5 | 3700 | 1.8 | 890 | 11 |
| 3.0 | Nb$_2$O$_5$ 0.50 | Sr$_{0.6}$Ba$_{0.2}$Ca$_{0.2}$ (Cu$_{1/3}$Nb$_{2/3}$)O$_3$ 2.0 | 1.5 | 3.0 | 3600 | 1.2 | 900 | 12 |
| 3.0 | La$_2$O$_3$ 0.50 | Sr$_{0.6}$Ba$_{0.2}$Ca$_{0.2}$ (Cu$_{1/3}$Nb$_{2/3}$)O$_3$ 2.0 | 1.5 | 3.0 | 3400 | 2.8 | 910 | 13 |
| 3.0 | Y$_2$O$_3$ 0.50 | Sr$_{0.6}$Ba$_{0.2}$Ca$_{0.2}$ (Cu$_{1/3}$Nb$_{2/3}$)O$_3$ 2.0 | 1.5 | 3.0 | 3500 | 1.7 | 920 | 13 |
| 3.0 | WO$_3$ 2.0 | Sr$_{0.8}$Ba$_{0.1}$Ca$_{0.1}$ (Cu$_{1/3}$Nb$_{2/3}$)O$_3$ 2.0 | 1.5 | 3.5 | 3800 | 1.9 | 890 | 13 |
| 3.0 | Nb$_2$O$_5$ 2.0 | Sr$_{0.8}$Ba$_{0.1}$Ca$_{0.1}$ (Cu$_{1/3}$Nb$_{2/3}$)O$_3$ 2.0 | 1.5 | 3.5 | 3700 | 1.3 | 870 | 13 |
| 3.0 | La$_2$O$_3$ 2.0 | Sr$_{0.8}$Ba$_{0.1}$Ca$_{0.1}$ (Cu$_{1/3}$Nb$_{2/3}$)O$_3$ 2.0 | 1.5 | 3.0 | 3600 | 1.8 | 910 | 12 |
| 3.0 | Y$_2$O$_3$ 2.0 | Sr$_{0.8}$Ba$_{0.1}$Ca$_{0.1}$ (Cu$_{1/3}$Nb$_{2/3}$)O$_3$ 2.0 | 1.5 | 3.0 | 3500 | 1.9 | 920 | 13 |

As is apparent from the results in Table 45, the present material obtained by adding SrTiO$_3$ to a sintering accelerant such as TiO$_2$—MgO—SiO$_2$ series of 3.0 wt %, semiconducting accelerants WO$_3$, Nb O$_2$, $_5$La$_2$O$_3$ and Y$_2$O$_3$ of 0.05 to 2.0 wt %, a solid electrolyte Pr$_6$O$_{11}$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 43.

EXAMPLE 46

A sintering accelerant TiO$_2$—Al$_2$O$_3$—SiO$_2$ (ratio of 20:30:45 wt %) of 0.05 to 5.0 wt % mainly forming a liquid phase at a high temperature, a semiconducting accelerant Nb$_2$O$_5$ of 0.02 to 3.0 wt % which can form a solid solution with perovskite type oxides, a good oxygen conductive solid electrolyte CeO$_2$ of 0.05 to 4.0 wt % which functions as a control agent to control the grain growth, and a forming agent Sr(Mn$_\frac{2}{3}$W$_\frac{1}{3}$)O$_3$ (0.1 to 8.0 wt %) to form a grain boundary depletion layer which also functions as a control agent to control the grain growth were added to strontium titanat (SrTiO$_3$) obtained by pyrolyzing titanyl strontium oxalate (SrTiO(C$_2$O$_4$)$_2$·4H$_2$O) and mixed well followed by calcination at 900° C. Then it was ground in a wet state followed by drying, making grain, and molding, sintering at 1300° C. in the air. It was reground in a wet state, made into paste using resin and organic solutions so as to form a sheet, printed platinum paste for inner electrodes were laminated theron, sintered at 1400° C. in the air followed by the hydrogen reduction at 1300° C., and heat-treated at 950° C. in the air. Finally, electrodes were adjusted so as to connect inner electrodes with outer electrodes, thereby completing the manufacture of a laminated ceramic capacitor having grain boundary varistor characteristics of FIG. 1. Electric characteristics of the laminated ceramic capacitor were measured and the results are shown in Table 46. The sintering accelerant TiO$_2$—Al$_2$O$_3$—SiO$_2$ (ratio of 20:35:45 wt %) was obtained by weighing commercial TiO$_2$, Al$_2$O$_3$ and SiO$_2$ powder according to the predetermined weight ratio, mixing, calcinating at 1200° C., and grinding. The forming agent Sr(Mn$_\frac{2}{3}$W$_\frac{1}{3}$)O$_3$ to form a grain boundary depletion layer which also functions as a control agent to control the grain growth was obtained by mixing commercial SrCO$_3$, WO$_3$, MnCO$_3$ or the like, calcinating at 1000° C., and grinding. The size of the varistor after sintering was approximately 4 mm square and about 0.6 mm in thickness and composed of 8 layers of the dielectrics, each of which was about 70 pm in thickness. The apparent dielectric constant was calculated from the value of the capacitance (measurement 1 kHz) of the laminated varistor. The grain diameter in the sintered body was obtained by examining a cross section after polishing under an optical microscope, to the surface of which Bi$_2$O$_3$ series metallic soap was applied and heat-treated at 1000° C. to make the grain boundary clear.

TABLE 46

| sintering accelerant TiO$_2$—Al$_2$O$_3$—SiO$_2$ compound (wt %) | semiconducting accelerant Nb$_2$O$_5$ (wt %) | forming agent to form a grain boundary depletion layer which also functions as a control agent to control the grain growth Sr(Mn$_{2/3}$W$_{1/3}$)O$_3$ (wt %) | solid electrolyte which functions as a control agent to control the grain growth CeO$_2$ (wt %) | mean grain diameter (μm) | ε | tan δ (%) | rising voltage V$_1$mA (V/mm) | α |
|---|---|---|---|---|---|---|---|---|
| 0.05 | 0.2 | 1.5 | 1.0 | 1.5 | 2400 | 25.0 | 430 | 6.5 |
| 0.1 | 0.2 | 1.5 | 1.0 | 3.5 | 4100 | 4.2 | 840 | 13 |
| 0.5 | 0.2 | 1.5 | 1.0 | 4.0 | 4800 | 2.9 | 750 | 14 |
| 1.0 | 0.2 | 1.5 | 1.0 | 3.5 | 4300 | 2.5 | 820 | 13 |
| 3.0 | 0.2 | 1.5 | 1.0 | 3.5 | 4100 | 3.1 | 840 | 13 |
| 5.0 | 0.2 | 1.5 | 1.0 | 4.0 | 4800 | 2.0 | 760 | 14 |

TABLE 46-continued

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth $Sr(Mn_{2/3}W_{1/3})O_3$ (wt %) | solid electrolyte which functions as a control agent to control the grain growth $CeO_2$ (wt %) | mean grain diameter (μm) | ε | tan δ (%) | rising voltage $V_1$mA (V/mm) | α |
|---|---|---|---|---|---|---|---|---|
| 1.0 | 0.02 | 1.5 | 1.0 | 4.0 | 3100 | 35.0 | 450 | 5.0 |
| 1.0 | 0.05 | 1.5 | 1.0 | 4.0 | 4800 | 4.3 | 720 | 13 |
| 1.0 | 0.5 | 1.5 | 1.0 | 3.5 | 4200 | 2.9 | 820 | 14 |
| 1.0 | 2.0 | 1.5 | 1.0 | 4.0 | 5300 | 3.0 | 750 | 13 |
| 1.0 | 3.0 | 1.5 | 1.0 | 3.5 | 2500 | 22.0 | 480 | 4.0 |
| 1.0 | 0.2 | 0.1 | 1.0 | 3.5 | 3400 | 18.5 | 510 | 4.0 |
| 1.0 | 0.2 | 0.2 | 1.0 | 4.0 | 5200 | 2.2 | 760 | 12 |
| 1.0 | 0.2 | 1.0 | 1.0 | 3.5 | 4300 | 2.1 | 820 | 13 |
| 1.0 | 0.2 | 3.0 | 1.0 | 4.0 | 4900 | 3.0 | 720 | 13 |
| 1.0 | 0.2 | 6.0 | 1.0 | 3.5 | 4200 | 2.1 | 820 | 13 |
| 1.0 | 0.2 | 8.0 | 1.0 | 1.5 | 2800 | 5.5 | 450 | 6.0 |
| 1.0 | 0.2 | 1.5 | 0.05 | 2.5 | 2200 | 17.5 | 420 | 3.5 |
| 1.0 | 0.2 | 1.5 | 0.1 | 3.5 | 4200 | 2.4 | 830 | 13 |
| 1.0 | 0.2 | 1.5 | 0.3 | 4.0 | 5000 | 2.1 | 710 | 14 |
| 1.0 | 0.2 | 1.5 | 1.0 | 3.5 | 4100 | 2.0 | 880 | 13 |
| 1.0 | 0.2 | 1.5 | 3.0 | 3.5 | 4200 | 3.0 | 810 | 13 |
| 1.0 | 0.2 | 1.5 | 4.0 | 1.5 | 2500 | 15.5 | 380 | 4.0 |

As is apparent from the results in Table 46, the present material obtained by adding $SrTiO_3$ to a sintering accelerant $TiO_2$—$Al_2O_3$—$SiO$ of 0.1 to 5.0 wt %, a semiconducting accelerant $Nb_2O_5$ of 0.05 to 2.0 wt %, a solid electrolyte $CeO_2$ 0.1 to 3.0 wt %, and a forming agent $Sr(Mn_{\frac{2}{3}}W_{\frac{1}{3}})O_3$ of 0.2 to 6.0 wt % to form a grain boundary depletion layer which also functions as a control agent to control the grain growth and sintering has excellent varistor and dielectric characteristics with uniform grain diameter and can be used as a varistor with high capacitance. According to a microscopic examination, the grain diameters of corpuscles in the sintered body were uniform and approximately 3.5 to 4.0 μm and the dielectric loss was 5.0% or less and the apparent dielectric constant was 4000 or more. The riser voltage $V_1$ mA of the materials as a varistor was 700 to 900 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained. When the amount of the sintering accelerant added exceeds 5%, the sintered body is prone to deform or adhere, therefore it is not practical.

EXAMPLE 47

A sintering accelerant of 1.0 wt % selected from $TiO_2$—MgO—$SiO_2$ series (for example, ratio of 30:30:40 wt %), $TiO_2$—MnO—$SiO_2$ series (for example, ratio of 10:50:40 wt %), $TiO_2$—$Al_2O_3$—$SiO_2$ series (for example, ratio of 20:35:45 wt %) mainly forming a liquid phase at a high temperature, a semiconducting accelerant $Y_2O_3$ of 0.4 wt % which can form a solid solution with perovskite type oxides, a good oxygen conductive solid electrolyte $CeO_2$ of 0.2 to 2.0 wt % which functions as a control agent to control the grain growth, and a forming agent $Sr(Mn_{\frac{2}{3}}W_{\frac{1}{3}})O_3$ of 0.4 to 4.0 wt % to form a grain boundary depletion layer which also functions as a control agent to control the grain growth were added to commercial industrial strontium titanat ($SrTiO_3$) and mixed well followed by calcination at 900° C. Then it was ground in a wet state followed by drying, making grain, and molded into a disk shape, sintered at 1380° C. in the reducing atmosphere composed of 95% of nitrogen and 5% of hydrogen. It was heat-treated at 950° C. in the air and silver electrodes were formed on both sides of the disk, thereby completing the manufacture of a ceramic capacitor having grain boundary varistor characteristics of FIG. 2. Electric characteristics of the laminated ceramic capacitor were measured and the results are shown in Table 47. The sintering accelerant $TiO_2$—MgO—$SiO_2$ series (for example, ratio of 30:30:40 wt %) was obtained by weighing commercial $TiO_2$, MgO and $SiO_2$ powder according to the predetermined weight ratio, mixing, calcinating at 1200° C., and grinding. The forming agent $Sr(Mn_{\frac{2}{3}}W_{\frac{1}{3}})O_3$ to form a grain boundary depletion layer which also function as a control agent to control the grain growth was obtained by mixing commercial $SrCO_3$, $WO_3$ and $MnCO_3$, calcinating at 900° C., and grinding.

TABLE 47

| sintering accelerant (wt %) | semiconducting accelerant $Y_2O_3$ (wt %) | forming agent to form a grain boundary depletion layer which also functions as a control agent to control the grain growth $Sr(Mn_{2/3}W_{1/3})O_3$ (wt %) | solid electrolyte which functions as a control agent to control the grain growth $CeO_2$ (wt %) | mean grain diameter (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |
| 1.0 | 0.4 | 0.4 | 1.0 | 3.5 | 4100 | 3.2 | 830 | 13 |
| 1.0 | 0.4 | 4.0 | 1.0 | 3.5 | 4200 | 3.4 | 850 | 12 |

TABLE 47-continued

| sintering accelerant (wt %) | semiconducting accelerant Y$_2$O$_3$ (wt %) | forming agent to form a grain boundary depletion layer which also functions as a control agent to control the grain growth Sr(Mn$_{2/3}$W$_{1/3}$)O$_3$ (wt %) | solid electrolyte which functions as a control agent to control the grain growth CeO$_2$ (wt %) | mean grain diameter (μm) | ε | tan δ (%) | V$_1$mA (V/mm) | α |
|---|---|---|---|---|---|---|---|---|
| 1.0 | 0.4 | 1.0 | 0.2 | 4.0 | 4500 | 2.9 | 750 | 13 |
| 1.0 | 0.4 | 1.0 | 2.0 | 3.5 | 4300 | 3.7 | 810 | 14 |
| TiO$_2$—MnO—SiO$_2$ compound | | | | | | | | |
| 1.0 | 0.4 | 0.4 | 1.0 | 3.7 | 4800 | 3.3 | 820 | 12 |
| 1.0 | 0.4 | 4.0 | 1.0 | 3.7 | 4500 | 3.2 | 810 | 11 |
| 1.0 | 0.4 | 1.0 | 0.2 | 3.4 | 5000 | 3.2 | 850 | 11 |
| 1.0 | 0.4 | 1.0 | 2.0 | 4.0 | 4800 | 3.0 | 740 | 14 |
| TiO$_2$—MgO—SiO$_2$ compound | | | | | | | | |
| 1.0 | 0.4 | 0.4 | 1.0 | 4.0 | 5100 | 3.9 | 770 | 13 |
| 1.0 | 0.4 | 4.0 | 1.0 | 3.7 | 4600 | 2.9 | 800 | 11 |
| 1.0 | 0.4 | 1.0 | 0.2 | 3.7 | 4500 | 3.9 | 780 | 13 |
| 1.0 | 0.4 | 1.0 | 2.0 | 3.5 | 4100 | 3.2 | 860 | 12 |

As is apparent from the results in Table 47, the present material obtained by adding SrTiO$_3$ to a sintering accelerant such as TiO$_2$—MgO—SiO$_2$ of 1.0 wt %, a semiconducting accelerant Y$_2$O$_3$ of 0.4 wt %, a good oxygen conductive solid electrolyte CeO$_2$ of 0.2 to 2.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 46.

EXAMPLE 48

A sintering accelerant of 30 wt % of TiO$_2$—MgO—SiO$_2$ series (for example, ratio of 30:30:40 wt %) mainly forming a liquid phase at a high temperature, semiconducting accelerants WO$_3$·Nb$_2$O$_5$, La$_2$O$_3$ and Y$_2$O$_3$ of 0.05 to 2.0 wt %, a good oxygen conductive solid electrolyte CeO$_2$ of 1.5 wt % which functions as a control agent to control the grain growth, and a forming agent Sr$_{0.8}$Ba$_{0.1}$Ca$_{0.1}$(Mn$_{\frac{2}{3}}$W$_{\frac{1}{3}}$)O$_3$ or Sr$_{0.6}$Ba$_{0.-}$ 2Ca$_{0.2}$(Mn$_{\frac{2}{3}}$W$_{\frac{1}{3}}$)O$_3$ of 2.0 wt % to form a grain boundary depletion layer which also functions as a control agent to control the grain growth were added to commercial industrial strontium titanat (SrTiO$_3$) and mixed well followed by calcination at 900° C. Then it was ground in a wet state followed by drying, making grain, and molding, sintering at 1380° C. in the reducing atmosphere composed of 95% of nitrogen and 5% of hydrogen. It was heat-treated at 950° C. in the air and electrodes were formed, thereby completing the manufacture of a ceramic capacitor having grain boundary varistor characteristics of FIG. 2. Electric characteristics of the laminated ceramic capacitor were measured and the results are shown in Table 48. The sintering accelerant TiO$_2$—MgO—SiO$_2$ series (ratio of 30:30:40 wt %) was obtained by weighing commercial TiO$_2$, MgO, SiO$_2$ powder according to the predetermined weight ratio, mixing, calcinating at 1200° C., and grinding. The forming agent to form a grain boundary depletion layer which also functions as a control agent to control the grain growth was obtained by mixing commercial SrCO$_3$, BaCO$_3$, CaCO$_3$, WO$_3$ and MnCO$_3$, calcinating at 900° C., and grinding.

TABLE 48

| sintering accelerant TiO$_2$—MgO—SiO$_2$ compound (wt %) | semiconducting accelerant (wt %) | forming agent to form a grain boundary depletion layer which also functions as a control agent to control the grain growth (wt %) | solid electrolyte which functions as a control agent to control the grain growth CeO$_2$ (wt %) | mean grain diameter (μm) | ε | tan δ (%) | V$_1$mA (V/mm) | α |
|---|---|---|---|---|---|---|---|---|
| 3.0 | WO$_3$ 0.05 | Sr$_{0.8}$Ba$_{0.1}$Ca$_{0.1}$(Mn$_{2/3}$W$_{1/3}$)O$_3$ 2.0 | 1.5 | 3.7 | 4500 | 3.8 | 780 | 14 |
| 3.0 | Nb$_2$O$_5$ 0.05 | Sr$_{0.8}$Ba$_{0.1}$Ca$_{0.1}$(Mn$_{2/3}$W$_{1/3}$)O$_3$ 2.0 | 1.5 | 4.0 | 4700 | 3.2 | 740 | 14 |
| 3.0 | La$_2$O$_3$ 0.05 | Sr$_{0.8}$Ba$_{0.1}$Ca$_{0.1}$(Mn$_{2/3}$W$_{1/3}$)O$_3$ 2.0 | 1.5 | 4.0 | 5100 | 3.3 | 810 | 13 |
| 3.0 | Y$_2$O$_3$ 0.05 | Sr$_{0.8}$Ba$_{0.1}$Ca$_{0.1}$(Mn$_{2/3}$W$_{1/3}$)O$_3$ 2.0 | 1.5 | 3.7 | 4400 | 3.6 | 810 | 12 |
| 3.0 | WO$_3$ 0.50 | Sr$_{0.6}$Ba$_{0.2}$Ca$_{0.2}$(Mn$_{2/3}$W$_{1/3}$)O$_3$ 2.0 | 1.5 | 4.0 | 4900 | 3.1 | 770 | 13 |
| 3.0 | Nb$_2$O$_5$ 0.50 | Sr$_{0.6}$Ba$_{0.2}$Ca$_{0.2}$(Mn$_{2/3}$W$_{1/3}$)O$_3$ 2.0 | 1.5 | 3.7 | 4500 | 3.3 | 790 | 12 |
| 3.0 | La$_2$O$_3$ 0.50 | Sr$_{0.6}$Ba$_{0.2}$Ca$_{0.2}$(Mn$_{2/3}$W$_{1/3}$)O$_3$ 2.0 | 1.5 | 3.5 | 4300 | 3.7 | 850 | 14 |
| 3.0 | Y$_2$O$_3$ 0.50 | Sr$_{0.6}$Ba$_{0.2}$Ca$_{0.2}$(Mn$_{2/3}$W$_{1/3}$)O$_3$ 2.0 | 1.5 | 4.0 | 5100 | 3.0 | 760 | 13 |
| 3.0 | WO$_3$ 2.0 | Sr$_{0.8}$Ba$_{0.1}$Ca$_{0.1}$(Mn$_{2/3}$W$_{1/3}$)O$_3$ 2.0 | 1.5 | 3.7 | 4500 | 3.9 | 780 | 14 |
| 3.0 | Nb$_2$O$_5$ | Sr$_{0.8}$Ba$_{0.1}$Ca$_{0.1}$ | 1.5 | 3.5 | 4200 | 3.5 | 860 | 13 |

TABLE 48-continued

| sintering accelerant $TiO_2$—MgO—$SiO_2$ compound (wt %) | semiconducting accelerant (wt %) | forming agent to form a grain boundary depletion layer which also functions as a control agent to control the grain growth (wt %) | solid electrolyte which functions as a control agent to control the grain growth $CeO_2$ (wt %) | mean grain diameter (μm) | ε | tan δ (%) | $V_1$mA (V/mm) | α |
|---|---|---|---|---|---|---|---|---|
| 3.0 | $La_2O_3$ 2.0 | $(Mn_{2/3}W_{1/3})O_3$ 2.0 $Sr_{0.8}Ba_{0.1}Ca_{0.1}$ $(Mn_{2/3}W_{1/3})O_3$ 2.0 | 1.5 | 4.0 | 4700 | 3.7 | 740 | 14 |
| 3.0 | $Y_2O_3$ 2.0 | $Sr_{0.8}Ba_{0.1}Ca_{0.1}$ $(Mn_{2/3}W_{1/3})O_3$ 2.0 | 1.5 | 3.7 | 4400 | 3.2 | 810 | 13 |

As is apparent from the results in Table 48, the present material obtained by adding $SrTiO_3$ to a sintering accelerant such as $TiO_2$—MgO—$SiO_2$ series of 3.0 wt %, semiconducting accelerants $WO_3$, $Nb_2O_5$, $La_2O_3$ and $Y_2O_3$ of 0.05 to 0.5 or 1.0 wt %, a solid electrolyte $CeO_2$ of 1.5 wt % which also functions as a control agent to control the grain growth, and a forming agent of 2.0 wt % to form a grain boundary depletion layer which also functions as a control agent to control the grain growth and sintering has excellent varistor and dielectric characteristics and can be used as a varistor with high capacitance. The electric characteristics of the materials used in these devices are similar to those used in Example 46.

EXAMPLE 49

A capacitor was manufactured according to the method in Example 46 including the manufacturing method for other materials, sintering accelerant or the like, except that a compound SrO·⅓$Mn_2O_3$·⅓$MoO_3$ (0.1 to 6.0 wt %) was used as a forming agent instead of the forming agent Sr($Mn_⅔W_⅓$)$O_3$ (0.1 to 6.0 wt %) to form a grain boundary depletion and electric characteristics thereof were measured by the same method as Example 46. The results are shown in Table 49. The forming agent SrO·⅓$Mn_2O_3$·⅓$MoO_3$ to form a grain boundary depletion which also functions as a control agent to control the grain growth was obtained by mixing commercial $SrCO_3$, $MoO_3$, $MnCO_3$ or the like, sintering at 1000° C. and grinding.

TABLE 49

| sintering accelerant $TiO_2$—$Al_2O_3$—$SiO_2$ compound (wt %) | semiconducting accelerant $Nb_2O_5$ (wt %) | forming agent to form a grain boundary depletion layer which also functions as a control agent to control the grain growth SrO.1/3$Mn_2O_3$.1/3$MoO_3$ (wt %) | solid electrolyte which functions as a control agent to control the grain growth $CeO_2$ (wt %) | mean grain diameter (μm) | ε | tan δ (%) | rising voltage $V_1$mA (V/mm) | α |
|---|---|---|---|---|---|---|---|---|
| 0.05 | 0.2 | 1.5 | 1.0 | 2.0 | 3500 | 16.5 | 270 | 4.5 |
| 0.1 | 0.2 | 1.5 | 1.0 | 3.5 | 4200 | 3.4 | 810 | 11 |
| 0.5 | 0.2 | 1.5 | 1.0 | 4.0 | 4800 | 3.5 | 760 | 12 |
| 1.0 | 0.2 | 1.5 | 1.0 | 3.5 | 3900 | 3.6 | 830 | 13 |
| 3.0 | 0.2 | 1.5 | 1.0 | 4.0 | 5200 | 3.8 | 780 | 12 |
| 5.0 | 0.2 | 1.5 | 1.0 | 3.5 | 4300 | 3.1 | 830 | 12 |
| 1.0 | 0.02 | 1.5 | 1.0 | 2.5 | 2500 | 26.5 | 270 | 3.5 |
| 1.0 | 0.05 | 1.5 | 1.0 | 3.5 | 4300 | 3.9 | 890 | 11 |
| 1.0 | 0.5 | 1.5 | 1.0 | 3.5 | 4100 | 3.2 | 870 | 12 |
| 1.0 | 2.0 | 1.5 | 1.0 | 4.0 | 4700 | 3.1 | 760 | 11 |
| 1.0 | 3.0 | 1.5 | 1.0 | 2.5 | 3800 | 22.5 | 270 | 4.5 |
| 1.0 | 0.2 | 0.1 | 1.0 | 3.0 | 4200 | 38.0 | 260 | 2.5 |
| 1.0 | 0.2 | 0.2 | 1.0 | 4.0 | 4800 | 3.2 | 720 | 11 |
| 1.0 | 0.2 | 0.5 | 1.0 | 3.5 | 3900 | 3.5 | 850 | 12 |
| 1.0 | 0.2 | 1.0 | 1.0 | 3.5 | 4300 | 3.1 | 870 | 13 |
| 1.0 | 0.2 | 5.0 | 1.0 | 3.5 | 4100 | 3.1 | 870 | 13 |
| 1.0 | 0.2 | 6.0 | 1.0 | 2.0 | 3700 | 18.2 | 350 | 8.5 |
| 1.0 | 0.2 | 1.5 | 0.05 | 3.0 | 4300 | 21.3 | 310 | 7.0 |
| 1.0 | 0.2 | 1.5 | 0.1 | 4.0 | 4900 | 3.1 | 780 | 12 |
| 1.0 | 0.2 | 1.5 | 0.5 | 3.5 | 3900 | 3.4 | 860 | 12 |
| 1.0 | 0.2 | 1.5 | 1.0 | 3.5 | 4200 | 3.8 | 840 | 13 |
| 1.0 | 0.2 | 1.5 | 3.0 | 4.0 | 4600 | 3.4 | 790 | 12 |
| 1.0 | 0.2 | 1.5 | 4.0 | 2.0 | 3200 | 22.9 | 420 | 3.5 |

As is apparent from the results in Table 49, the present material obtained by adding $SrTiO_3$ to a sintering accelerant $TiO_2$—$Al_2O_3$—$SiO_2$ of 0.1 to 5.0 wt %, a semiconducting accelerant $Nb_2O_5$ of 0.05 to 2.0 wt %, a solid electrolyte $CeO_2$ 0.1 to 3.0 wt %, and a forming agent SrO·⅓$Mn_2O_3$·⅓$MoO_3$ of 0.2 to 5.0 wt % to form a grain boundary depletion layer which also functions as a control agent to control the grain growth and sintering has excellent varistor and dielectric characteristics with uniform grain diameter and can be used as a ceramic capacitor with varistor characteristics having high capacitance. According to a microscopic examination, the grain diameters of corpuscles in the sintered body were uniform and the mean grain diameter was approximately 3.5 to 4.0 μm and the dielectric loss was 4.0% or less and the apparent voltage $V_1$ mA of the materials as a varistor was 700 to 900 V/mm and the resistance non-linearity coeffecient α is 10 or more in most cases between $V_1$ mA to $V_{0.1}$ mA. Other values such as surge durability as a varistor, the ratio of limited voltage representing the resistance non-linearity coeffecient in high current area, the temperature coefficient of the riser voltage $V_1$ mA and capacitance were measured and sufficient values were obtained. When the amount of the sintering accelerant added exceeds 5%, the sintered body is prone to deform or adhere, therefore it is not practical.

EXAMPLE 50

A capacitor was manufactured according to the method in Example 47 including the manufacturing method for other materials, sintering accelerant or the like, except that the forming agent $SrO·\frac{1}{3}Mn_2O_3·\frac{1}{3}MoO_3$ (0.4 to 4.0 wt %) was used instead of the forming agent $Sr(Mn_{\frac{1}{3}}W_{\frac{1}{3}})$ (0.4 to 4.0 wt %) to form a grain boundary depletion and electric characteristics thereof were measured by the same method as Example 47. The results are shown in Table 50. The forming agent $SrO·\frac{1}{3}Mn_2O_3·\frac{1}{3}MoO_3$ to form a grain boundary depletion which also functions as a control agent to control grain growth was obtained by mixing commercial $SrCO_3$, $MoO_3$, $MnCO_3$ or the like, sintering at 1000° C. and grinding. The sintering accelerant, for example, $TiO_2$—MgO—$SiO_2$ series (ratio of 30:30:40 wt %) was obtained by weighing and mixing commercial $TiO_2$, MgO, $SiO_2$ powder according to the predetermined weight ratio, mixing, calcinating at 1200° C., and grinding.

accelerant, a good oxygen conductive solid electrolyte which functions as a control agent to control the grain growth, and a forming agent to form a grain boundary depletion layer which also functions as a control agent to control the grain growth were added to and mixed with $SrTiO_3$, molded under pressure, calcinated to reduce at 800° to 1500° C. and then heat-treated at 900° to 1150° C. in the oxidizing atmosphere, the same results obtained from each example were confirmed.

In examples 1, 4, 7, 10, 13, 16, 19 and 22, when a sintering accelerant, a semiconducting accelerant, a good oxygen conductive solid electrolyte which functions as a control agent to control the grain growth, and a forming agent to form a grain boundary depletion layer which also functions as a control agent to control the grain growth, were added to and mixed with $SrTiO_3$, molded under pressure, sintered at 1200° C. to 1500° C. in the air, re-ground so as to laminate with metal inner electrodes alternately, and sintered at 1250° C. to 1500° C. in the air followed by the reduction at 800° C. to 1500° C. in the reducing atmosphere containing hydrogen, and heat-treated at 900° C. to 1150° C. in the oxidizing atmosphere, the same results obtained from each example were confirmed. In examples 26, 27, 29, 30, 32, 33, 35, 36, 38 and 39, when a sintering accelerant, a semiconducting accelerant, a good oxygen con-

TABLE 50

| sintering accelerant (wt %) | semiconducting accelerant $Y_2O_3$ (wt %) | forming agent to form a grain boundary depletion layer which also functions as a control agent to control the grain growth $SrO.1/3Mn_2O_3.1/3MoO_3$ (wt %) | solid electrolyte which functions as a control agent to control the grain growth $CeO_2$ (wt %) | mean grain diameter (μm) | ε | tan δ (%) | $V_1$mA (V/mm) | α |
|---|---|---|---|---|---|---|---|---|
| $TiO_2$—$Al_2O_3$—$SiO_2$ compound | | | | | | | | |
| 1.0 | 0.4 | 0.4 | 1.0 | 3.7 | 4900 | 3.4 | 790 | 11 |
| 1.0 | 0.4 | 4.0 | 1.0 | 3.7 | 4700 | 3.5 | 830 | 11 |
| 1.0 | 0.4 | 1.0 | 0.2 | 4.0 | 5100 | 3.6 | 750 | 12 |
| 1.0 | 0.4 | 1.0 | 2.0 | 3.7 | 4400 | 3.3 | 770 | 11 |
| $TiO_2$—MnO—$SiO_2$ compound | | | | | | | | |
| 1.0 | 0.4 | 0.4 | 1.0 | 3.5 | 4200 | 3.7 | 830 | 11 |
| 1.0 | 0.4 | 4.0 | 1.0 | 3.5 | 4000 | 3.4 | 840 | 12 |
| 1.0 | 0.4 | 1.0 | 0.2 | 3.7 | 4200 | 3.4 | 810 | 11 |
| 1.0 | 0.4 | 1.0 | 2.0 | 3.5 | 3900 | 3.6 | 830 | 12 |
| $TiO_2$—MgO—$SiO_2$ compound | | | | | | | | |
| 1.0 | 0.4 | 0.4 | 1.0 | 4.0 | 5100 | 3.3 | 760 | 12 |
| 1.0 | 0.4 | 4.0 | 1.0 | 3.5 | 4100 | 3.6 | 850 | 12 |
| 1.0 | 0.4 | 1.0 | 0.2 | 4.0 | 5300 | 3.7 | 750 | 11 |
| 1.0 | 0.4 | 1.0 | 2.0 | 3.7 | 4600 | 3.7 | 770 | 12 |

As is apparent from the results in Table 50, the present material obtained by adding $SrTiO_3$ to a sintering accelerant such as $TiO_2$—MgO—$SiO_2$ of 1.0 wt % mainly forming a liquid phase at a high temperature, a sintering accelerant $Y_2O_3$ of 0.4 wt %, a good oxygen conductive solid electrolyte $CeO_2$ of 0.2 to 2.0 wt % which also functions as a control agent to control the grain growth, and a forming agent of 0.4 to 4.0 wt % to form a grain boundary depletion layer which also functions as a control agent to control the grain growth and sintering has excellent varistor and dielectric characteristics and can be used as a ceramic capacitor with varistor characteristics having high capacitance. The electric characteristics of the materials used in these devices are similar to those used in Example 49.

In examples 2, 3, 5, 6, 8, 9, 11, 12, 14, 15, 17, 18, 20, 21, 23 and 24, when a sintering accelerant a semiconducting ductive solid electrolyte, which functions as a control agent to control the grain growth, and a forming agent to form a grain boundary depletion layer which also functions as a control agent to control the grain growth, were added to and mixed with $SrTiO_3$, molded under pressure, calcinated to reduce at 1100° C. to 1500° C. and then heat-treated at 900° C. to 1150° C. in the oxidizing atmosphere, the same results obtained from each example were confirmed. In examples 25, 28, 31, 34 and 37, when a sintering accelerant, a semiconducting accelerant, a good oxygen conductive solid electrolyte which functions as a control agent to control the grain growth, and a forming agent to form a grain boundary depletion layer which also functions as a control agent to control the grain growth were added to and mixed with $SrTiO_3$, molded under pressure, sintered at 1200° C. to 1500° C. in the air, re-ground so as to laminate with noble metal inner electrodes alternately, and sintered at 1250° C. to 1500° C. in the air followed by the reduction at 900° C. to 1150° C. in the reducing atmosphere containing hydrogen, and heat-treated at 900° C. to 1150° C. in the oxidizing atmosphere, the same results obtained from each example were confirmed. In examples 41, 42, 44 and 45, when a sintering accelerant, a semiconducting accelerant, a good oxygen conductive solid electrolyte which functions as a control agent to control the grain growth, and a forming agent to form a grain boundary depletion layer which also functions as a control agent to control the grain growth were added to and mixed with $SrTiO_3$, molded under pressure, calcinated to reduce at 1100° C. to 1500° C. and then heat-treated at 900° C. to 1150° C. in the oxidizing atmosphere, the same results obtained from each example were confirmed. In examples and 43, when a sintering accelerant, a semiconducting accelerant, a good oxygen conductive solid electrolyte which functions as a control agent to control the grain growth, and a forming agent to form a grain boundary depletion layer which also functions as a control agent to control the grain growth were added to and mixed with $SrTiO_3$, molded under pressure, sintered at 1200° C. to 1500° C. in the air, re-ground so as to laminate with noble metal inner electrodes alternately, and sintered at 1250° C. to 1500° C. in the air followed by the reduction at 900° C. to 1150° C. in the reducing atmosphere containing hydrogen, and heat-treated at 900° C. to 1150° C. in the oxidizing atmosphere, the same results obtained from each example were confirmed. In examples 47, 48 and 50, when a sintering accelerant, a semiconducting accelerant, a good oxygen conductive solid electrolyte which functions as a control agent to control the grain growth, and a forming agent to form a grain boundary depletion layer, which also functions as a control agent to control the grain growth were added to and mixed with $SrTiO_3$, molded under pressure, calcinated to reduce at 900° C. to 1500° C. and then heat-treated at 900° C. to 1150° C. in the oxidizing atmosphere, the same results obtained from each example were confirmed. In examples 46 and 49, when a sintering accelerant, a semiconducting accelerant, a good oxygen conductive solid electrolyte which functions as a control agent to control the grain growth, and a forming agent to form a grain boundary depletion layer, which also functions as a control agent to control the grain growth were added to and mixed with $SrTiO_3$, molded under pressure, sintered at 1100° C. to 1500° C. in the air, re-ground so as to laminate with noble metal inner electrodes alternately, and sintered at 1250° C. to 1500° C. in the air followed by the reduction at 900° C. to 1500° C. in the reducing atmosphere containing hydrogen, and heat-treated at 900° C. to 1150° C. in the oxidizing atmosphere, the same results obtained from each example were confirmed.

INDUSTRIAL APPLICABILITY

As described above, according to the present invention, a ceramic capacitor having varistor characteristics is manufactured by the steps comprising; adding a sintering accelerant of 0.1 to 5.0 wt % mainly composed of the mixture and forming a liquid phase at a high temperature, a semiconducting accelerant $Nb_2O_5$ of 0.05 to 2.0 wt % that can form a solid solution with perovskite type oxides, and a control agent for porous sintering and a forming agent to form a grain boundary depletion layer which also functions as a control agent to control the grain growth, to perovskite type oxides powder made of the materials of strontium titanate ($SrTiO_3$) as a main component, mixing and molding under pressure, sintering and reducing at 1250° C. to 1500° C., heat-treating at 900° C. to 1150° C. in the oxidizing atmosphere so as to form electrodes. Therefore, a uniform porous body can be obtained without complicated processes of coating and diffusing $Bi_2O_3$ or the like, and, moreover, the size of the porous body is not subject to any particular restriction. The effects of the present application are greatly improved from the point of view of practical applications.

I claim:

1. A method for manufacturing a ceramic capacitor having varistor characteristics comprising the steps of; adding a sintering accelerant (0.1 to 5.0 wt %), a semiconducting accelerant (0.05 to 2.0 wt %) that can form a solid solution with perovskite type oxides, a control agent to control the grain growth $ZrO_2$ (0.1 to 10.0 wt %) and a forming agent to form a grain boundary depletion layer $Sr(Cu_{\frac{1}{4}}Nb_{\frac{3}{4}})O_3$ (0.2 to 4.0 wt %) which also functions as a control agent to control the grain growth, to perovskite type oxides powder made of the materials of strontium titanate ($SrTiO_3$) as a main component, mixing and molding under pressure, sintering and reducing at 800° C. to 1500° C., and heat-treating at 900° C. to 1150° C. in the oxidizing atmosphere so as to form electrodes.

2. A method for manufacturing a ceramic capacitor having varistor characteristics according to claim 1, wherein, in at least one of said sintering accelerant, a semiconducting accelerant, and a forming agent to form a grain boundary depletion layer which also functions as a control agent to control the grain growth, said sintering accelerant is selected from at least the series consisting of $TiO_2$—MgO—$SiO_2$, $TiO_2$—MnO—$SiO_2$ or $TiO_2$—$Al_2O_3$—$SiO_2$; said semiconducting accelerant is an oxide (0.05 to 2.0 wt %) selected from at least $WO_3$, $Nb_2O_5$, $La_2O_3$, and $Y_2O_2$; and said forming agent to form a grain boundary depletion layer which also functions as a control agent to control the grain growth is selected from $Sr(Cu_{\frac{1}{4}}Ta_{\frac{3}{4}})O_3$ (0.2 to 5.0 wt %), $Sr(Co_{\frac{1}{4}}Nb_{\frac{3}{4}})O_3$ (0.2 to 6.0 wt %), $Sr(Co_{\frac{1}{4}}Ta_{\frac{3}{4}})O_3$ (0.2 to 8.0 wt %), $Sr(Cu_{\frac{1}{4}}W_{\frac{3}{4}})O_3$ (0.2 to 6.0 wt %), $Sr(Co_{\frac{1}{4}}W_{\frac{1}{2}})O_3$ (0.2 to 5.0 wt %), $Sr(Co_{\frac{1}{4}}Mo_{\frac{3}{4}})O_3$ (0.2 to 6.0 wt %), $SrO \cdot \frac{1}{3}Mn_2O_3 \cdot \frac{1}{3}MoO_3$ (0.2 to 4.0 wt %), $Sr_{1-x-y}Ba_xCa_y(Cu_{\frac{1}{4}Nb_{\frac{3}{4}}})O_3$ ($0<x+y\leq1$) (0.2 to 4.0 wt %), $Sr_{1-x-y}Ba_xCa_x(Cu_{\frac{1}{4}Ta_{\frac{3}{4}}})O_3$ ($0<x+y\leq1$), (0.2 to 5.0 wt %), $Sr_{1-x-y}Ba_xCa_x(Co_{\frac{1}{4}}Nb_{\frac{3}{4}})O_3$ ($0<x+y\leq1$) (0.2 to 6.0 wt %), $Sr_{1-x-y}Ba_xCa_x(Co_{\frac{1}{4}}Ta_{\frac{3}{4}})O_3$ ($0<x+y\leq1$), (0.2 to 7.0 wt %) $Sr_{1-x-y}Ba_xCa_x(Cu_{\frac{1}{4}}W_{\frac{1}{2}})O_3$ ($0<x+y\leq1$) (0.2 to 6.0 wt %), $Sr_{1-x-y}Ba_xCa_x(Co_{\frac{1}{4}}W_{\frac{1}{2}})O_3$ ($0<x+y\leq1$), (0.2 to 5.0 wt %), $Sr_{1-x-y}Ba_xCa_x(Co_{\frac{1}{4}}Mo_{\frac{1}{2}})O_3$ ($0<x+y\leq1$), (0.2 to 5.0 wt %), or $(1-X-Y)SrO \cdot XBaO \cdot YCaO \cdot \frac{1}{3}Mn_2O_3 \cdot \frac{1}{3}MoO_3$ ($0<x+y\leq1$), (0.2 to 5.0 wt %).

3. A method for manufacturing a laminated ceramic capacitor having varistor characteristics comprising the steps of; adding a sintering accelerant (0.1 to 5.0 wt %), a semiconducting accelerant (0.05 to 2.0 wt %), a solid electrolyte $ZrO_2$ (0.1 to 10.0 wt %) which functions as a control agent to control the grain diameter, and a forming agent to form a grain boundary depletion layer $Sr(Cu_{\frac{1}{4}}Nb_{\frac{3}{4}})O_3$ (0.2 to 4.0 wt %) which also functions as a control agent to control the grain growth, to perovskite type oxides powder made of the materials of strontium titanate ($SrTiO_3$) as a main component, mixing and molding under pressure, sintering at 1200° to 1500° C. in the air, re-grinding so as to laminate with noble metal inner electrodes alternately, and sintering at 1250° C. to 1500° C. in the air followed by the reduction at 800° C. to 1500° C. in the reducing atmosphere containing hydrogen, and heat-treating at 900° C. to 1150° C. in the oxidizing atmosphere.

4. A method for manufacturing a ceramic capacitor having varistor characteristics according to claim 3, wherein one of $Sr(Cu_{\frac{1}{3}}Ta_{\frac{2}{3}})O_3$ (0.2 to 5.0 wt %), $(Co_{\frac{1}{3}}Nb_{\frac{2}{3}})O_3$ (0.2 to 6.0 wt %), $Sr(Co_{\frac{1}{3}}Ta_{\frac{2}{3}})O_3$ (0.2 to 7.0 wt %), $Sr(Cu_{\frac{1}{3}}W_{\frac{2}{3}})O_3$ (0.2 to 5.0 wt %), $Sr(Co_{\frac{1}{3}}W_{\frac{2}{3}})O_3$ (0.2 to 5.0 wt %), $Sr(Co_{\frac{1}{3}}Mo_{\frac{2}{3}})O_3$ (0.2 to 5.0 wt %) or $SrO \cdot \frac{1}{3}Mn_2O_3 \cdot \frac{1}{3}MoO_3$ (0.2 to 8.0 wt %) is added as at least a forming agent to form a grain boundary depletion layer which also functions as a control agent to control the grain growth.

5. A method for manufacturing a ceramic capacitor having varistor characteristics comprising the steps of; adding a sintering accelerant (0.1 to 5.0 wt %) mainly forming a liquid phase at a high temperature, a semiconducting accelerant (0.05 to 2.0 wt %) that can form a solid solution with perovskite type oxides, a control agent to control the grain growth $CeO_2$ (0.1 to 3.0 wt %) and a forming agent to form a grain boundary depletion layer $Sr(Mn_{\frac{1}{3}}Nb_{\frac{2}{3}})O_3$ (0.2 to 10.0 wt %) which also functions as a control agent to control the grain growth, to perovskite type oxides powder made of the materials of strontium titanate ($SrTiO_3$) as a main component, mixing and molding under pressure, sintering and reducing at 1100° C. to 1500° C., and heat-treating at 900° C. to 1150° C. in the oxidizing atmosphere so as to form electrodes.

6. A method for manufacturing a ceramic capacitor having varistor characteristics according to claim 5, wherein, in at least one of said sintering accelerant, a semiconducting accelerant, and a forming agent to form a grain boundary depletion layer which also functions as a control agent to control the grain growth, said sintering accelerant is selected from at least the series consisting of $TiO_2-MgO-SiO_2$, $TiO_2-MnO-SiO_2$ or $TiO_2-Al_2O_3-SiO_2$; said semiconducting accelerant is an oxide (0.05 to 2.0 wt %) selected from at least $WO_3$, $Nb_2O_5$, $La_2O_3$, and $Y_2O_3$; and said forming agent to form a grain boundary depletion layer which also functions as a control agent to control the grain growth is selected from $Sr(Mn_{\frac{1}{3}}Ta_{\frac{2}{3}})O_3$ (0.2 to 10.0 wt %), $Sr(Cu_{\frac{1}{3}}W_{\frac{2}{3}})O_3$ (0.2 to 5.0 wt %), $Sr(Co_{\frac{1}{3}}W_{\frac{2}{3}})O_3$ (0.2 to 5.0 wt %), $Sr(Cu_{\frac{1}{3}}Nb_{\frac{2}{3}})O_3$ (0.2 to 4.0 wt %), $Sr_{1-x-y}Ba_xCa_y(Mn_{\frac{1}{3}}Nb_{\frac{2}{3}})O_3$ ($0<x+y\leq1$), (0.2 to 10.0 wt %), $Sr_{1-x-y}Ba_xCa_y(Mn_{\frac{1}{3}}Ta_{\frac{2}{3}})O_3$ ($0<x+y\leq1$), (0.2 to 10.0 wt %), $Sr_{1-x-y}Ba_xCa_y(Cu_{\frac{1}{3}}W_{\frac{2}{3}})O_3$ ($0<x+y\leq1$) (0.2 to 5.0 wt %), $Sr_{1-x-y}Ba_xCa_y(Co_{\frac{1}{3}}W_{\frac{2}{3}})O_3$ ($0<x+y\leq1$), (0.2 to 5.0 wt %), or $Sr_{1-x-y}Ba_xCa_y(Cu_{\frac{1}{3}}Nb_{\frac{2}{3}})O_3$ ($0<x+y\leq1$), (0.2 to 4.0 wt %).

7. A method for manufacturing a laminated ceramic capacitor having varistor characteristics comprising the steps of; adding a sintering accelerant (0.1 to 5.0 wt %), a semiconducting accelerant (0.05 to 2.0 wt %), a solid electrolyte $CeO_2$ (0.1 to 3.0 wt %) and a forming agent to form a grain boundary depletion layer $Sr(Mn_{\frac{1}{3}}Nb_{\frac{2}{3}})O_3$ (0.2 to 10.0 wt %) which functions as a control agent to control the grain diameter, and a forming agent to form a grain boundary depletion layer which also functions as a control agent to control the grain growth, to perovskite type oxides powder made of the materials of strontium titanate ($SrTiO_3$) as a main component, mixing and molding under pressure, sintering at 1200° to 1500° C. in the air, re-grinding so as to laminate with noble metal inner electrodes alternately, sintering at 1250° C. to 1500° C. in the air followed by the reduction at 900° C. to 1400° C. in the reducing atmosphere containing hydrogen, and heat-treating at 900° C. to 1150° C. in the oxidizing atmosphere.

8. A method for manufacturing a ceramic capacitor having varistor characteristics according to claim 7, wherein one of $Sr(M_{\frac{1}{3}}Ta_{\frac{2}{3}})O_3$ (0.2 to 10.0 wt %), $Sr(Cu_{\frac{1}{3}}W_{\frac{2}{3}})O_3$ (0.2 to 5.0 wt %), $Sr(Co_{\frac{1}{3}}W_{\frac{2}{3}})O_3$ (0.2 to 5.0 wt %), or $Sr(Cu_{\frac{1}{3}}Nb_{\frac{2}{3}})O_3$ (0.2 to 4.0 wt %) is added, instead of $Sr(Mn_{\frac{1}{3}}Nb_{\frac{2}{3}})O_3$ (0.2 to 10.0 wt %) as at least a forming agent to form a grain boundary depletion layer which also functions as a control agent to control the grain growth.

9. A method for manufacturing a ceramic capacitor having varistor characteristics comprising the steps of; adding a sintering accelerant (0.1 to 5.0 wt %) mainly forming a liquid phase at a high temperature, a semiconducting accelerant (0.05 to 2.0 wt %) that can form a solid solution with perovskite type oxides, a control agent to control the grain growth $Pr_6O_{11}$ (0.1 to 4.0 wt %) and a forming agent to form a grain boundary depletion layer $Sr(Mn_{\frac{1}{3}}Nb_{\frac{2}{3}})O_3$ (0.2 to 10.0 wt %) which also functions as a control agent to control the grain growth, to perovskite type oxides powder made of the materials of strontium titanate pressure, sintering and reducing at 1150° C. to 1500° C., heat-treating at 900° C. to 1250° C. in the oxidizing atmosphere so as to form electrodes.

10. A method for manufacturing a ceramic capacitor having varistor characteristics according to claim 9, wherein, in at least one of said sintering accelerant, a semiconducting accelerant, and a forming agent to form a grain boundary depletion layer which also functions as a control agent to control the grain growth, said sintering accelerant is selected from at least the series consisting of $TiO_2-MgO-SiO_2$, $TiO_2-MnO-SiO_2$ or $TiO_2-Al_2O_3-SiO_2$; said semiconducting accelerant is an oxide (0.05 to 2.0 wt %) selected from at least $WO_3$, $Nb_2O_5$, $La_2O_3$, and $Y_2O_3$; and said form a grain boundary depletion layer which also functions as a control agent to control the grain growth is selected from $Sr(Cu_{\frac{1}{3}}Nb_{\frac{2}{3}})O_3$ (0.2 to 4.0 wt %), $Sr_{1-x-y}Ba_xCa_y(Mn_{\frac{1}{3}}Nb_{\frac{2}{3}})O_3$ ($0<x+y\leq1$), (0.2 to 10.0 wt %), or $Sr_{1-x-y}Ba_xCa_y(Cu_{\frac{1}{3}}Nb_{\frac{2}{3}})O_3$ ($0<x+y\leq1$), (0.2 to 4.0 wt %).

11. A method for manufacturing a laminated ceramic capacitor having varistor characteristics comprising the steps of; adding a sintering accelerant (0.1 to 5.0 wt %), a semiconducting accelerant (0.05 to 2.0 wt %) that can form a solid solution with perovskite type oxides, a solid electrolyte $Pr_6O_{11}$ (0.1 to 4.0 wt %) which also functions as a control agent to control the grain diameter and a forming agent to form a grain boundary depletion layer $Sr(Mn_{\frac{1}{3}}Nb_{\frac{2}{3}})O_3$ (0.2 to 10.0 wt %) which also functions as a control agent to control the grain growth, to perovskite type oxides powder made of the materials of strontium titanate ($SrTiO_3$) as a main component, mixing and molding under pressure, sintering at 1200° C. to 1500° C. in the air, re-grinding so as to laminate with noble metal inner electrodes alternately, and sintering at 1250° C. to 1500° C. in the air, followed by the reduction at 900° C. to 1400° C. in the reducing atmosphere containing hydrogen, and heat-treating at 900° C. to 1250° C. in the oxidizing atmosphere.

12. A method for manufacturing a ceramic capacitor having varistor characteristics according to claim 11, wherein $Sr(Cu_{\frac{1}{3}}Nb_{\frac{2}{3}})O_3$ (0.2 to 4.0 wt %), is added, instead of $Sr(Mn_{\frac{1}{3}}Nb_{\frac{2}{3}})O_3$ (0.2 to 10.0 wt %) as at least a forming agent to form a grain boundary depletion layer which also functions as a control agent to control the grain growth.

13. A method for manufacturing a ceramic capacitor having varistor characteristics comprising the steps of; adding a sintering accelerant (0.1 to 5.0 wt %) mainly forming a liquid phase at a high temperature, a semiconducting accelerant that can form a solid solution with perovskite type oxides, and a good oxygen conductive solid electrolyte $CeO_2$ (0.1 to 3.0 wt %) which functions as a control agent to control the grain growth and a forming agent to form a grain boundary depletion layer $Sr(Mn_{\frac{2}{3}}W_{\frac{1}{3}})O_3$ (0.2 to 6.0 wt %) which also functions as a control agent to control the grain growth, to perovskite type oxides powder made of the materials of strontium titanate ($SrTiO_3$) as a main component, mixing and molding under pressure, sintering and reducing at 900° C. to 1500° C., and heat-treating at 900° C. to 1150° C. in the oxidizing atmosphere so as to form electrodes.

14. A method for manufacturing a laminated ceramic capacitor having varistor characteristics comprising the steps of; adding a sintering accelerant (0.1 to 5.0 wt %), a semiconducting accelerant (0.05 to 2.0 wt %), a solid electrolyte $CeO_2$ (0.1 to 3.0 wt %) which also functions as a control agent to control the grain diameter and a forming agent to form a grain boundary depletion layer $Sr(Mn_{\frac{2}{3}}W_{\frac{1}{3}})O_3$ (0.2 to 6.0 wt %) which also functions as a control agent to control the grain growth, to perovskite type oxides powder made of the materials of strontium titanate ($SrTiO_3$) as a main component, mixing and molding under the pressure, sintering at 1100° C. to 1500° C. in the air, re-grinding so as to laminate with noble metal inner electrodes alternately, sintering at 1250° C. to 1500° C. in the air, followed by the reduction at 900° C. to 1500° C. in the reducing atmosphere containing hydrogen, and heat-treating at 900° C. to 1150° C. in the oxidizing atmosphere.

15. A method for manufacturing a ceramic capacitor having varistor characteristics according to claim 13 wherein, in at least one of said sintering accelerant, a semiconducting accelerant, and a forming agent to form a grain boundary depletion layer which also functions as a control agent to control the grain growth, said sintering accelerant is selected from at least the series consisting of $TiO_2$—$MgO$—$SiO_2$, $TiO_2$—$MnO$—$SiO_2$ or $TiO_2$—$Al_2O_3$—$SiO_2$; said semiconducting accelerant is an oxide selected from at least $WO_3$, $Nb_2O_5$, $La_2O_3$, and $Y_2O_3$; and said forming agent to form a grain boundary depletion layer which also functions as a control agent to control the grain growth is selected from one of $SrO \cdot \frac{1}{3}Mn_2O_3 \cdot \frac{1}{3}MoO_3$ (0.2 to 5.0 wt %) and $Sr_{1-x-y}Ba_xCa_y(Mn_{\frac{2}{3}}W_{\frac{1}{3}})O_3$ ($0 < x+y \leq 1$) (0.2 to 6.0 wt %).

16. A method for manufacturing a ceramic capacitor having varistor characteristics according to claim 14, wherein, in at least one of said sintering accelerant, a semiconducting accelerant, and a forming agent to form a grain boundary depletion layer which also functions as a control agent to control the grain growth, said sintering accelerant is selected from at least the series consisting of $TiO_2$—$MgO$—$SiO_2$, $TiO_2$—$MnO$—$SiO_2$ or $TiO_2$—$Al_2O_3$—$SiO_2$; said semiconducting accelerant is an oxide selected from at least $WO_3$, $Nb_2O_5$, $La_2O_3$, and $Y_2O_3$; and said forming agent to form a grain boundary depletion layer which also functions as a control agent to control the grain growth is selected from one of $SrO \cdot \frac{1}{3}Mn_2O_3 \cdot \frac{1}{3}MoO_3$ (0.2 to 5.0 wt %) and $Sr_{1-x-y}Ba_xCa_y(Mn_{\frac{2}{3}}W_{\frac{1}{3}})O_3$ ($0 < x+y \leq 1$) (0.2 to 6.0 wt %).

* * * * *

UNITED STATES PATENT AND TRADEMARK OFFICE
CERTIFICATE OF CORRECTION

PATENT NO. : 5,266,079

DATED : November 30, 1993

INVENTOR(S) : Atsushi Iga

It is certified that error appears in the above-indentified patent and that said Letters Patent is hereby corrected as shown below:

Table 1, columns 5 and 6. column 8, of table, line 4, "3800" should read --380--.
Table 3, columns 9 and 10, column 3, of table, line 3, "$Sr_{0.3} Ba_{0.1} Ca_{0.1}$" should read $Sr_{0.8} Ba_{0.1} Ca_{0.1}$ --.
Table 11, columns 19 and 20, column 4 of table, line 3, delete "8.0" after "0.2"
Column 5, of table, line 3, ".8500" should read --8.0--
Column 6, of table line 3, "1.4" should read --8500--
Column 7, of table, line 3, "340" should read --1.4--
Column 8, of table line 3, "12" should read --340--
Column 9, of table, line 3, insert --12--
Table 15, columns 25 and 26, column 2, of table, line 6, "y2O3" should read --$Y_2O_3$--
Table 18, columns 29 and 30, Table 19, columns 31 and 32; Table 20, cols. 31, 32, 33 and 34; Table 21, cols. 33 and 34; Table 22, cols. 35 and 36; Table 23, cols. 37 and 38; Table 24, cols. 37, 38, 39 and 40; Table 25, cols. 41 and 42; Table 26, cols. 41 and 42; Table 26, cols. 43 and 44; Table 27, cols. 43 and 44; Table 28, cols. 45 and 46; Table 29, cols. 47 and 48; Table 30, cols. 47, 48 , 49 and 50; Table 31, cols. 49 and 50; Table 32, cols. 51 and 52; Table 33, cols. 51 and 52; Table 33, cols. 53 and 54; Table 34, cols. 53 and 54, heading of column 5, of table, under "mean grain", insert --diameter--; Table 23, cols. 37 and 38, column 8, of table, last line, illegible numerals should read --330--. Table 24, cols, 37 and 38, column 3, of table, delete "0.8SrO.9.1CaO.0.1BaO" and insert --0.8SrO·0.1CaO·0.1BaO-- Table 26, cols. 41 and 42 and cols. 43 and 44, heading of column 3 of table, delete "SrO" and insert --Sr--.  Table 27, cols. 43 and 44, column 2, of table, line 9, delete "$Nb_2 O_6$" and insert --$Nb_2O_5$--.

UNITED STATES PATENT AND TRADEMARK OFFICE
CERTIFICATE OF CORRECTION

PATENT NO. : 5,266,079

DATED : November 30, 1993

INVENTOR(S) : Atsushi Iga

It is certified that error appears in the above-identified patent and that said Letters Patent is hereby corrected as shown below:

Table 30, cols. 47 and 48, column 2, of table, line 9, delete "$Nb_2O_6$" and insert --$Nb_2O_5$--.

Table 33, cols. 51 and 52, column 3, of table, line 6, delete "$9Cu_{1/2}W_{1/2})O_32.0$" and insert --$(Cu_{1/2}W_{1/2})O_32.0$--

Table 45, cols.. 71 and 72, column 7, of table, delete "2.8" and insert --1.8--.

Column 84, claim 9, line 25, after "titanate" insert --($SrTiO_3$) as a main component, mixing and molding under--.

Col. 84, claim 10, line 38, after "said" insert --forming agent to --.

Signed and Sealed this

Tenth Day of October, 1995

Attest:

Attesting Officer

BRUCE LEHMAN

Commissioner of Patents and Trademarks